(12) United States Patent
Matsuo

(10) Patent No.: US 12,411,323 B2
(45) Date of Patent: Sep. 9, 2025

(54) OPTICAL SYSTEM HAVING INTERMEDIATE IMAGE FORMED THEREIN

(71) Applicant: NITTOH INC., Suwa (JP)

(72) Inventor: Takahiko Matsuo, Suwa (JP)

(73) Assignee: NITTOH INC., Suwa (JP)

( * ) Notice: Subject to any disclaimer, the term of this patent is extended or adjusted under 35 U.S.C. 154(b) by 365 days.

(21) Appl. No.: 17/928,425

(22) PCT Filed: Jun. 16, 2021

(86) PCT No.: PCT/JP2021/022770
§ 371 (c)(1),
(2) Date: Nov. 29, 2022

(87) PCT Pub. No.: WO2021/256477
PCT Pub. Date: Dec. 23, 2021

(65) Prior Publication Data
US 2023/0213740 A1    Jul. 6, 2023

(30) Foreign Application Priority Data
Jun. 16, 2020  (JP) ................ 2020-103528

(51) Int. Cl.
  *G02B 13/04*  (2006.01)
  *G02B 13/18*  (2006.01)
  *G02B 15/14*  (2006.01)

(52) U.S. Cl.
  CPC ......... *G02B 15/1425* (2019.08); *G02B 13/04* (2013.01); *G02B 13/18* (2013.01)

(58) Field of Classification Search
  CPC ......... G02B 13/16; G02B 13/18; G02B 15/14
  (Continued)

(56) References Cited

U.S. PATENT DOCUMENTS 6,775,073 B2 * 8/2004 Kamo ................ G02B 17/0848
                                                359/728
7,791,816 B2   9/2010 Cho
(Continued)

FOREIGN PATENT DOCUMENTS

EP    2899581 A1   7/2015
JP    2009192785 A  8/2009
(Continued)

OTHER PUBLICATIONS

Japan Patent Office, International Search Report (with partial English translation), International Application No. PCT/JP2021/022770, 5 pages, Aug. 31, 2021.
(Continued)

*Primary Examiner* — Zachary W Wilkes
*Assistant Examiner* — Elizabeth M Hall
(74) *Attorney, Agent, or Firm* — THOMPSON HINE LLP

(57) ABSTRACT

An optical system includes a first optical subsystem disposed on an enlargement side and a second optical subsystem disposed on a reduction side with an intermediate image in between. The first optical subsystem includes: a first lens group that is disposed on the enlargement side of a first stop with a first distance, in which other lenses could be disposed but no other lenses are disposed, and is provided on the enlargement side with a first component with negative refractive power; and a second lens group that has positive refractive power, is disposed on the reduction side of the first stop with a second distance, in which other lenses could be disposed but no lenses are disposed, and forms the intermediate image so as to be adjacent on a reduction side of the second lens group and so as to be tilted toward the enlargement side.

23 Claims, 29 Drawing Sheets

(58) Field of Classification Search
USPC .................. 359/691, 686, 649, 650, 651
See application file for complete search history.

(56) References Cited

U.S. PATENT DOCUMENTS

| | | | |
|---|---|---|---|
| 10,048,476 B2 | 8/2018 | Amano | |
| 10,768,397 B2 | 9/2020 | Amano | |
| 10,890,741 B2 | 1/2021 | Amano | |
| 10,890,742 B2 | 1/2021 | Amano | |
| 2009/0207502 A1 | 8/2009 | Cho | |
| 2015/0234157 A1* | 8/2015 | Ichimura | G02B 13/16 359/434 |
| 2016/0246037 A1 | 8/2016 | Amano | |
| 2018/0321475 A1 | 11/2018 | Amano | |
| 2018/0321476 A1 | 11/2018 | Amano | |
| 2019/0011683 A1 | 1/2019 | Amano | |
| 2020/0319434 A1* | 10/2020 | Imaoka | G02B 15/15 |
| 2021/0033831 A1* | 2/2021 | Kurokawa | G02B 15/143105 |
| 2021/0116786 A1* | 4/2021 | Kurokawa | G03B 13/34 |
| 2021/0191239 A1* | 6/2021 | Yanagisawa | G02B 7/026 |
| 2021/0199854 A1* | 7/2021 | Nakano | C01G 35/00 |

FOREIGN PATENT DOCUMENTS

| | | |
|---|---|---|
| JP | 2015152890 A | 8/2015 |
| JP | 2016143032 A | 8/2016 |
| JP | 2016156986 A | 9/2016 |
| WO | 2014/045596 A1 | 3/2014 |
| WO | WO-2020045559 A1 * | 3/2020 |

OTHER PUBLICATIONS

Japan Patent Office, English translation of International Preliminary Report on Patentability, International Application No. PCT/JP2021/022770, 3 pages, May 23, 2022.

* cited by examiner

Fig. 2

| S(No.) | Rdy | Typ | d | H*2 | nd | vd | LENS | GROUP | | FOCUS/ZOOM |
|---|---|---|---|---|---|---|---|---|---|---|
| 0 | Flat | OBJ | 1554.40000 | | | | | | | |
| 1 | 66.74100 | SPH | 4.50000 | 82.00 | 1.729157 | 54.6792 | L11 | | | Fg1 |
| 2 | 33.01900 | SPH | 12.32000 | 59.70 | | | | | | |
| 3 | 121.79400 | *ASP | 4.00000 | 55.00 | 1.595220 | 67.7347 | L12 | G1f | G1 | |
| 4 | 17.14300 | *ASP | 14.45000 | 41.40 | | | | | | Fg2 |
| 5 | -137.73300 | SPH | 2.40000 | 39.70 | 1.438750 | 94.6597 | L13 | | | |
| 6 | 19.03300 | SPH | 16.90000 | 30.20 | | | | | | |
| 7 | 47.47300 | SPH | 6.66000 | 27.10 | 1.910823 | 35.2494 | L14 | | | |
| 8 | -743.55900 | SPH | 2.00000 | 25.10 | | | | | | |
| 9 | Flat | --- | 15.00000 | 22.70 | | | FS11 | | | |
| 10 | Flat | --- | 15.00000 | 18.70 | | | ST1 | | | |
| 11 | Flat | --- | 0.25000 | 27.80 | | | FS12 | | | |
| 12 | 382.15300 | SPH | 6.72000 | 28.10 | 1.729157 | 54.6792 | L21 | | | |
| 13 | -59.80000 | SPH | 0.25000 | 29.70 | | | | | | Fg3 |
| 14 | 135.85600 | SPH | 7.50000 | 30.30 | 1.729157 | 54.6792 | L22 | | G2 | |
| 15 | -57.07400 | SPH | 1.26000 | 30.40 | | | | | | |
| 16 | -41.17800 | SPH | 1.20000 | 30.30 | 1.910823 | 35.2494 | L23 | | | |
| 17 | -106.70100 | SPH | 0.25000 | 30.90 | | | | | | |
| 18 | 34.75200 | SPH | 12.27000 | 31.60 | 1.438750 | 94.6597 | L24 | | | |
| 19 | -32.20000 | SPH | 0.08000 | 30.70 | | | | | | |
| 20 | -31.85000 | SPH | 1.20000 | 30.70 | 1.858956 | 22.7283 | L25 | G2r | | |
| 21 | -264.29100 | SPH | 2.00000 | 31.40 | | | | | | |
| 22 | 29.78400 | *ASP | 9.56000 | 32.50 | 1.438750 | 94.6597 | L26 | | | |
| 23 | -200.00000 | *ASP | 15.08000 | 32.50 | | | | | | |
| 24 | Flat | --- | 20.46000 | 26.90 | | | IM | | | |
| 25 | 200.00000 | *ASP | 10.80000 | 33.30 | 1.550323 | 75.4952 | L31 | | | Fg4 |
| 26 | -31.69100 | *ASP | 4.10000 | 32.80 | | | | | | |
| 27 | -102.14200 | SPH | 1.20000 | 26.80 | 1.438750 | 94.6597 | L32 | G3f | | |
| 28 | 22.64300 | SPH | 9.85000 | 24.40 | | | | | | Fim |
| 29 | -15.48000 | SPH | 1.20000 | 24.40 | 1.438750 | 94.6597 | L33 | | | |
| 30 | -133.10600 | SPH | 0.80000 | 28.40 | | | | | | |
| 31 | -302.10800 | SPH | 1.20000 | 29.50 | 1.858956 | 22.7283 | L34 | | | |
| 32 | 108.25500 | SPH | 0.56000 | 30.90 | | | | | | |
| 33 | 124.67000 | SPH | 9.23000 | 31.60 | 1.729157 | 54.6792 | L35 | | G3 | Zg1 |
| 34 | -42.25600 | SPH | 0.25000 | 34.40 | | | | | | |
| 35 | -2243.78600 | SPH | 7.35000 | 35.90 | 1.729157 | 54.6792 | L36 | | | |
| 36 | -61.72000 | SPH | 36.17000 | 37.00 | | | | | | |
| 37 | 169.51900 | SPH | 5.77000 | 36.70 | 1.910823 | 35.2494 | L37 | | | Zg2 |
| 38 | -923.29700 | SPH | 1.20000 | 36.20 | | | | | | |
| 39 | Flat | --- | 30.00000 | 31.00 | | | FS21 | | | |
| 40 | Flat | --- | 20.00000 | 31.22 | | | ST2 | | | |
| 41 | Flat | --- | 0.30000 | 31.60 | | | FS22 | | | |
| 42 | -446.25100 | SPH | 6.29000 | 31.60 | 1.723420 | 37.9550 | L41 | | | Zg3 |
| 43 | -68.54700 | SPH | 0.17000 | 32.60 | | | | | | |
| 44 | -64.21900 | SPH | 1.20000 | 32.60 | 1.673000 | 38.2555 | L42 | | | |
| 45 | -160.22900 | SPH | 4.23000 | 33.10 | | | | | | |
| 46 | 52.12000 | SPH | 1.20000 | 35.00 | 1.910823 | 35.2494 | L43 | | | |
| 47 | 30.85300 | *SPH | 0.08000 | 34.30 | | | | | | |
| 48 | 31.98100 | *ASP | 16.20000 | 34.30 | 1.438750 | 94.6597 | L44 | | | |
| 49 | -25.64400 | *ASP | 0.08000 | 34.90 | | | | | | |
| 50 | -25.42000 | SPH | 1.20000 | 34.90 | 1.738000 | 32.3261 | L45 | | G4 | Zg4 |
| 51 | 65.86200 | SPH | 0.08000 | 39.50 | | | | | | |
| 52 | 66.93300 | SPH | 16.23000 | 39.60 | 1.438750 | 94.6597 | L46 | | | |
| 53 | -30.65000 | SPH | 0.50000 | 42.70 | | | | | | |
| 54 | -34.01700 | SPH | 1.32000 | 43.00 | 1.788800 | 28.4282 | L47 | | | |
| 55 | -195.96800 | SPH | 0.25000 | 49.00 | | | | | | |
| 56 | -5538.23300 | SPH | 13.45000 | 51.20 | 1.805181 | 25.4249 | L48 | | | |
| 57 | -45.65300 | SPH | 2.00000 | 54.20 | | | | | | |
| 58 | 138.65300 | SPH | 8.13000 | 55.30 | 1.805181 | 25.4249 | L49 | | | Fie |
| 59 | -500.00000 | SPH | 23.00000 | 54.60 | | | | | | |
| 60 | Flat | --- | 92.40000 | 45.70 | 1.516800 | 64.1664 | GLASS BLOCK | | | |
| 61 | Flat | --- | 0.70000 | 23.10 | | | | | | |
| 62 | Flat | IMG | 0.00000 | | | | 5a | | | |

Fig. 3

| S(No.) | Rdy | K | A | B | C | D |
|---|---|---|---|---|---|---|
| 3 | 121.794 | 0.000000 | 1.149300e-005 | -7.241700e-009 | 4.765500e-012 | -0.000000e+000 |
| 4 | 17.143 | -0.807490 | -1.442600e-005 | 6.183800e-008 | -1.202000e-010 | 2.025900e-014 |
| 22 | 29.784 | -0.721030 | -2.208100e-005 | -7.573000e-009 | 2.877100e-011 | -0.000000e+000 |
| 23 | -200.000 | 0.000000 | -2.340000e-005 | 1.561500e-008 | 3.207700e-012 | -0.000000e+000 |
| 25 | 200.000 | 0.000000 | 3.800800e-005 | -8.424400e-008 | 1.128300e-010 | -5.203900e-014 |
| 26 | -31.691 | 0.000000 | 9.546800e-006 | -1.083900e-008 | 2.500400e-011 | -0.000000e+000 |
| 48 | 31.981 | 0.000000 | 1.061500e-006 | 1.754300e-009 | 2.328200e-012 | 1.835300e-015 |
| 49 | -25.644 | 0.000000 | -5.181100e-007 | 7.502500e-010 | 0.000000e+000 | 0.000000e+000 |

Fig. 4

| Z | EFL | Lop | d0 | d2 FOCUS | d8 FOCUS | d23 FOCUS | d26 FOCUS | d30 ZOOM | d36 ZOOM | d38 ZOOM | d45 ZOOM | d57 ZOOM |
|---|---|---|---|---|---|---|---|---|---|---|---|---|
| 1 | -6.767 | 500.000 | 1554.400 | 12.320 | 2.000 | 15.080 | 4.100 | 0.800 | 36.170 | 1.200 | 4.230 | 2.000 |
| 2 | -7.782 | 500.000 | 1554.400 | 12.320 | 2.000 | 15.080 | 4.100 | 1.764 | 16.778 | 8.687 | 4.216 | 12.955 |
| 3 | -8.600 | 500.000 | 1554.400 | 12.320 | 2.000 | 15.080 | 4.100 | 2.465 | 0.805 | 17.718 | 1.262 | 22.150 |
| 4 | -6.648 | 500.000 | 6000.000 | 13.605 | 2.617 | 14.922 | 4.517 | 0.800 | 36.170 | 1.200 | 4.230 | 2.000 |
| 5 | -7.645 | 500.000 | 6000.000 | 13.605 | 2.617 | 14.922 | 4.517 | 1.764 | 16.778 | 8.687 | 4.216 | 12.955 |
| 6 | -8.448 | 500.000 | 6000.000 | 13.605 | 2.617 | 14.922 | 4.517 | 2.465 | 0.805 | 17.718 | 1.262 | 22.150 |

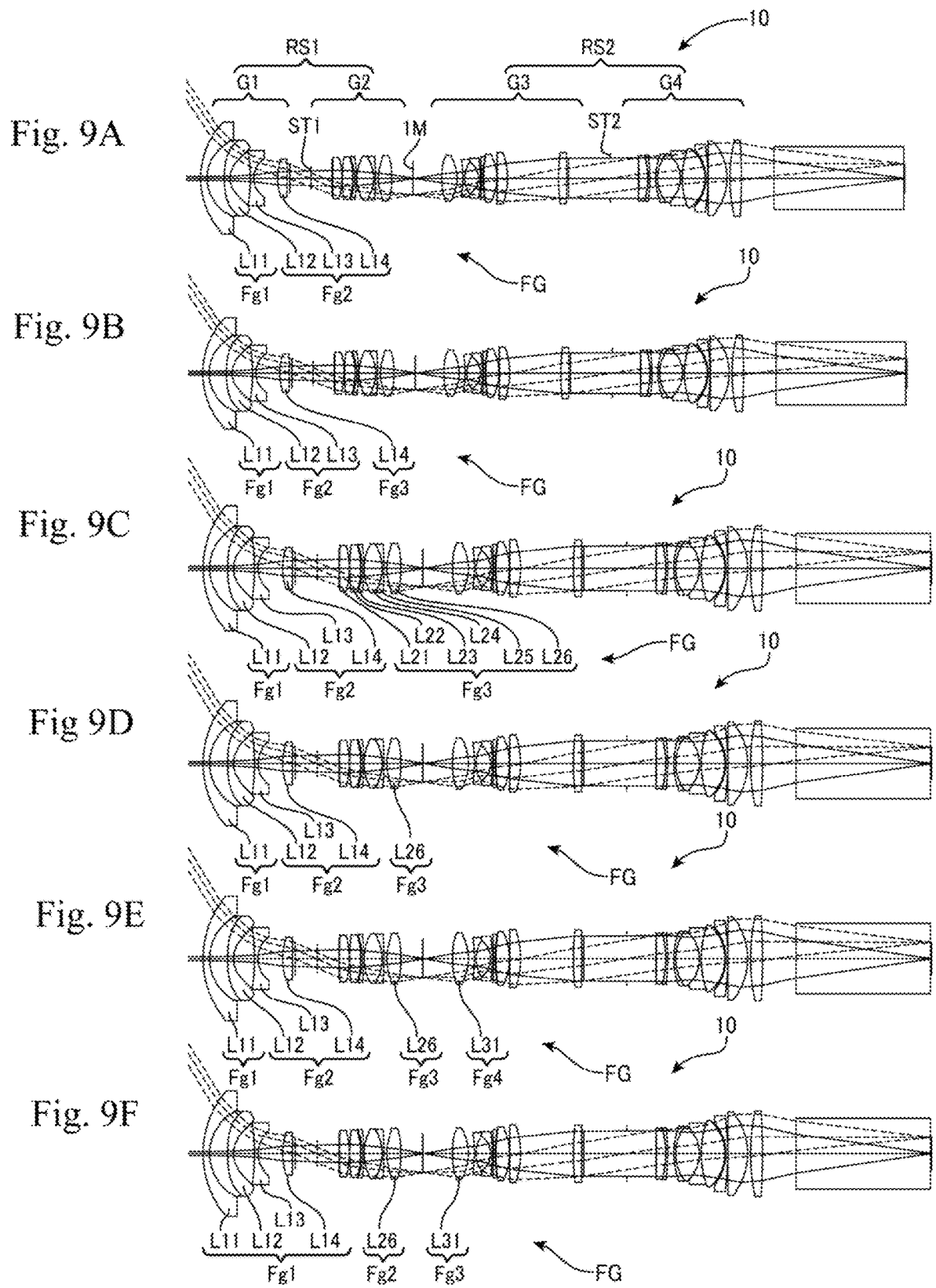

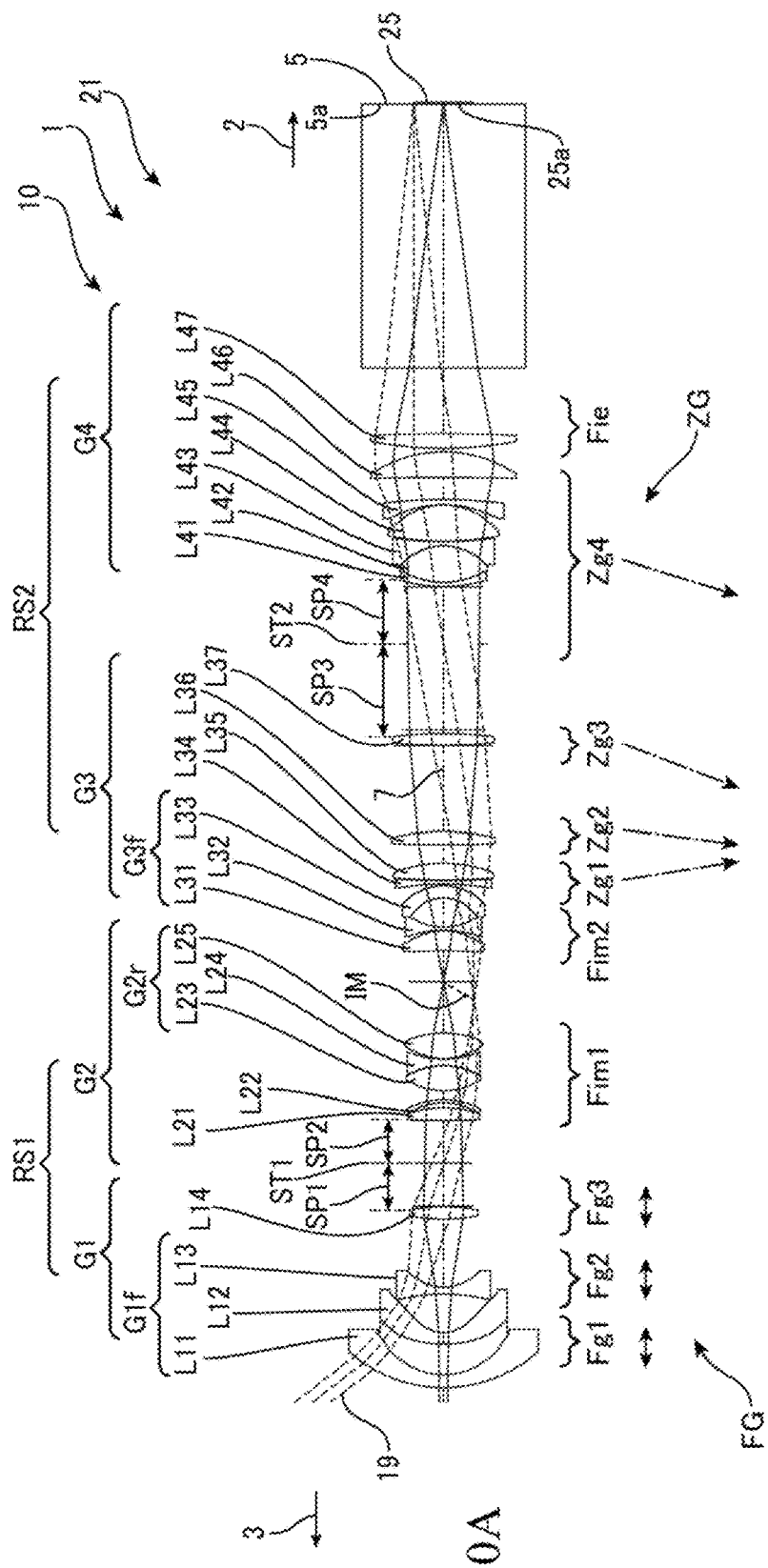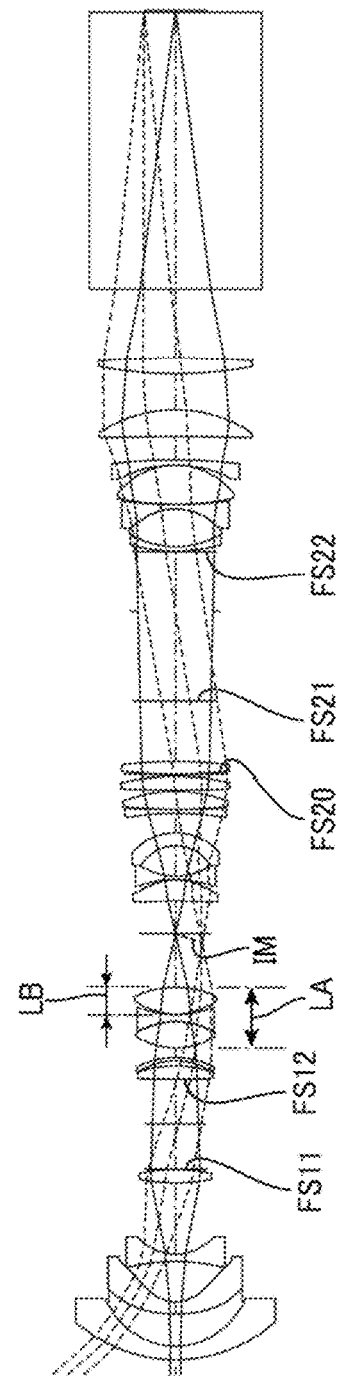
Fig. 10A
Fig. 10B

Fig. 11

| S(No.) | Rdy | Typ | d | H*2 | nd | vd | LENS | GROUP | | FOCUS/ZOOM |
|---|---|---|---|---|---|---|---|---|---|---|
| 0 | Flat | OBJ | 3400.00000 | | | | | | | |
| 1 | 117.11600 | SPH | 9.00000 | 139.20 | 1.729157 | 54.6792 | L11 | | | Fg1 |
| 2 | 56.69000 | SPH | 21.35000 | 101.70 | | | | | | |
| 3 | 110.63200 | *ASP | 8.00000 | 92.50 | 1.516100 | 63.3252 | L12 | G1f | | |
| 4 | 24.78700 | *ASP | 26.93000 | 69.20 | | | | | | Fg2 |
| 5 | -154.57100 | SPH | 4.80000 | 67.80 | 1.438750 | 94.6597 | L13 | | G1 | |
| 6 | 38.15700 | SPH | 47.84000 | 54.80 | | | | | | |
| 7 | 147.92200 | SPH | 8.90000 | 49.20 | 1.910823 | 35.2494 | L14 | | | Fg3 |
| 8 | -126.83500 | SPH | 0.25000 | 48.20 | | | | | | |
| 9 | Flat | — | 30.00000 | 45.60 | | | FS11 | | | |
| 10 | Flat | — | 30.00000 | 43.90 | | | ST1 | | | |
| 11 | Flat | — | 0.25000 | 50.60 | | | FS12 | | | |
| 12 | 656.64100 | SPH | 8.81000 | 50.80 | 1.729157 | 54.6792 | L21 | | | |
| 13 | -88.88200 | SPH | 3.36000 | 51.40 | | | | | | |
| 14 | -51.97400 | SPH | 2.20000 | 51.30 | 1.910823 | 35.2494 | L22 | | G2 | |
| 15 | -64.51100 | SPH | 5.96000 | 52.70 | | | | | | |
| 16 | 57.11000 | SPH | 17.28000 | 53.60 | 1.438750 | 94.6597 | L23 | | | Fim1 |
| 17 | -58.14800 | SPH | 0.25000 | 52.40 | | | | | | |
| 18 | -58.59100 | SPH | 4.40000 | 52.00 | 1.846660 | 23.7775 | L24 | G2r | | |
| 19 | 72.68400 | SPH | 0.25000 | 52.50 | | | | | | |
| 20 | 41.03100 | *ASP | 18.34000 | 55.70 | 1.595220 | 67.7347 | L25 | | | |
| 21 | -83.69100 | *ASP | 35.80000 | 56.50 | | | | | | |
| 22 | Flat | — | 22.07000 | 51.60 | | | IM | | | |
| 23 | -102.46400 | *ASP | 14.05000 | 57.80 | 1.808350 | 40.5479 | L31 | | | |
| 24 | -42.64600 | *ASP | 0.25000 | 58.40 | | | | | | |
| 25 | -86.32900 | SPH | 2.20000 | 54.80 | 1.438750 | 94.6597 | L32 | G3f | | Fim2 |
| 26 | 49.33500 | SPH | 20.29000 | 50.90 | | | | | | |
| 27 | -31.10300 | SPH | 8.54000 | 50.90 | 1.438750 | 94.6597 | L33 | | | |
| 28 | -45.20600 | SPH | 1.20000 | 59.20 | | | | | | |
| 29 | -221.93200 | SPH | 2.40000 | 67.10 | 1.858956 | 22.7283 | L34 | | | |
| 30 | 656.33700 | SPH | 0.25000 | 69.60 | | | | | | Zg1 |
| 31 | 428.94300 | SPH | 11.84000 | 70.30 | 1.729157 | 54.6792 | L35 | | G3 | |
| 32 | -113.80300 | SPH | 13.18000 | 72.30 | | | | | | |
| 33 | 1117.79900 | SPH | 9.15000 | 74.40 | 1.729157 | 54.6792 | L36 | | | Zg2 |
| 34 | -178.18000 | SPH | 60.07000 | 75.00 | | | | | | |
| 35 | Flat | — | 0.00000 | 74.50 | | | FS20 | | | Zg3 |
| 36 | 366.39100 | SPH | 8.44000 | 74.00 | 1.518600 | 69.8898 | L37 | | | |
| 37 | -340.78500 | SPH | 2.70000 | 73.70 | | | | | | |
| 38 | Flat | — | 60.00000 | 61.30 | | | FS21 | | | |
| 39 | Flat | — | 40.00000 | 54.00 | | | ST2 | | | |
| 40 | Flat | — | 0.44000 | 60.00 | | | FS22 | | | |
| 41 | 132.33600 | SPH | 2.80000 | 60.80 | 1.910823 | 35.2494 | L41 | | | Zg4 |
| 42 | 67.93500 | SPH | 0.08000 | 62.10 | | | | | | |
| 43 | 67.57400 | *ASP | 25.00000 | 61.70 | 1.438750 | 94.6597 | L42 | | | |
| 44 | -44.78100 | *ASP | 0.12000 | 63.50 | | | | | | |
| 45 | -45.74300 | SPH | 2.80000 | 63.70 | 1.738000 | 32.3261 | L43 | | | |
| 46 | 291.78200 | SPH | 0.25000 | 73.90 | | | | | G4 | |
| 47 | 218.70200 | SPH | 25.67000 | 75.60 | 1.438750 | 94.6597 | L44 | | | |
| 48 | -56.72300 | SPH | 0.25000 | 80.10 | | | | | | |
| 49 | -92.24600 | SPH | 3.60000 | 82.10 | 1.788800 | 28.4282 | L45 | | | |
| 50 | -405.28900 | SPH | 15.46000 | 88.30 | | | | | | |
| 51 | -1958.80500 | SPH | 17.85000 | 103.90 | 1.805181 | 25.4249 | L46 | | | |
| 52 | -107.19500 | SPH | 2.50000 | 106.20 | | | | | | |
| 53 | 322.64600 | SPH | 10.38000 | 106.50 | 1.805181 | 25.4249 | L47 | | | Fie |
| 54 | -1000.00000 | SPH | 46.00000 | 105.80 | | | | | | |
| 55 | Flat | — | 184.80000 | 120.00 | 1.516800 | 64.1664 | GLASS BLOCK | | | |
| 56 | Flat | — | 1.40000 | 120.00 | | | | | | |
| 57 | Flat | IMG | 0.00000 | | | | 5a | | | |

Fig. 12

| S(No.) | Rdy | K | A | B | C | D |
|---|---|---|---|---|---|---|
| 3 | 110.632 | 0.000000 | 1.149600e-006 | -1.449900e-010 | 5.766000e-014 | 0.000000e+000 |
| 4 | 24.787 | -0.643950 | -3.668300e-006 | 2.161600e-010 | -7.371400e-013 | -1.003900e-015 |
| 20 | 41.031 | -0.985250 | -2.084800e-006 | 1.246300e-010 | -6.531300e-014 | 0.000000e+000 |
| 21 | -83.691 | 0.000000 | -1.001300e-006 | 2.936400e-010 | -2.195200e-013 | 0.000000e+000 |
| 23 | -102.464 | 0.000000 | 7.765900e-006 | -5.281300e-009 | 2.421800e-012 | -6.039400e-016 |
| 24 | -42.646 | 0.000000 | 3.289300e-006 | 2.088300e-010 | 3.531500e-013 | 0.000000e+000 |
| 43 | 67.574 | 0.000000 | -9.180900e-008 | 1.626800e-011 | -4.570900e-014 | 2.752300e-018 |
| 44 | -44.781 | 0.000000 | 3.864000e-007 | 9.341500e-011 | 0.000000e+000 | 0.000000e+000 |

Fig. 13

| Z | EFL | Lop | d0 | d2 FOCUS | d6 FOCUS | d8 FOCUS | d28 ZOOM | d32 ZOOM | d34 ZOOM | d37 ZOOM | d40 ZOOM | d52 ZOOM |
|---|---|---|---|---|---|---|---|---|---|---|---|---|
| 1 | -15.872 | 900.000 | 3400.000 | 21.350 | 47.840 | 0.250 | 1.200 | 13.180 | 60.070 | 2.700 | 0.440 | 2.500 |
| 2 | -18.253 | 900.000 | 3400.000 | 21.350 | 47.840 | 0.250 | 10.717 | 3.128 | 18.309 | 29.935 | 1.000 | 17.002 |
| 3 | -19.205 | 900.000 | 3400.000 | 21.350 | 47.840 | 0.250 | 13.022 | 1.200 | 1.200 | 40.129 | 0.452 | 24.087 |
| 4 | -15.800 | 900.000 | 1.2000e+004 | 22.813 | 47.733 | 0.811 | 1.200 | 13.180 | 60.070 | 2.700 | 0.440 | 2.500 |
| 5 | -18.169 | 900.000 | 1.2000e+004 | 22.813 | 47.733 | 0.811 | 10.717 | 3.128 | 18.309 | 29.935 | 1.000 | 17.002 |
| 6 | -19.117 | 900.000 | 1.2000e+004 | 22.813 | 47.733 | 0.811 | 13.022 | 1.200 | 1.200 | 40.129 | 0.452 | 24.087 |

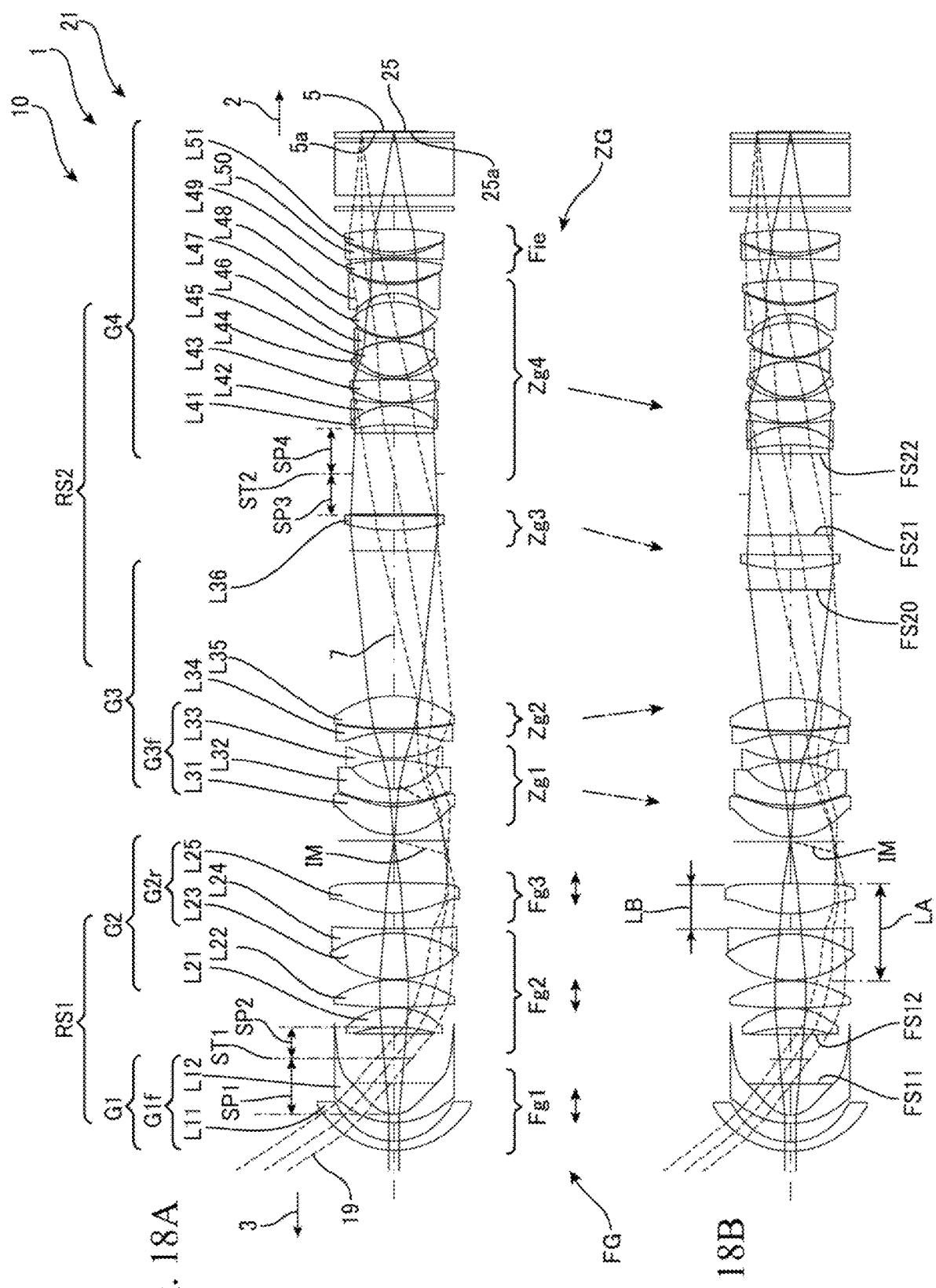

Fig. 19

| S(No) | Rdy | Typ | d | H*2 | nd | vd | LENS | GROUP | | | FOCUS/ZOOM |
|---|---|---|---|---|---|---|---|---|---|---|---|
| 0 | Flat | OBJ | 1625.00000 | | | | | | | | |
| 1 | 49.42700 | SPH | 4.50000 | 77.90 | 1.953750 | 32.3242 | L11 | G1f | G1 | | Fg1 |
| 2 | 35.42300 | SPH | 9.03000 | 63.00 | | | | | | | |
| 3 | 46.52700 | *ASP | 4.00000 | 60.40 | 1.537750 | 74.7020 | L12 | | | | |
| 4 | 14.33700 | *ASP | 15.48000 | 45.10 | | | | | | | |
| 5 | Flat | — | 12.00000 | 44.90 | | | FS11 | | | | Fg2 |
| 6 | Flat | — | 12.00000 | 20.90 | | | ST1 | | | | |
| 7 | Flat | — | 3.28000 | 41.50 | | | FS12 | | | | |
| 8 | -78.99600 | SPH | 9.51000 | 42.30 | 1.729157 | 54.6792 | L21 | | G2 | | |
| 9 | -40.09100 | SPH | 0.35000 | 48.00 | | | | | | | |
| 10 | 304.41700 | SPH | 13.18000 | 58.40 | 1.595220 | 67.7347 | L22 | | | | |
| 11 | -64.24000 | SPH | 0.35000 | 60.80 | | | | | | | |
| 12 | 53.74900 | SPH | 22.44000 | 64.60 | 1.438750 | 94.6597 | L23 | G2r | | | |
| 13 | -66.32700 | SPH | 0.12000 | 63.00 | | | | | | | |
| 14 | -65.72900 | SPH | 2.20000 | 63.00 | 1.892860 | 20.3614 | L24 | | | | |
| 15 | 718.69900 | SPH | 8.08000 | 63.10 | | | | | | | |
| 16 | 54.02100 | *ASP | 14.66000 | 65.20 | 1.808350 | 40.5479 | L25 | | | | Fg3 |
| 17 | -513.30900 | *ASP | 20.75000 | 65.40 | | | | | | | |
| 18 | Flat | — | 3.00000 | 59.20 | | | IM | | | | |
| 19 | 44.53300 | *ASP | 13.57000 | 61.00 | 1.808350 | 40.5479 | L31 | | | | Zg1 |
| 20 | 43.18300 | *ASP | 1.75000 | 56.70 | | | | | | | |
| 21 | 79.53200 | SPH | 6.94000 | 56.40 | 1.892860 | 20.3614 | L32 | G3f | | | |
| 22 | 30.17700 | SPH | 14.07000 | 45.60 | | | | | | | |
| 23 | -71.42500 | SPH | 1.20000 | 45.60 | 1.438750 | 94.6597 | L33 | | | | |
| 24 | 58.71100 | SPH | 12.67000 | 48.40 | | | | | G3 | | |
| 25 | -77.83100 | SPH | 1.20000 | 51.50 | 1.438750 | 94.6597 | L34 | | | | Zg2 |
| 26 | 203.84400 | SPH | 0.35000 | 58.70 | | | | | | | |
| 27 | 190.71700 | SPH | 16.06000 | 59.70 | 1.950000 | 29.3656 | L35 | | | | |
| 28 | -56.36400 | SPH | 71.33000 | 60.50 | | | | | | | |
| 29 | Flat | — | 10.00000 | 47.30 | | | FS20 | | | | |
| 30 | 114.01200 | SPH | 6.90000 | 49.60 | 1.910823 | 35.2494 | L36 | | | | Zg3 |
| 31 | 863.24100 | SPH | 0.80000 | 49.00 | | | | | | | |
| 32 | Flat | — | 20.00000 | 48.40 | | | FS21 | | | | |
| 33 | Flat | — | 20.00000 | 44.70 | | | ST2 | | | | |
| 34 | Flat | — | 4.33000 | 42.70 | | | FS22 | | | | |
| 35 | -115.56800 | SPH | 9.24000 | 42.50 | 1.729157 | 54.6792 | L41 | | | | |
| 36 | -37.42000 | SPH | 0.12000 | 42.90 | | | | | | | |
| 37 | -36.98600 | SPH | 1.20000 | 42.90 | 1.673000 | 38.2555 | L42 | | | | |
| 38 | 149.90900 | SPH | 0.35000 | 43.40 | | | | | | | |
| 39 | 45.49100 | SPH | 11.03000 | 44.30 | 1.729157 | 54.6792 | L43 | | | | Zg4 |
| 40 | -355.67600 | SPH | 0.35000 | 44.40 | | | | | | | |
| 41 | 40.65000 | SPH | 1.20000 | 42.90 | 1.910823 | 35.2494 | L44 | | G4 | | |
| 42 | 27.98300 | SPH | 0.12000 | 40.60 | | | | | | | |
| 43 | 27.75900 | *ASP | 17.15000 | 40.30 | 1.438750 | 94.6597 | L45 | | | | |
| 44 | -40.11500 | *ASP | 0.28000 | 39.10 | | | | | | | |
| 45 | -40.19300 | SPH | 1.20000 | 39.40 | 1.761821 | 26.5174 | L46 | | | | |
| 46 | 42.92300 | SPH | 0.50000 | 39.70 | | | | | | | |
| 47 | 35.79800 | SPH | 17.24000 | 42.50 | 1.438750 | 94.6597 | L47 | | | | |
| 48 | -37.09400 | SPH | 4.27000 | 42.80 | | | | | | | |
| 49 | -30.31900 | SPH | 4.28000 | 40.60 | 1.595509 | 39.2416 | L48 | | | | |
| 50 | 51.60800 | SPH | 1.00000 | 45.40 | | | | | | | |
| 51 | 59.12800 | SPH | 11.22000 | 46.60 | 1.892860 | 20.3614 | L49 | | | | |
| 52 | -144.54000 | SPH | 0.80000 | 47.70 | | | | | | | |
| 53 | -472.43600 | SPH | 1.20000 | 48.20 | 1.487490 | 70.2353 | L50 | | | | Fie |
| 54 | 50.08500 | SPH | 1.85000 | 49.20 | | | | | | | |
| 55 | 64.12800 | SPH | 11.32000 | 49.60 | 1.892860 | 20.3614 | L51 | | | | |
| 56 | -161.11100 | SPH | 9.00000 | 49.40 | | | | | | | |
| 57 | Flat | — | 2.00000 | 60.00 | 1.516800 | 64.1664 | FILTER | | | | |
| 58 | Flat | — | 5.50000 | 60.00 | | | | | | | |
| 59 | Flat | — | 26.00000 | 60.00 | 1.516800 | 64.1664 | GLASS BLOCK | | | | |
| 60 | Flat | — | 2.00000 | 60.00 | | | | | | | |
| 61 | Flat | — | 2.99720 | 60.00 | 1.471400 | 59.9991 | FILTER | | | | |
| 62 | Flat | — | 0.48260 | 60.00 | | | | | | | |
| 63 | Flat | IMG | 0.00000 | | | | 5a | | | | |

Fig. 20

| S(No.) | Rdy | K | A | B | C | D |
|---|---|---|---|---|---|---|
| 3 | 46.527 | 0.000000 | 1.662200e-006 | -6.285300e-010 | -1.137800e-012 | 0.000000e+000 |
| 4 | 14.337 | -1.004200 | -6.764000e-006 | 4.066100e-008 | -1.667100e-010 | 1.300700e-013 |
| 16 | 54.021 | 0.769130 | -2.163600e-006 | -1.217300e-009 | -1.259700e-012 | 0.000000e+000 |
| 17 | -513.309 | 0.000000 | 2.652200e-006 | -3.553100e-009 | 4.778900e-013 | 0.000000e+000 |
| 19 | 44.533 | 0.000000 | 6.685500e-006 | -1.120400e-008 | 1.137900e-011 | -5.405700e-015 |
| 20 | 43.183 | 0.000000 | -8.805900e-006 | 4.779500e-009 | -3.670600e-012 | 0.000000e+000 |
| 43 | 27.759 | -0.083491 | -4.417300e-008 | 6.826300e-011 | -1.102500e-013 | -8.941600e-016 |
| 44 | -40.115 | 0.000000 | 2.909800e-006 | -2.862100e-009 | 0.000000e+000 | 0.000000e+000 |

Fig. 21A

| Z | EFL | Lop | d0 | d18 ZOOM | d24 ZOOM | d28 ZOOM | d31 ZOOM | d52 ZOOM |
|---|---|---|---|---|---|---|---|---|
| 1 | -10.579 | 500.000 | 1625.000 | 3.000 | 12.670 | 71.330 | 0.800 | 0.800 |
| 2 | -11.637 | 500.000 | 1625.000 | 2.740 | 12.680 | 60.570 | 6.480 | 6.130 |
| 3 | -12.483 | 500.000 | 1625.000 | 2.260 | 12.750 | 53.380 | 9.750 | 10.460 |

Fig. 21B

| Z | EFL | d0 | d4 | d15 | d17 |
|---|---|---|---|---|---|
| 10 | -10.579 | 1625.000 | 15.480 | 8.080 | 20.750 |
| 20 | -10.591 | 3000.000 | 15.392 | 7.931 | 20.735 |

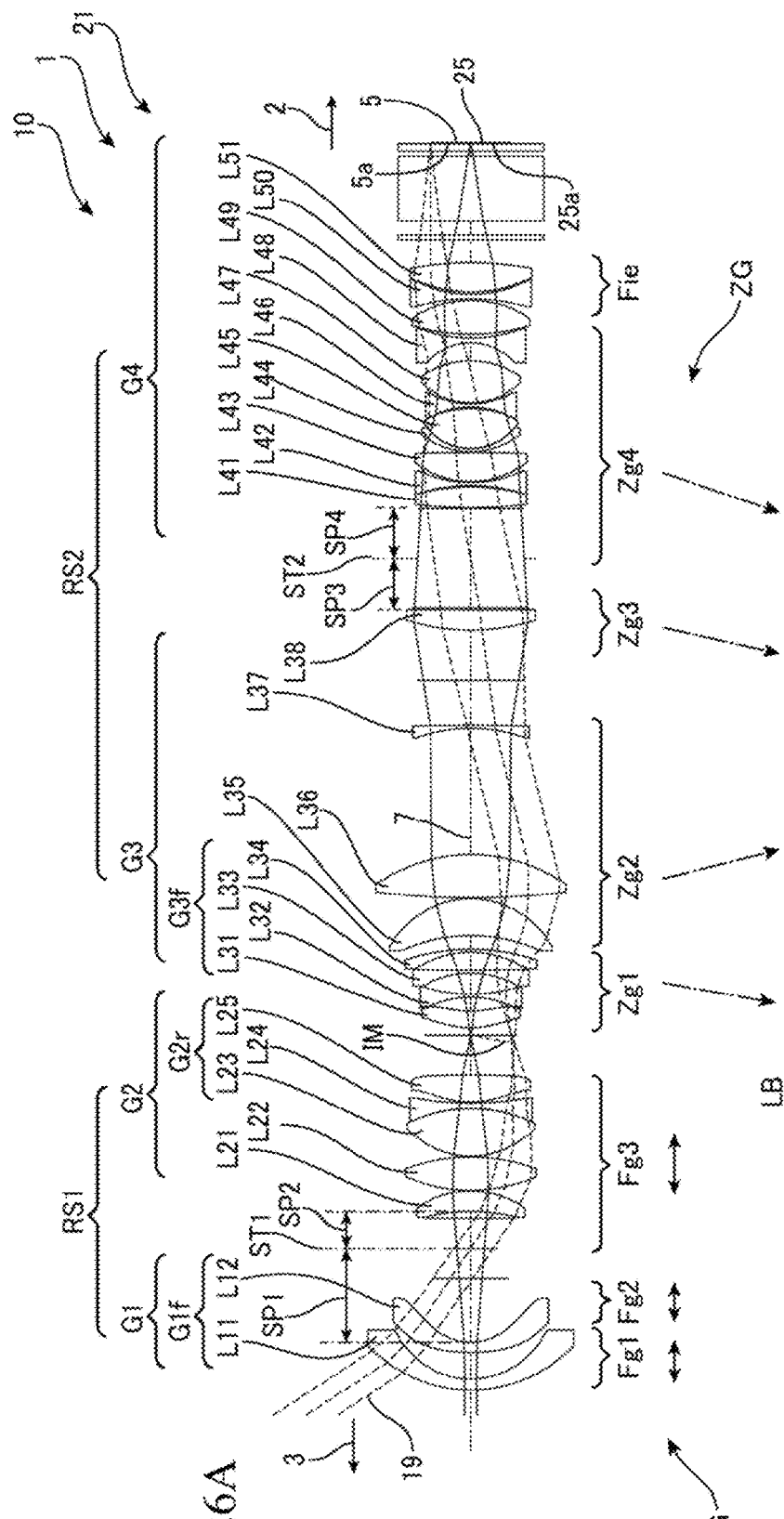
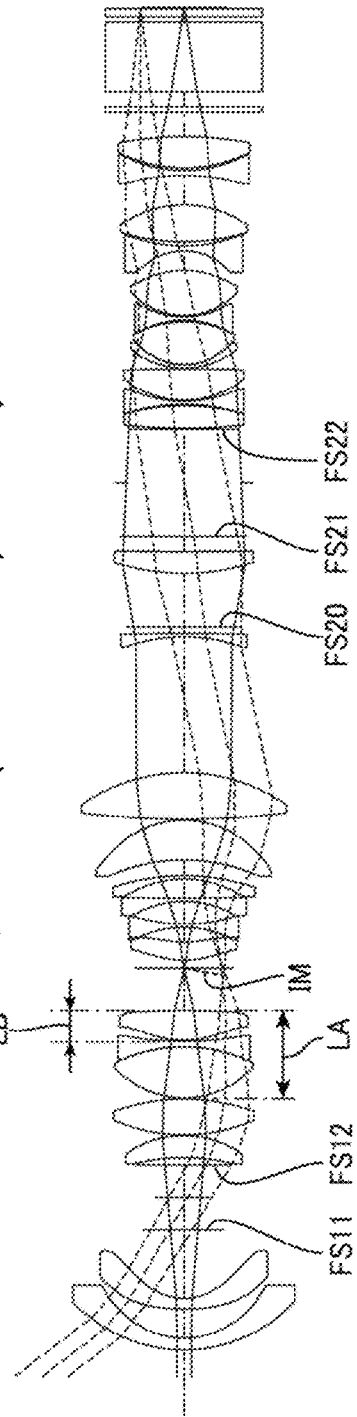
Fig. 26A
Fig. 26B

Fig. 27

| S(No.) | Rdy | Typ | d | H*2 | nd | vd | LENS | GROUP | | FOCUS | ZOOM |
|---|---|---|---|---|---|---|---|---|---|---|---|
| 0 | Flat | OBJ | 1625.00000 | | | | | | | | |
| 1 | 64.70000 | SPH | 4.50000 | 85.50 | 1.953750 | 32.3242 | L11 | G1f | G1 | | Fg1 |
| 2 | 37.81300 | SPH | 10.75000 | 66.30 | | | | | | | |
| 3 | 96.30200 | *ASP | 4.00000 | 64.10 | 1.595220 | 67.7347 | L12 | | | | Fg2 |
| 4 | 23.09200 | *ASP | 25.60000 | 51.00 | | | | | | | |
| 5 | Flat | — | 12.00000 | 33.00 | | | FS11 | | | | |
| 6 | Flat | — | 12.00000 | 23.00 | | | ST1 | | | | |
| 7 | Flat | — | 2.66000 | 38.90 | | | FS12 | | | | |
| 8 | -88.82100 | SPH | 8.23000 | 39.80 | 1.729157 | 54.6792 | L21 | | | | |
| 9 | -43.70300 | SPH | 0.35000 | 44.10 | | | | | | | |
| 10 | 75.65600 | SPH | 13.38000 | 52.70 | 1.595220 | 67.7347 | L22 | | G2 | | Fg3 |
| 11 | -87.85200 | SPH | 0.35000 | 53.50 | | | | | | | |
| 12 | 40.56200 | SPH | 18.88000 | 52.70 | 1.438750 | 94.6597 | L23 | | | | |
| 13 | -68.22100 | SPH | 0.12000 | 50.40 | | | | G2r | | | |
| 14 | -67.10500 | SPH | 2.20000 | 50.30 | 1.892860 | 20.3614 | L24 | | | | |
| 15 | 142.28000 | SPH | 0.47000 | 48.80 | | | | | | | |
| 16 | 42.33200 | *ASP | 11.03000 | 48.10 | 1.808350 | 40.5479 | L25 | | | | |
| 17 | -232.79600 | *ASP | 15.73000 | 48.70 | | | | | | | |
| 18 | Flat | — | 3.00000 | 39.60 | | | IM | | | | |
| 19 | 36.39400 | *ASP | 6.70000 | 40.10 | 1.808350 | 40.5479 | L31 | | | | |
| 20 | 36.07600 | *ASP | 5.61000 | 38.90 | | | | | | | |
| 21 | -44.51400 | SPH | 1.20000 | 39.60 | 1.595220 | 67.7347 | L32 | G3F | | | Zg1 |
| 22 | 75.06200 | SPH | 8.49000 | 41.40 | | | | | | | |
| 23 | -43.62100 | SPH | 1.20000 | 41.70 | 1.595220 | 67.7347 | L33 | | | | |
| 24 | 1546.60900 | SPH | 7.09000 | 47.40 | | | | | G3 | | |
| 25 | -47.24200 | SPH | 1.20000 | 48.10 | 1.438750 | 94.6597 | L34 | | | | |
| 26 | -97.80200 | SPH | 5.45000 | 54.10 | | | | | | | |
| 27 | -78.88000 | SPH | 14.73000 | 60.80 | 1.953750 | 32.3242 | L35 | | | | |
| 28 | -42.47900 | SPH | 0.35000 | 67.10 | | | | | | | Zg2 |
| 29 | 357.53500 | SPH | 17.37000 | 77.80 | 1.743997 | 44.7857 | L36 | | | | |
| 30 | -77.31800 | SPH | 50.65000 | 78.80 | | | | | | | |
| 31 | -76.08100 | SPH | 1.20000 | 47.80 | 1.738000 | 32.3261 | L37 | | | | |
| 32 | -1050.32300 | SPH | 18.06000 | 47.80 | | | | | | | |
| 33 | Flat | — | 20.00000 | 46.50 | | | FS20 | | | | Zg3 |
| 34 | 99.49200 | SPH | 8.05000 | 53.00 | 1.910823 | 35.2494 | L38 | | | | |
| 35 | 3919.76000 | SPH | 0.80000 | 52.40 | | | | | | | |
| 36 | Flat | — | 20.00000 | 51.00 | | | FS21 | | | | |
| 37 | Flat | — | 20.00000 | 46.50 | | | ST2 | | | | |
| 38 | Flat | — | 0.35000 | 45.00 | | | FS22 | | | | |
| 39 | 231.16400 | SPH | 9.39000 | 45.00 | 1.729157 | 54.6792 | L41 | | | | |
| 40 | -97.37200 | SPH | 0.55000 | 45.40 | | | | | | | |
| 41 | -91.67200 | SPH | 1.20000 | 45.40 | 1.673000 | 38.2555 | L42 | | | | |
| 42 | 57.47100 | SPH | 0.35000 | 44.60 | | | | | | | |
| 43 | 41.81200 | SPH | 11.59000 | 45.70 | 1.729157 | 54.6792 | L43 | | | | |
| 44 | -715.72500 | SPH | 0.35000 | 44.30 | | | | | | | |
| 45 | 36.89100 | SPH | 1.20000 | 40.00 | 1.910823 | 35.2494 | L44 | | | | |
| 46 | 26.37400 | SPH | 0.12000 | 38.20 | | | | | | | |
| 47 | 26.34400 | *ASP | 15.78000 | 37.80 | 1.438750 | 94.6597 | L45 | | | | |
| 48 | -50.10600 | *ASP | 0.67000 | 36.50 | | | | | | | |
| 49 | -40.54200 | SPH | 1.20000 | 36.90 | 1.778300 | 23.9112 | L46 | | | | Zg4 |
| 50 | 37.49400 | SPH | 0.50000 | 36.80 | | | | | | | |
| 51 | 31.34900 | SPH | 16.90000 | 40.00 | 1.438750 | 94.6597 | L47 | | | | |
| 52 | -40.30200 | SPH | 7.21000 | 40.20 | | | | | | | |
| 53 | -26.63800 | SPH | 1.80000 | 38.00 | 1.672700 | 32.0987 | L48 | | | | |
| 54 | 66.35200 | SPH | 1.58000 | 44.80 | | | | | G4 | | |
| 55 | 96.64500 | SPH | 13.70000 | 45.80 | 1.892860 | 20.3614 | L49 | | | | |
| 56 | -47.52400 | SPH | 0.80000 | 48.20 | | | | | | | |
| 57 | -83.28700 | SPH | 1.80000 | 47.80 | 1.487490 | 70.2353 | L50 | | | | |
| 58 | 56.83600 | SPH | 0.95000 | 49.70 | | | | | | | Fie |
| 59 | 63.40100 | SPH | 11.68000 | 50.00 | 1.892860 | 20.3614 | L51 | | | | |
| 60 | -152.26100 | SPH | 9.00000 | 49.90 | | | | | | | |
| 61 | Flat | — | 2.00000 | 60.00 | 1.516800 | 64.1664 | FILTER | | | | |
| 62 | Flat | — | 5.50000 | 60.00 | | | | | | | |
| 63 | Flat | — | 26.00000 | 60.00 | 1.516800 | 64.1664 | GLASS BLOCK | | | | |
| 64 | Flat | — | 2.00000 | 60.00 | | | | | | | |
| 65 | Flat | — | 2.99720 | 60.00 | 1.471400 | 59.9991 | FILTER | | | | |
| 66 | Flat | — | 0.48260 | 60.00 | | | | | | | |
| 67 | Flat | IMG | 0.00000 | | | | 5a | | | | |

Fig. 28

| S(No.) | Rdy | K | A | B | C | D |
|---|---|---|---|---|---|---|
| 3 | 96.302 | 0.000000 | 5.049400e-006 | -4.054800e-010 | -1.177400e-013 | 0.000000e+000 |
| 4 | 23.092 | -0.649880 | -9.617600e-006 | 3.099200e-008 | -4.429300e-011 | 1.330300e-014 |
| 16 | 42.332 | 1.052700 | -6.120300e-006 | -5.652300e-010 | -1.415100e-011 | 0.000000e+000 |
| 17 | -232.796 | 0.000000 | 1.006900e-005 | -2.246800e-008 | 8.428900e-012 | 0.000000e+000 |
| 19 | 36.394 | 0.000000 | -1.234600e-005 | -4.227600e-008 | 1.702400e-010 | -1.720800e-013 |
| 20 | 36.676 | 0.000000 | -4.311100e-005 | 5.679600e-008 | -3.212800e-011 | 0.000000e+000 |
| 47 | 26.344 | -0.300750 | 1.810800e-006 | 2.112800e-009 | 1.427500e-012 | 2.219800e-015 |
| 48 | -50.106 | 0.000000 | -1.316700e-006 | -3.192400e-009 | 0.000000e+000 | 0.000000e+000 |

Fig. 29A

| Z | EFL | Lop | d0 | d18 ZOOM | d26 ZOOM | d32 ZOOM | d35 ZOOM | d56 ZOOM |
|---|---|---|---|---|---|---|---|---|
| 1 | -10.558 | 500.000 | 1625.000 | 3.000 | 5.450 | 18.060 | 0.800 | 0.800 |
| 2 | -11.614 | 500.000 | 1625.000 | 3.021 | 5.649 | 8.819 | 3.910 | 6.710 |
| 3 | -12.458 | 500.000 | 1625.000 | 2.898 | 5.869 | 2.476 | 5.656 | 11.210 |

Fig. 29B

| Z | EFL | d0 | d2 | d4 | d17 |
|---|---|---|---|---|---|
| 10 | -10.558 | 1625.000 | 10.750 | 25.600 | 15.730 |
| 20 | -10.565 | 3000.000 | 11.036 | 25.442 | 15.692 |

OPTICAL SYSTEM HAVING INTERMEDIATE IMAGE FORMED THEREIN

TECHNICAL FIELD

The present invention relates to an optical system that internally forms an intermediate image.

BACKGROUND ART

Japanese Laid-open Patent Publication No. 2015-152890 discloses a zoom optical system that reforms an image, has a wide angle of view and high optical performance over the entire zoom range, and makes it easy to miniaturize the system as a whole. The zoom optical system is composed, in order from an enlargement conjugate side to a reduction conjugate side, of a first optical system and a second optical system with a zoom function, and has an optical action whereby an enlargement conjugate point on the enlargement conjugate side forms an image at an intermediate image forming position between the first optical system and the second optical system, and the image formed at this intermediate image forming position is reformed at a reduction conjugate point on the reduction conjugate side. The second optical system is composed, in order from the enlargement conjugate side to the reduction conjugate side, of a lens group with positive refractive power, a lens group with positive refractive power, and a lens group with positive refractive power.

SUMMARY OF INVENTION

There is demand for an optical system that internally forms an intermediate image, is more compact, and has a configuration that facilitates correction of various aberrations.

One aspect of the present invention is an optical system including a first optical subsystem disposed on an enlargement side and a second optical subsystem disposed on a reduction side with an intermediate image in between. The first optical subsystem includes: a first lens group that is disposed on the enlargement side of a first stop with a first distance that includes a spacing in which other lenses could be disposed but no other lenses are disposed; and a second lens group that has positive refractive power and is disposed on the reduction side of the first stop with a second distance that includes a spacing in which other lenses could be disposed but no other lenses are disposed. The first lens group includes, on the enlargement side, a first component with negative refractive power. The intermediate image is adjacent on the reduction side of the second lens group, and is formed so as to be tilted toward the enlargement side.

A retrofocus-type system with a negative-positive arrangement of refractive powers where a component with negative refractive power is disposed on the enlargement side (enlargement conjugate side) makes it possible to obtain a telecentric or close to telecentric optical system that is wide angle with a large angle of view on the enlargement side and has a long back focus on the reduction side. On the other hand, the lens diameter on the enlargement side increases and when the optical system with positive refractive power on the reduction side is composed of a plurality of lenses, the difference in diameter between the lenses increases and the spacings become wider. This means that the usage of space by the optical system is inefficient, and it becomes difficult to dispose a plurality of lenses compactly and efficiently.

In the optical system according to the present invention, the first stop is provided in the vicinity of a position, between the first lens group provided with the negative component and the second lens group with positive refractive power, where peripheral light and center light intersect so that the light flux is concentrated. In addition, by providing the first and second distances (spaces), in which it is possible to dispose lenses but in which lenses are not disposed, in front of and to the rear of the first stop, it is possible to reduce the difference in the diameters of the lenses that construct the second lens group with positive refractive power.

In addition, regarding the formation of the intermediate image on the reduction side of the first optical subsystem, the intermediate image is formed so as to be tilted toward the enlargement side. One of aims when designing an optical system is to lower the Petzval sum. In this optical system, the Petzval sum of the first lens group becomes positive, so that the intermediate image tends to be tilted toward the reduction side. For this reason, the tilting of the intermediate image is canceled out by making the Petzval sum of the second lens group negative. When doing so, by setting the Petzval sum of the second lens group in a range where the intermediate image is tilted toward the enlargement side, it becomes possible to adjust the Petzval sum of the second lens group relatively excessively in a direction where the positive refractive power of the second lens group increases. This makes it possible to use a configuration where many lens surfaces are disposed in a narrow space as the second lens group, and possible to provide a wide-angle optical system that makes very efficient use of space, is compact, and also has high aberration correcting performance.

This optical system may be arranged so that the optical axis extends in a straight line. The optical system may also be an optical system that includes one or more bending optical elements, typically mirrors or prisms, that change the direction of the optical axis, so that the optical axis is bent into an L-shape or a U-shape. This optical system may be an optical system for a projector, and another aspect of the present invention is a projector including the optical system described above and a light modulator disposed on the reduction side of the optical system. The optical system may also be an optical system for image pickup and yet another aspect of the present invention is an image pickup apparatus including the optical system described above and an image pickup element disposed on a reduction side of the optical system.

BRIEF DESCRIPTION OF DRAWINGS

FIG. 2 shows lens data of the optical system depicted in FIGS. 1A and 1B.

FIG. 3 shows aspherical surface data of the optical system depicted in FIGS. 1A and 1B.

FIG. 4 shows the distances before front and rear groups that move during focusing and zooming by the optical system depicted in FIGS. 1A and 1B.

FIGS. 9A-9F depict other examples of a focus group.

FIGS. 10A-10B depict another example of an optical system and an apparatus including the optical system.

FIG. 11 shows lens data of the optical system depicted in FIGS. 10A-10B.

FIG. 12 shows aspherical surface data of the optical system depicted in FIGS. 10A-10B.

FIG. 13 shows the distances before front and rear groups that move during focusing and zooming by the optical system depicted in FIGS. 10A-10B.

FIGS. 18A-18B depict another example of an optical system and an apparatus including the optical system.

FIG. 19 shows lens data of the optical system depicted in FIGS. 18A-18B.

FIG. 20 shows aspherical surface data of the optical system depicted in FIGS. 18A-18B.

FIGS. 21A-21B show the distances before front and rear groups that move during focusing and zooming by the optical system depicted in FIGS. 18A-18B.

FIGS. 26A-26B depict another example of an optical system and an apparatus including the optical system.

FIG. 27 shows lens data of the optical system depicted in FIGS. 26A-26B.

FIG. 28 shows aspherical surface data of the optical system depicted in FIGS. 26A-26B.

FIGS. 29A-29B show the distances before front and rear groups that move during focusing and zooming by the optical system depicted in FIGS. 26A-26B.

DESCRIPTION OF EMBODIMENTS

Figures 1A, 1B:
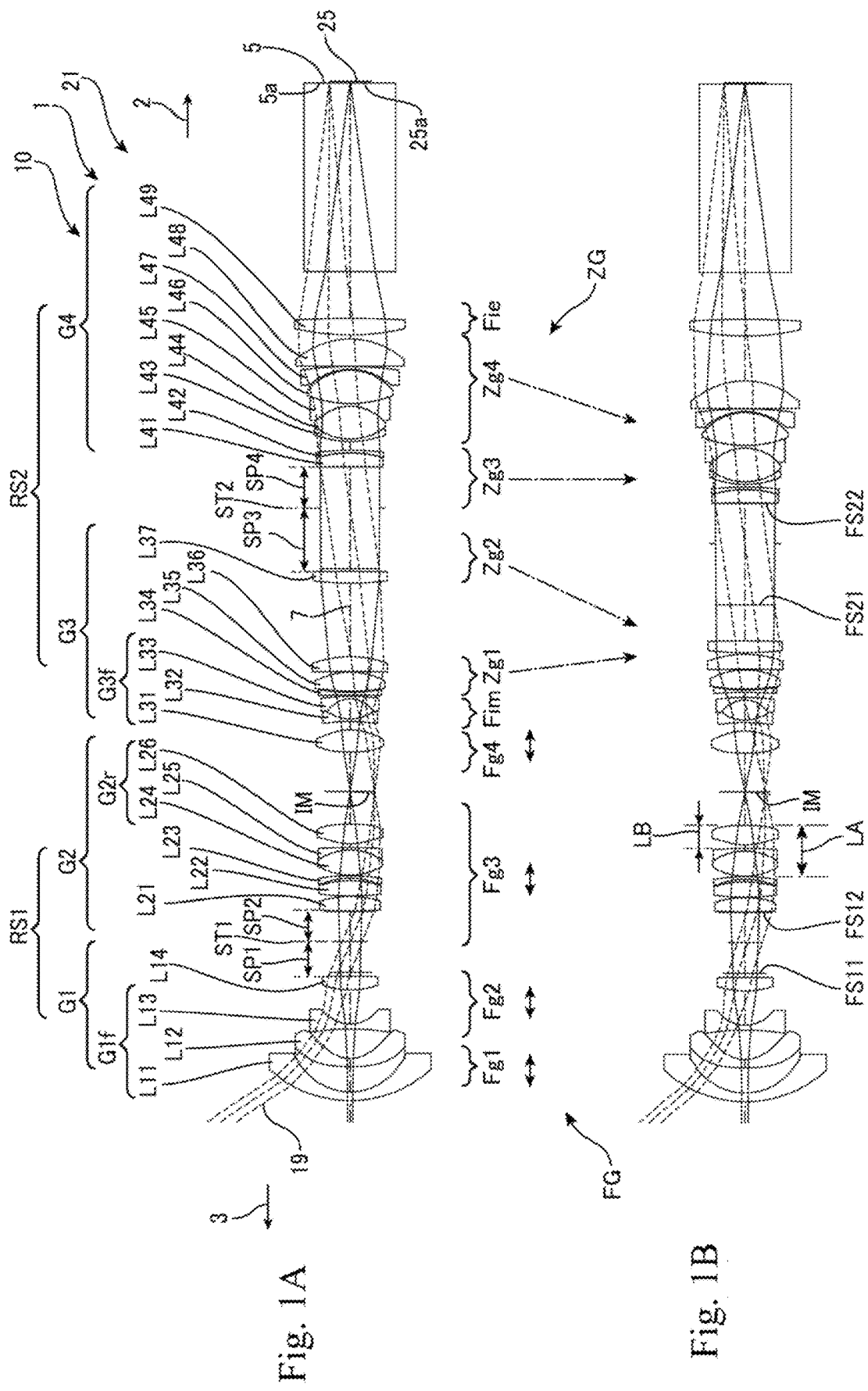
FIGS. 1A and 1B depict an example of an optical system and an apparatus including the optical system.

The present invention will now be described further with reference to the drawings. FIGS. 1A-1B depict an apparatus including an optical system according to an embodiment of the present invention. One example of the apparatus is a projector 1, and includes an optical system 10 and a light modulator (light valve) 5 disposed on a reduction side 2. The projector optical system 10 forms light that is incident from an image plane 5a of the light modulator 5 into an intermediate image IM at a position inside the optical system 10 that is conjugate with the image plane 5a, and outputs the light from an enlargement side 3 as projection light 19 which is projected to a screen or a wall surface (not illustrated) to reform the light into an enlarged image. The light valve 5 may be any device capable of forming an image, such as an LCD, a digital mirror device (DMD), or organic EL, and may use a single-panel arrangement or may use a type of forming images of the respective colors. The light valve 5 may be a light-emitting device or an illuminated device. When the light valve 5 is an illuminated device, the projector 1 may further include an illumination optical system (not illustrated). The screen may be a wall surface, a white board, or the like, and the projector 1 may be a front projector or may be a rear projector and include a screen.

Another example of an apparatus is an image pickup apparatus 21 which includes the optical system 10 and an image pickup element 25 disposed on the reduction side 2. An optical system 10 for an image pickup apparatus forms light that is incident from an enlargement side (object side) 3 into an intermediate image IM at a position conjugate with an image pickup plane 25a of an image pickup element 25, which is the image forming plane on the reduction side, and reforms the light into an image on the image pickup plane 25a. Since the configuration and functions of the optical system 10 are the same regardless of whether the system is an optical system for an image pickup apparatus or an optical system for a projector, in the following description, the projector 1 and the optical system 10 for a projector will be described further as an example.

The optical system 10 includes a first optical subsystem, in the present embodiment, a "first refractive optical system RS1", disposed on the enlargement side 3 and a second optical subsystem, in the present embodiment a "second refractive optical system RS2", disposed on the reduction side 2 with the intermediate image IM in between. The first refractive optical system RS1 and the second refractive optical system RS2 each include a plurality of lenses that compose a plurality of lens groups. In the following description, an example where the respective optical subsystems RS1 and RS2 are composed of a plurality of lenses will be described. The respective optical subsystems RS1 and RS2 may include a mirror or a prism for bending the optical axis, and together with the lenses or in place of a lens, may include a mirror surface with refractive power to refract a light beam.

In the present embodiment, the first refractive optical system RS1 includes: a first lens group G1 that is disposed on the enlargement side (the enlargement conjugate side) 3 of a first stop ST1 at (with) a first distance (first spacing) SP1, in which other lenses could be disposed but no other lenses are disposed, and provided, on the enlargement side 3, with a first component (sub-lens group) G1f that has negative refractive power; and a second lens group G2 with positive refractive power (composite refractive power) that is disposed on the reduction side (reduction conjugate side) 2 of the first stop ST1 at (with) a second distance (second spacing) SP2, in which other lenses could be disposed but no other lenses are disposed. The intermediate image IM is formed adjacent to the reduction side 2 of the second lens group G2. One example of the first lens group G1 is composed of four lenses numbered L11 to L14 and one example of the second lens group G2 is composed of six lenses numbered L21 to L26.

In more detail, one example of the first lens group G1 includes a first sub-lens group G1f including the lenses L11 to L13 in a negative-negative-negative arrangement of refractive powers from the enlargement side 3, and the lens L14 that has positive refractive power. One example of the first lens group G1 includes, in order from the enlargement side 3, negative meniscus lenses L11 and L12 that are convex on the enlargement side 3, a biconcave negative lens L13, and a biconvex positive lens L14. One example of the second lens group G2 includes, from the enlargement side 3, the lenses L21 to L23 in a positive-positive-negative arrangement of refractive powers and the lenses L24 to L26 in a positive-negative-positive arrangement of refractive powers, with the lenses L24 to L26 composing a second component (second sub-lens group) G2r. One example of the second lens group G2 includes, in order from the enlargement side 3, biconvex positive lenses L21 and L22, a negative meniscus lens L23 that is convex on the reduction side 2, a biconvex positive lens L24, a negative meniscus lens L25 that is convex on the reduction side 2, and a biconvex positive lens L26.

The second refractive optical system RS2 includes: a third lens group G3 which is disposed on the enlargement side 3 of a second stop ST2 at (with) a third distance (third spacing) SP3, in which other lenses could be disposed but no other lenses are disposed, and is provided on the enlargement side 3 thereof with a third component (sub-lens group) G3f with negative refractive power; and a fourth lens group G4 that has positive refractive power and is disposed on the reduction side 2 of the second stop ST2 at (with) a fourth distance (fourth spacing) SP4 in which other lenses could be disposed but no other lenses are disposed. One example of the third lens group G3 is composed of seven lenses numbered L31 to L37 and one example of the fourth lens group G4 is composed of nine lenses numbered L41 to L49.

In more detail, one example of the third lens group G3 includes a third sub-lens group G3f including the lenses L31 to L33 in a positive-negative-negative arrangement of refractive powers from the enlargement side 3, and the lenses L34 to L37 in a negative-positive-positive-positive arrangement of refractive powers. One example of the third lens group G3 includes, in order from the enlargement side 3, a biconvex positive lens L31, a biconcave negative lens L32, a negative meniscus lens L33 that is convex on the enlargement side 3, a biconcave negative lens L34, a biconvex positive lens L35, a positive meniscus lens L36 that is convex on the reduction side 2, and a biconvex positive lens L37. One example of the fourth lens group G4 includes, from the enlargement side 3, positive-negative-negative-positive-negative-positive-negative-positive-positive lenses L41 to L49. One example of the fourth lens group G4 includes, in order from the enlargement side 3, a positive meniscus lens L41 that is convex on the reduction side 2, a negative meniscus lens L42 that is convex on the reduction side 2, a negative meniscus lens L43 that is convex on the enlargement side 3, a biconvex positive lens L44, a biconcave negative lens L45, a biconvex positive lens L46, a negative meniscus lens L47 that is convex on the reduction side 2, a positive meniscus lens L48 that is convex on the reduction side 2, and a biconvex positive lens L49.

In this way, the optical system (lens system or optical device) 10 according to the present invention is composed of a total of 26 lenses. Note that in this optical system 10, field stops FS11 and FS12 are disposed before and after the first stop (aperture stop) ST1, and field stops FS21 and FS22 are disposed before and after the second stop (aperture stop) ST2.

The optical system 10 includes four focus lens groups Fg1 to Fg4 disposed on the enlargement side 3 of an intermediate fixed lens group Fim and four zoom lens groups Zg1 to Zg4 disposed on the reduction side 2 of the intermediate fixed lens group Fim, and further includes an end fixed lens group Fie that is closest to the reduction side 2. The zoom lens groups Zg1 to Zg4 move during zooming (that is, changes in magnification), so that the distance to an image plane, for example, the image plane 25a on the reduction side 2, changes. The focus lens groups Fg1 to Fg4 do not move during zooming (that is, changes in magnification), but move during focusing. The fixed lens groups Fim and Fie do not move in either situation.

In the optical system 10 according to the present embodiment, the first focus lens group Fg1 has a single-lens configuration composed of the lens L11 with negative refractive power that is closest to the enlargement side 3 of the first lens group G1, and the second focus lens group Fg2 is composed of the lenses L12 to L14 with negative-negative-positive refractive powers in the first lens group G1. The third focus lens group Fg3 is composed of the lenses L21 to L26 of the second lens group that has positive refractive power and includes the first stop ST1. The fourth focus lens group Fg4 is composed of the lens L31 with positive refractive power that is closest to the enlargement side 3 of the third lens group G3, and therefore faces the intermediate image IM. The intermediate fixed lens group Fim is composed of the lenses L32 and L33 with negative refractive power in the third lens group G3.

The first zoom lens group Zg1 is composed of the lenses L34 to L36 with negative-positive-positive refractive powers in the third lens group G3, and the second zoom lens group Zg2 is composed of the lens L37 with positive refractive power that is closest to the reduction side 2 of the third lens group G3. The third zoom lens group Zg3 is composed of the lenses L41 and L42 with positive-negative refractive powers in the fourth lens group G4 and includes the second stop ST2. The fourth zoom lens group Zg4 is composed of the lenses L43 to L48 with negative-positive-negative-positive-negative-positive refractive powers in the fourth lens group G4. The end fixed lens group Fie is composed of the lens L49 that has positive refractive power and is closest to the reduction side 2 of the fourth lens group G4.

The first refractive optical system (first optical subsystem) RS1 of the optical system 10 is a retrofocus optical system with a negative-positive arrangement of refractive powers where the component G1f with negative refractive power is disposed on the enlargement side (enlargement conjugate side) 3, which makes it possible to obtain an optical subsystem where the enlargement side 3 is wide angle with a large angle of view and the reduction side 2 has a long back focus and is telecentric or close to telecentric. The intermediate image IM is formed adjacent to (that is, with no lens in between) the reduction side (reduction conjugate side) 2 of the first refractive optical system RS1. The intermediate image IM is formed so as to be tilted toward the enlargement side 3. That is, the intermediate image IM includes a part where peripheral images (as the image height increases) are formed closer to the enlargement side 3 compared to images on the optical axis 7. In other words, the intermediate image IM includes a part that is formed closer to the enlargement side 3 than the part of image on the optical axis 7. Forming the intermediate image IM so as to be tilted toward the enlargement side 3 allows the Petzval sum G2PTZ of the second lens group G2 to be a relatively large negative value. This means that the second lens group G2 can include a configuration where a plurality of refracting surfaces with positive refractive power are concentrated in a short distance. In the optical system 10, the second lens group G2 is composed of the positive-positive-negative-positive-negative-positive lenses L21 to L26, with six lenses including four lenses with positive refractive power in a compact arrangement.

That is, in this optical system 10, the first lens group G1 can include a plurality of negative meniscus lenses that are convex on the enlargement side 3. Accordingly, the Petzval sum G1PTZ of the first lens group G1 is positive, and the intermediate image IM tends to be tilted toward the reduction side (over, with curvature of field in the positive direction). On the other hand, by making the Petzval sum G2PTZ of the second lens group G2 is relatively excessively negative, the intermediate image IM is tilted toward the enlargement side (under, with curvature of field in the negative direction). Accordingly, by tilting the intermediate image IM toward the enlargement side, the positive refractive power of the second lens group G2 can be set relatively large. Also, since the first lens group G1 is allowed to have a large Petzval sum G1PTZ, the spreading of light rays in (that is, the angle of view of) the first lens group G1 can be set large, which makes it possible to make the lens diameters in the second lens group G2 relatively small. Accordingly, as a whole, it is possible to use a configuration with relatively small diameters and a dense arrangement of lens surfaces as the second lens group G2. This means that it is possible to provide a wide-angle optical system 10 that makes highly efficient use of space, is compact, and also has high aberration correcting performance. Note that the above description describes an effective way of adjusting the Petzval sums when controlling the direction of tilt of the intermediate image IM in the optical system 10. The direction of tilt of an intermediate image IM in other optical systems is not determined by Petzval sums only, and will be affected by astigmatism and higher-order aberration. This means that there may be cases where the values of the Petzval sums and the direction of tilt of the intermediate image IM do not match the above description.

The Petzval sum G1PTZ of the first lens group G1 and the Petzval sum G2PTZ of the second lens group G2 may satisfy the following Condition (1).

$$0.6 < |G2PTZ/G1PTZ| < 1.7 \tag{1}$$

If the lower limit is exceeded, the correction by the second lens group G2 will be insufficient and the load placed on the second optical subsystem RS2 for the correction will increase. If the upper limit is exceeded, the correction by the second lens group G2 will be excessive and the load on the second optical subsystem RS2 for correction will also increase.

The curvature of field IMFc of the intermediate image IM and the focal length (composite focal length) f1 of the first refractive optical system RS1 may satisfy the following Condition (2). Note that the curvature of field (value of curvature of field) IMFc of the intermediate image IM is the curvature of field at the maximum angle of view (maximum image height) of the intermediate image IM.

$$0 < |IMFc/f1| < 2.5 \tag{2}$$

If the upper limit of Condition (2) is exceeded, the curvature of field is too large, making it difficult to correct aberrations. The upper limit may be set at 1.5. The curvature of field IMFc can be controlled by adding astigmatism to the sum of the Petzval sums G1PTZ and G2PTZ.

The curvature of field IMFc of the intermediate image IM and the focal length (composite focal length) fw at the wide-angle end of the optical system 10 may satisfy the following Condition (3).

$$0 < |IMFc/fw| < 2.5 \tag{3}$$

If the upper limits of Conditions (2) and (3) are exceeded, the curvature of field becomes too large, which makes it difficult to correct aberrations. The upper limit may be 1.5.

In addition, the optical system 10 uses a configuration where the first stop ST1 is provided between the first lens group G1, which is provided with the negative component, and the second lens group G2, which has positive refractive power, and near a position where the peripheral light and the center light intersect and the light flux converges. In addition, although distances (spacings) in which lenses could be disposed are provided in front of and behind the first stop ST1, no lenses are actually disposed in these spacings (distances), resulting in a configuration where the difference in diameter between the lenses L21 to L26 of the second lens group G2 is reduced. In a prior retrofocus-type lens system, when the lens diameter on the enlargement side is increased and when an optical system with positive refractive power on the reduction side is composed of a plurality of lenses, there will be a large difference in diameter between such lenses, the distances between the lenses will become wide, such optical system will make inefficient use of space, and it will be difficult to dispose a plurality of lenses in a compact and efficient arrangement. The optical system 10 is provided with the first stop ST1, and the distances SP1 and SP2, in which lenses could be disposed but in which no lenses are disposed, are provided in front of and behind the first stop ST1 so that the arrangement of the second lens group G2 is improved.

The first distance SP1, the second distance SP2, and the effective diameter SD1 of the first stop ST1 may satisfy the following Conditions (4) and (5).

$$0.5 < SP1/SD1 < 1.7 \tag{4}$$

$$0.5 < SP2/SD1 < 1.7 \tag{5}$$

The first distance SP1 is the distance (spacing) between the first stop ST1 and the surface on the reduction side 2 of the lens L14 which is adjacent to the first stop ST1 on the enlargement side 3, and the second distance SP2 is the distance (spacing) between the first stop ST1 and the surface of the enlargement side 3 of the lens L21 that is adjacent to the first stop ST1 on the reduction side 2. If the lower limits of Conditions (4) and (5) are exceeded, the lens surfaces will be positioned closer to the stop ST1, the contribution (affection) of light to these lenses will increase, and adverse effects such as focusing errors will increase. If the upper limits are exceeded, the spacing to the lenses become too wide, which increases cost and makes it difficult to provide a compact optical system. The lower limit may be 0.6.

In addition, by using symmetrical surfaces as the surfaces facing the enlargement side 3 and the reduction side 2 of the first stop ST1, the light flux passing through the stop ST1 is controlled on both sides, which suppresses a drop in the amount of light due to the stop ST1. That is, the surfaces Sf1 and Sr1 on the front and to the rear of the first stop ST1 are both made concave or both made convex with respect to the stop ST1. In the optical system 10 depicted in FIGS. 1A-1B, a configuration with facing convex surfaces is used. The radius of curvature Sf1r of the lens surface Sf1 on the enlargement side 3 of the first stop ST1 and the radius of curvature Sr1r of the lens surface Sr1 on the reduction side 2 may satisfy the following Condition (6). By disposing optical surfaces in a concentric arrangement with respect to the stop, it is possible to cancel out the aberrations produced at the respective surfaces. If the range of the following condition is exceeded, such cancelling becomes difficult.

$$0.1<|Sf1r/Sr1r|<3 \qquad (6)$$

When the difference in the radii of curvature of the surfaces in front of and to the rear of the first stop ST1 is too large, the reduction in the amount of light due to the stop ST1 tends to increase.

Accordingly, in the optical system 10, the difference in the effective diameters of the lenses L21 to L26 composing the second lens group G2 can be reduced, which makes it possible to dispose a large number of lenses in a short space. The maximum effective diameter Dg2max and the minimum effective diameter Dg2 min of the plurality of lenses L21 to L26 of the second lens group G2 may satisfy the following Condition (7).

$$1<Dg2\text{max}/Dg2\text{ min}<1.7 \qquad (7)$$

By reducing the difference between the maximum effective diameter Dg2max and the minimum effective diameter Dg2 min, it is possible to provide a compact optical system 10 that can make effective use of the space in a housing, such as a lens barrel, in which the optical system 10 is housed.

The length Lg2 of the second lens group G2 that is from the enlargement side 3 surface of the lens L21 that faces the first stop ST1 to the reduction side 2 surface of the lens L26 that faces the intermediate image IM, and the thickness Lg2p occupied by the plurality of lenses with positive refractive power, in the present embodiment, the lenses L21, L22, L24, and L26, may satisfy the following Condition (8).

$$0.5<Lg2p/Lg2<1.0 \qquad (8)$$

In the second lens group G2 that has positive refractive power, by disposing a plurality of lenses with positive refractive power, in the present embodiment, four lenses, with almost the minimum air gap in between, it is possible to dispose a large number of lens surfaces capable of correcting aberration in a narrow space. Accordingly, it is possible to provide the optical system 10 equipped with the second lens group G2 that is compact and has high aberration correction performance. The lower limit of Condition (8) may be 0.7 and the upper limit may be 0.96. Also, by increasing the combined thickness of the positive lenses, it is possible to effectively correct chromatic aberration of magnification.

In the optical system 10, it is possible to improve the occupancy (proportion, that is, the efficiency with which occupied space is used) of the plurality of lenses L21 to L26 included in the second lens group G2, and to reduce the occupancy (proportion) of the length Lop1 of the first refractive optical system RS1 that includes the second group G2 relative to the total length Lop of the optical system 10. The total length Lop of the optical system 10 and the length Lop1 of the first refractive optical system RS1 may satisfy the following Condition (9).

$$0.25<Lop1/Lop<0.33 \qquad (9)$$

If the lower limit is exceeded, the correction of chromatic aberration of magnification will be insufficient, and the lens diameter in the vicinity of the intermediate image will be excessive. If the upper limit is exceeded, the total length of the first lens group G1 will be shortened, the refractive power will increase, and astigmatism and coma aberration will increase.

Depending on the application, the optical system 10 may be bent between the first refractive optical system RS1 and the second refractive optical system RS2 and/or between the first lens group G1 and the second lens group G2. As one example, in the projector 1, by disposing the optical system 10 in a bent arrangement, it becomes possible to provide a compact projector that is capable of projecting wide-angle images with a short throw distance. Also, by reducing the proportion occupied by the first refractive optical system RS1 disposed closest to the screen, it becomes possible to provide a more compact projector 1. The total length Lop is the distance on the optical axis 7 from the enlargement side 3 surface of the lens L11 closest to the enlargement side 3 to the reduction side 2 surface of the lens L49 closest to the reduction side 2. The length Lop1 of the first refractive optical system RS1 is the distance on the optical axis 7 from the surface on the enlargement side 3 of the lens L11 closest to the enlargement side 3 in the first refractive optical system RS1 to the intermediate image IM.

The optical system 10 includes an arrangement having the first refractive optical system RS1 with positive refractive power, the intermediate image IM, and the second refractive optical system RS2 with positive refractive power disposed in that order from the enlargement side 3. Although the first refractive optical system RS1 is a retrofocus-type including the negative component G1f on the enlargement side 3 and the positive second lens group G2 on the reduction side 2, by giving the second lens group G2 positive refractive power while suppressing overcorrection, the lens arrangement of the second lens group G2 is made compact as described above. By setting the intermediate image IM so as to be slightly tilted toward the enlargement side 3, the aberration correcting load of the second refractive optical system RS2 is reduced, which enables the second refractive optical system RS2 to use a configuration suited to high-magnification zooming.

To reduce the aberration correcting load of the second refractive optical system RS2, which is the second optical subsystem, it is preferable to provide the first refractive optical system RS1, which is the first optical subsystem, with a certain amount of refractive power. The focal length (composite focal length) f1 of the first refractive optical system RS1 and the focal length (composite focal length) fw of the optical system 10 at the wide-angle end may satisfy the following Condition (10).

$$1.0<|f1/fw|<2.0 \qquad (10)$$

If the lower limit of Condition (10) is exceeded, the refractive power of the first refractive optical system RS1 will be too strong and the aberration correction load of the second refractive optical system RS2 will increase. If the upper limit is exceeded, the refractive power of the first refractive optical system RS1 will be too weak, and the aberration correction load of the second refractive optical system RS2 will again increase. The upper limit of Condition (10) may be 1.7.

The first refractive optical system RS1 includes a retrofocus-type arrangement of refractive powers, including the negative component (first component) G1f on the enlargement side 3 of the first lens group G1 on the enlargement side 3 and the second lens group G2 with positive refractive power on the reduction side 2. Accordingly, it is possible to achieve telecentricity (telecentric or near telecentric, where principal rays at the outmost (largest) peripheral angle of view are nearly parallel to the angle made by the optical axis) at the position of the intermediate image IM on the reduction side 2. Telecentricity affects the diameters of lenses in front of and to the rear of the intermediate image IM. When the telecentricity is poor, the diameters of lenses either in front of or to the rear of the intermediate image IM will become excessively large, resulting in an increase in cost. It is therefore preferable to have favorable telecentricity even at the outmost peripheral angle of view.

The focal length fc1 of the first component G1f closest to the enlargement side 3 and the focal length f1 of the first refractive optical system RS1 may satisfy the following Condition (11). The following Condition (12) may also be satisfied with respect to the focal length fw at the wide-angle end of the optical system 10 (that is, the focal length of the entire system).

$$1.2 < |fc1/f1| < 2.8 \qquad (11)$$

$$1.5 < |fc1/fw| < 3.5 \qquad (12)$$

If the lower limits of Conditions (11) and (12) are exceeded, the refractive power of the negative first component G1f is too large, which makes it necessary to increase the positive refractive power on the reduction side 2 in order to achieve telecentricity, which makes it difficult to correct aberration. Conversely, when the upper limits are exceeded, the refractive power of the negative component G1f is insufficient, making it difficult to achieve telecentricity.

In the second lens group G2 that has positive refractive power, positive lenses with comparatively high refractive power may be disposed as the lens (in the present embodiment, the lens L26) with positive refractive power adjacent to the intermediate image IM on the enlargement side 3 and also the next positive lens (in the present embodiment, the lens L24) on the enlargement side 3 side. This configuration produces strong undercorrection of curvature of field (undercorrected curvature of field). In order to correct the spherical aberration, coma aberration, and chromatic aberration that accompany this, a negative lens (in the present embodiment, the lens L25) of the enlargement side 3 with similarly high refractive power may be disposed between these lenses L26 and L24. By doing so, it is possible to set appropriate refractive power to produce undercorrection (under-correction) of curvature of field by the first refractive optical system RS1. By making the first refractive optical system (that is, the optical system on the enlargement side) RS1 with undercorrect aberration and preventing the amount of undercorrection from becoming excessive, it is possible to reduce the aberration correction load of the second refractive optical system RS2 and produce an optical system suited to zooming.

By using lenses with positive refractive power for the adjacent lenses that face the intermediate image IM, that is, the lens L26 closest to the reduction side 2 of the first refractive optical system RS1 and the lens L31 that is closest to the enlargement side 3 of the second refractive optical system RS2, it is possible to increase the telecentricity at the position of the intermediate image IM and prevent the diameter of the lenses near the intermediate image IM from becoming excessively large, which makes it possible to reduce cost. If these adjacent lenses (in the present embodiment, the lenses L26 and L31) are disposed so that their convex surfaces face each other, a larger effect of increasing the telecentricity tends to be obtained.

As described earlier, the second lens group G2 includes a lens with positive refractive power (that is, the group end lens, in the present embodiment, the lens L26) at a position closest to the reduction side 2 and adjacent to the enlargement side of the intermediate image IM. The focal length fg2e of this lens and the focal length fw at the wide-angle end of the optical system 10 may satisfy the following Condition (13).

$$2.5 < |fg2e/fw| < 10.0 \qquad (13)$$

This makes it possible to favorably achieve telecentricity at the intermediate image IM and to suppress the resulting aberration to a certain level. The lower limit of Condition (13) may be 3.0 and the upper limit may be 9.0.

The radius of curvature Rg2er of the surface on the enlargement side 3 of the lens on the enlargement side 3 of the intermediate image IM (the group end lens, in the present embodiment, the lens L26) and the focal length fw at the wide-angle end of the optical system 10 may satisfy the following Condition (14).

$$2.0 < |Rg2er/fw| < 35.0 \qquad (14)$$

From the viewpoint of aberration correction, it is desirable that the curvature on the enlargement side to be large (that is, for the radius of curvature to be small). If the lower limit is exceeded, spherical aberration will be excessively generated, and if the upper limit is exceeded, it will be difficult to achieve favorable telecentricity. The lower limit may be 3.0 or 4.0. The upper limit may be 30.0.

In this optical system 10, the telecentricity in the vicinity of the intermediate image IM can be set so as to satisfy the following Condition (15). The angle θt is the angle between a principal ray and the optical axis 7 at the outmost (largest) peripheral image height of the intermediate image IM.

$$|\theta t| < 15.0 \qquad (15)$$

On the side closest to the intermediate image, that is, on the side closest to the reduction side 2, the second lens group G2 may be provided with a second component (that is, the sub-lens group on the reduction side 2 of the second lens group G2) G2r that is a combination of positive-negative-positive refractive powers. The second component G2r in the present embodiment is composed of the lenses L24, L25, and L26. Closest to the intermediate image IM (that is, the reduction side 2), the second lens group G2 may include the lens L26 with positive refractive power that is convex on the reduction side 2.

In the arrangement (configuration) of the second component G2r, a length (distance) LA (that is, the total length of the second component G2r) from the lens surface on the reduction side 2 of the lens (in the present embodiment, L26) adjacent to the enlargement side 3 of the intermediate image IM to the lens surface on the enlargement side 3 of the positive lens (in the present embodiment, L24) on the enlargement side 3 of the second component G2r and the length (distance) LB from the lens surface on the reduction side 2 of the adjacent lens L26 to the lens surface on the reduction side 2 of the negative lens (in the present embodiment, L25) on the enlargement side 3 of the adjacent lens L26 may satisfy the following Condition (16).

$$0.2 < LB/LA < 0.5 \qquad (16)$$

To favorably correct chromatic aberration while minimizing the number of lenses that compose the second component G2r, it is preferable to reduce the radius of curvature of the facing surfaces of the negative and positive lens groups. To provide enough space for this, it is preferable for the above expression to be satisfied.

The positive-negative lens combination on the enlargement side of the second component Gtr, which is positive-negative-positive from the enlargement side 3, has high-error sensitivity for relative eccentricity, so that from the manufacturing point of view, it is preferable to use a structure where the lens peripheral portions about each other are attached (fixed). Accordingly, the radius of curvature Rg2m of the surface on the enlargement side 3 of the negative lens L25 adjacent on the enlargement side 3 to the lens L26, which is closest to the reduction side 2 of the second lens group G2, and the radius of curvature Rg2p of the surface on the reduction side 2 of the positive lens L24 that is adjacent on the enlargement side 3 of the negative lens L25 may satisfy the following Condition (17).

$$0.5 < Rg2m/Rg2p < 1 \quad (17)$$

It is possible to use a combination (structure) where the surface on the reduction side 2 of the lens L24 with positive refractive power which is convex on the reduction side 2 and the surface on the enlargement side 3 of the lens L25 with negative refractive power which is concave on the enlargement side 3 are set so that the radius of curvature of the convex surface is gradual and contacts the peripheral portion of the concave surface.

As described earlier, the first refractive optical system RS1 is a retrofocus type and includes a component (first component or subgroup) G1f with negative refractive power closest to the enlargement side 3. It is also preferable for the first component G1f to include a negative-negative combination of refractive powers closest to the enlargement side 3. In addition, it is preferable for the first component G1f to be constructed, from the enlargement side 3, of a negative meniscus lens L11 and a negative meniscus lens L12. For the second meniscus lens L12 disposed on the reduction side 2 of the first meniscus lens L11, at least the lens surface on the reduction side 2 may be formed as an aspherical surface. The maximum value θnm of the normal angle of the reduction side 2 surface of the meniscus lens L12 may be 50 degrees or below, and this maximum value θnm of the normal angle may be larger than the normal angle θnp at the outermost periphery. That is, the following Conditions (18) and (19) may be satisfied.

$$40 < \theta nm < 50 \quad (18)$$

$$0.5 < \theta np/\theta nm < 1 \quad (19)$$

A surface that satisfies these conditions is a surface where the normal angle gradually recovers at the outermost periphery, which makes it possible to reduce the diameter of the lens positioned on the enlargement side 3 for achieving a large view angle. This also facilitates processing of an aspherical surface which is suited to correcting astigmatism.

The surface on the enlargement side 3 of the meniscus lens L11, which is the closest surface to the enlargement side 3 of the optical system 10, is often the largest lens surface in the entire optical system 10. Accordingly, light rays are dispersed as they pass through this lens surface. This means that by moving this lens L11 for focusing, it is easy to perform aberration correction together with focus control. The meniscus lens L12 that is adjacent to the meniscus lens L11 also has a large area and is suited to use for focusing. The lenses L11 and L12 may move together for focusing, may move independently, or may be moved in conjunction with other lenses for focusing.

The second refractive optical system RS2, which is the second optical subsystem disposed on the reduction side 2 of the intermediate image IM, includes a third lens group G3, which is disposed on the enlargement side 3 of the second stop ST2 at (with) a third distance SP3 and provided, on the enlargement side 3, with a third component (sub-lens group) G3f that has negative refractive power, and a fourth lens group G4 with positive refractive power disposed on the reduction side 2 of the second stop ST2 at (with) a fourth distance SP4. As a whole, the second refractive optical system RS2 is also a retrofocus-type lens system which has negative refractive power disposed on the enlargement side 3 and positive refractive power disposed on the reduction side 2. This configuration is telecentric on the reduction side 2 and makes it easy to achieve a long back focus.

The third distance SP3 and the fourth distance SP4 are spaces (gaps, parts, areas) in which other lenses could be disposed, but in which no other lenses are disposed. The third distance SP3, the fourth distance SP4, and the effective diameter SD2 of the second stop ST2 at the wide-angle end may satisfy the following Conditions (20) and (21).

$$0.4 < SP3/SD2 < 1.5 \quad (20)$$

$$0.4 < SP4/SD2 < 1.5 \quad (21)$$

Fluctuation and spreading of light rays (light flux) in front of and to the rear of the second stop ST2 can be avoided, aberration correction can be favorably performed, and a fall in the amount of light due to the stop ST2 can be suppressed.

It is preferable for the second refractive optical system RS2 on the reduction side 2 to have positive refractive power as a whole and to overcorrect to match the first refractive optical system RS1 which undercorrects. To do so, as the lenses adjacent to the intermediate image IM, that is, the lens L31 with positive refractive power is disposed closest to the enlargement side 3 of the second refractive optical system RS2 and two lenses L32 and L33 with negative refractive power are adjacently disposed on the reduction side 2. That is, the third component G3f of the third lens group G3 is disposed adjacent to the intermediate image IM, and includes, in order from the enlargement side 3, the lens L31 that has positive refractive power and disposed closest to the intermediate image and the two lenses L32 and L33 with negative refractive power.

By using these two lenses L32 and L33 with negative refractive power, it is possible to dispose a lens group (the "third component") G3f with negative refractive power closest to the enlargement side 3 of the second refractive optical system RS2, which makes it possible to use a retrofocus arrangement for the second refractive optical system RS2 and achieve a long back focus on the reduction side 2.

The focal length fc1 of the first component (first group) G1f with negative refractive power on the enlargement side 3 of the first refractive optical system RS1 and the focal length fc3 of the third component (third group) G3f with negative refractive power on the enlargement side 3 of the second refractive optical system RS2 may satisfy the following Condition (22).

$$0.1 < fc1/fc3 < 0.30 \quad (22)$$

If the lower limit of this condition is exceeded, it becomes difficult to achieve a sufficiently wide angle. On the other hand, if the upper limit is exceeded, lenses in the vicinity of the intermediate image will have a large diameter, which increases cost.

The focal length fc1 and the focal length fc3 may satisfy the following Condition (23).

$$0.8 < fc1/fc3 < 1.2 \quad (23)$$

It is possible to provide an optical system 10 in which aberrations are favorably corrected and which has a relatively short back focus.

The third lens group G3 includes a lens L31 that is closest to the enlargement side 3, has positive refractive power, is convex on the enlargement side 3, and is disposed adjacent to the intermediate image IM on the reduction side 2. By disposing the lens L31 that is convex on the enlargement side 3 adjacent to the intermediate image IM, it is possible to improve the telecentricity at the position of the intermediate image IM and to prevent the lens diameters in front of and to the rear of the intermediate image IM from becoming excessively large. By doing so, increases in cost can be suppressed. The lenses L26 and L31 that are adjacent in front of and to the rear of the intermediate image IM are preferably lenses with positive refractive power to improve telecentricity and preferably have their convex surfaces facing each other.

As described earlier, in the optical system 10, the focus group is disposed mainly in the first refractive optical system RS1 and the zoom group is disposed mainly in the second refractive optical system RS2. In the optical system 10, the intermediate image IM is tilted toward the enlargement side, which reduces the respective aberration correction loads of the first refractive optical system RS1 and the second refractive optical system RS2. Accordingly, by appropriately disposing lens groups that move in these optical systems RS1 and RS2, high-precision zooming and focusing can be achieved. The zoom group and the focus group may be placed in either optical subsystem. Comparing the two optical subsystems in the present embodiment, that is, the first refractive optical system RS1 and the second refractive optical system RS2, as described earlier, the first refractive optical system RS1 is a positive group and is underfocused, producing natural aberration and enabling a compact design to be used. On the other hand, since the second refractive optical system RS2 is overfocused, the aberration correction load is slightly larger than that of the first refractive optical system RS1. For this reason, a design with a long overall length is used and the air gaps are large. Since the lens movement for focusing is smaller and the lens movement for zooming is larger, it is preferable to mainly dispose the focus group in the first refractive optical system RS1 and to dispose the zoom group in the second refractive optical system RS2.

That is, the first refractive optical system RS1 includes a focus group FG including lenses that move during focusing. The focus group FG in the present embodiment includes three focus lens groups Fg1 to Fg3 included in the first refractive optical system RS1 and a focus lens group Fg4 included in the second refractive optical system RS2. The focus group FG includes a lens with negative refractive power included in the first component G1f of the first lens group G1. In more detail, the focus group FG includes the first lens L11 with negative refractive power that is disposed closest to the enlargement side 3 of the first lens group G1, and the first focus lens group Fg1 in the present embodiment has a single lens configuration composed of the first lens L11.

The focus group FG includes, in addition to the first lens L11, at least one lens included in the first refractive optical system RS1. In more detail, the first refractive optical system RS1 includes the second focus lens group Fg2 including the lenses L12 and L13 with negative refractive power and the lens L14 with positive refractive power, and the third focus lens group Fg3 composed of the second lens group G2 that includes the first stop ST1. The focus group FG further includes the fourth focus lens group Fg4 composed of the positive lens L31 that is closest to the enlargement side 3 of the second refractive optical system RS2. With this configuration, the focus group FG includes a third focus lens group Fg3 and a fourth focus lens group Fg4 that are adjacent to each other in front of and to the rear of the intermediate image IM in between. Telecentricity is high before and after the intermediate image IM, and a relatively large range of movement for focusing can be provided for the third and fourth focus lens groups Fg3 and Fg4, which makes it possible to form sharper images on the enlargement side 3 or the reduction side 2 with little fluctuation in image magnification.

In addition to the first lens with negative refractive power that is closest to the enlargement side 3, the focus group FG may include at least one lens with positive refractive power included in the second lens group that has positive refractive power. These negative and positive refractive powers can be moved synchronously or independently for focusing, which facilitates aberration correction for focusing. In the optical system 10 according to the present embodiment, the entire second lens group G2 moves for focusing as the third focus lens group Fg3. It is desirable for a focus lens group including at least one lens with positive refractive power in the second lens group G2 (in the present embodiment, the focus lens group Fg3) to include at least the lens L26 with positive refractive power that is closest to the reduction side 2 in the second lens group G2. As described earlier, since there is high telecentricity at the position of the intermediate image IM, it is easy to provide a certain range of movement for focusing and there is little variation in image magnification during focusing.

The four focus lens groups Fg1 to Fg4 of the focus group FG may move independently and differently for focusing, or some of the lens groups may move synchronously. In one preferred embodiment, the lens (first lens) L11 that has the largest area and is closest to the enlargement side 3 and the lens (second lens) L12 that is adjacent and has the next largest area are arranged or grouped as different focus lens groups Fg1 and Fg2, with focusing and also aberration correction being performed by these lens groups moving differently during focusing.

In the optical system 10, the zoom group ZG including the lenses that move during zooming is included in the second refractive optical system RS2 on the reduction side 2 where it is easy to provide sufficient movement distance. A fixed group Fim may be included between the focus group FG and the zoom group ZG. The zoom group ZG includes a first zoom lens group Zg1 and a second zoom lens group Zg2 including some lenses of the third lens group G3, and a third zoom lens group Zg3 and a fourth zoom lens group Zg4 including some lenses of the fourth lens group G4. By distributing the zoom group ZG between the lens groups G3 and G4 in front of and to the rear of the second stop ST2, it is easy to provide enough movement distance and easy to correct aberrations at each zoom position.

FIG. 1A depicts the lens arrangement at the wide-angle end of the optical system 10, and FIG. 1B depicts the lens arrangement at the telephoto end of the optical system 10. FIG. 2 depicts data on the respective elements in the optical system 10. In FIG. 2, "S" is the surface number in the case of a lens, "Rdy" is the radius of curvature (mm) of each element (which is each lens surface in the case of a lens) in order from the enlargement side 3, "Typ" indicates the type of lens surface, where "SPH" indicates a spherical surface and "ASP" indicates an aspherical surface. "d" indicates the distance (spacing, in mm) between the faces of the elements disposed in order from the enlargement side 3, "H*2" indicates the effective diameter of each element (in mm), "nd" indicates the refractive index (d-line), and "vd" indicates the Abbe number (d line). FIG. 3 indicates the surface numbers and aspherical surface data of the respective aspherical surfaces, out of the surfaces of the respective elements. When "X" is the coordinate in the optical axis direction, "Y" is the coordinate in a direction perpendicular to the optical axis, the direction where light propagates is positive, and "Rdy" is the paraxial radius of curvature, an aspherical surface can be expressed by the following equation using the coefficient Rdy depicted in FIG. 2 and the coefficients K, A, B, C, and D depicted in FIG. 3. Note that the expression "en" means "10 to the nth power". The same also applies to the embodiments described later.

$$X=(1/Rdy)Y^2/[1+\{1-(1+K)(1/Rdy)^2Y^2\}^{1/2}]+AY^4+BY^6+CY^8+DY^{10}$$

FIG. 4 depicts the movement distances of the focus lens groups Fg1 to Fg4 and zoom lens groups Zg1 to Zg4 during focusing and zooming for typical states (cases) Z1 through Z6. In more detail, the distances (spacings) before and after each lens group at the wide-angle end (case Z1 and Z4), an intermediate position (cases Z2 and Z5) and the telephoto end (cases Z3 and Z6) are indicated for when the distance d0 from the enlargement side 3 end (that is, the surface S1) to the screen (not depicted) is a short distance (close range, 1554.4 mm) and a long distance (long range, 6000.0 mm). Here, "Z" indicates the case number, "EFL" indicates the composite focal length of the optical system 10 in the respective cases Z1 to Z6, "Lop" indicates the total length of the optical system 10, and "d0" indicates the distance to the image plane on the enlargement side 3. In the present embodiment, movement distances of the focus lens groups Fg1 to Fg4 and the zoom lens groups Zg1 to Zg4 are indicated as the distances d2 to d57. This also applies to the following embodiments.

Figure 5:
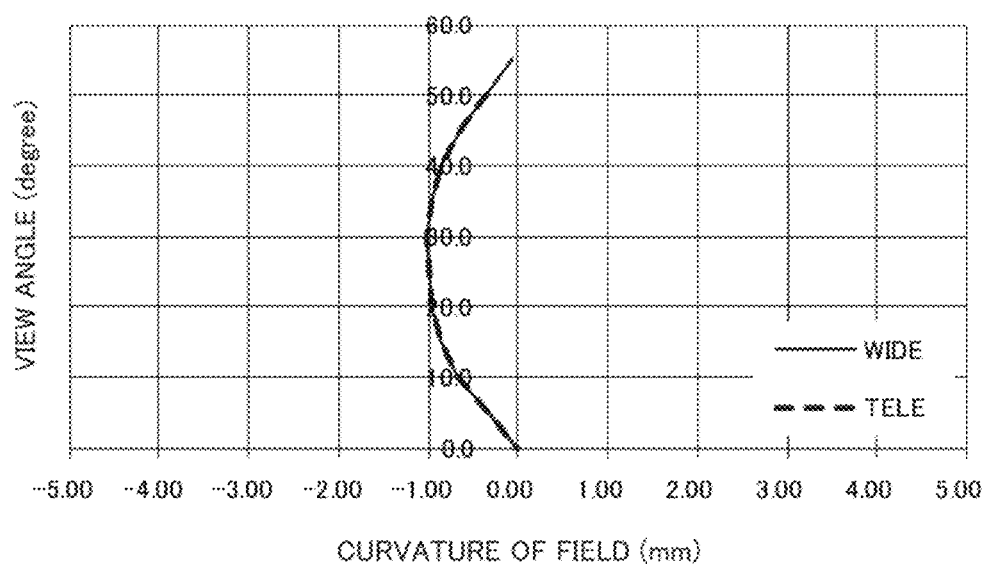
FIG. 5 shows curvature of field of the intermediate image of the optical system depicted in FIGS. 1A and 1B.
Figure 6A:
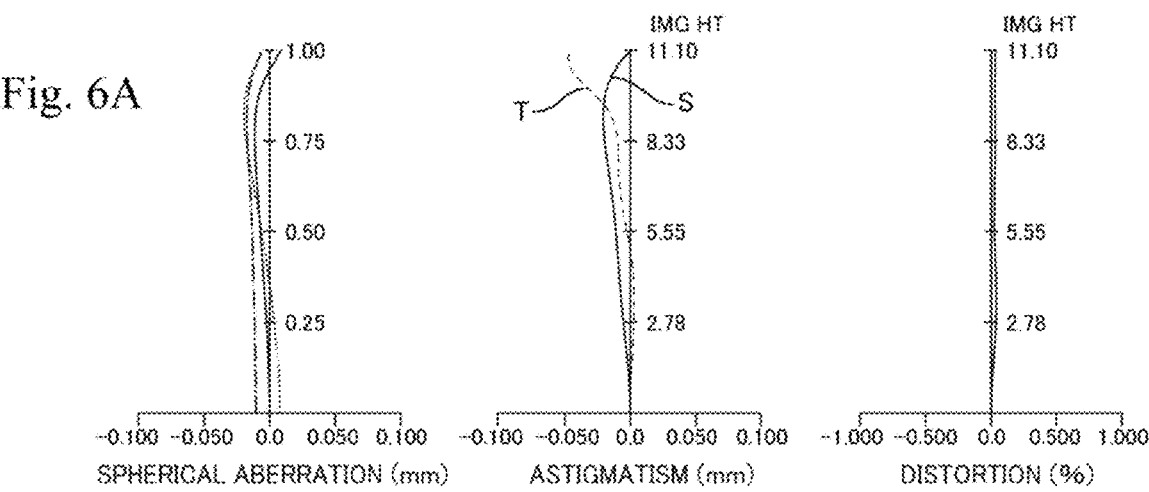
FIGS. 6A and 6B show various aberrations at the wide-angle end ("WIDE") and the telephoto end ("TELE") of the optical system depicted in FIGS. 1A-1B.
Figure 6B:
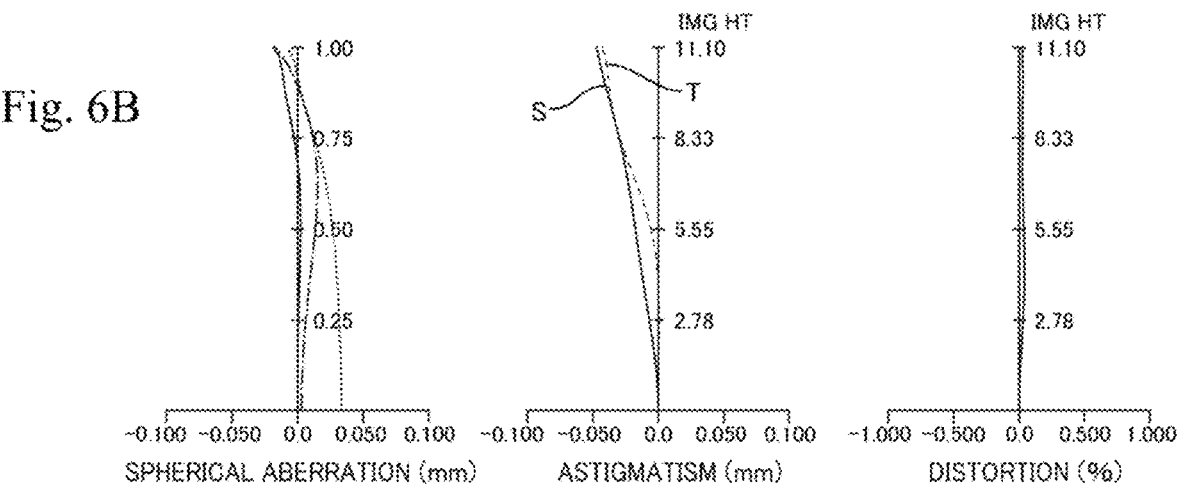
Figure 7:
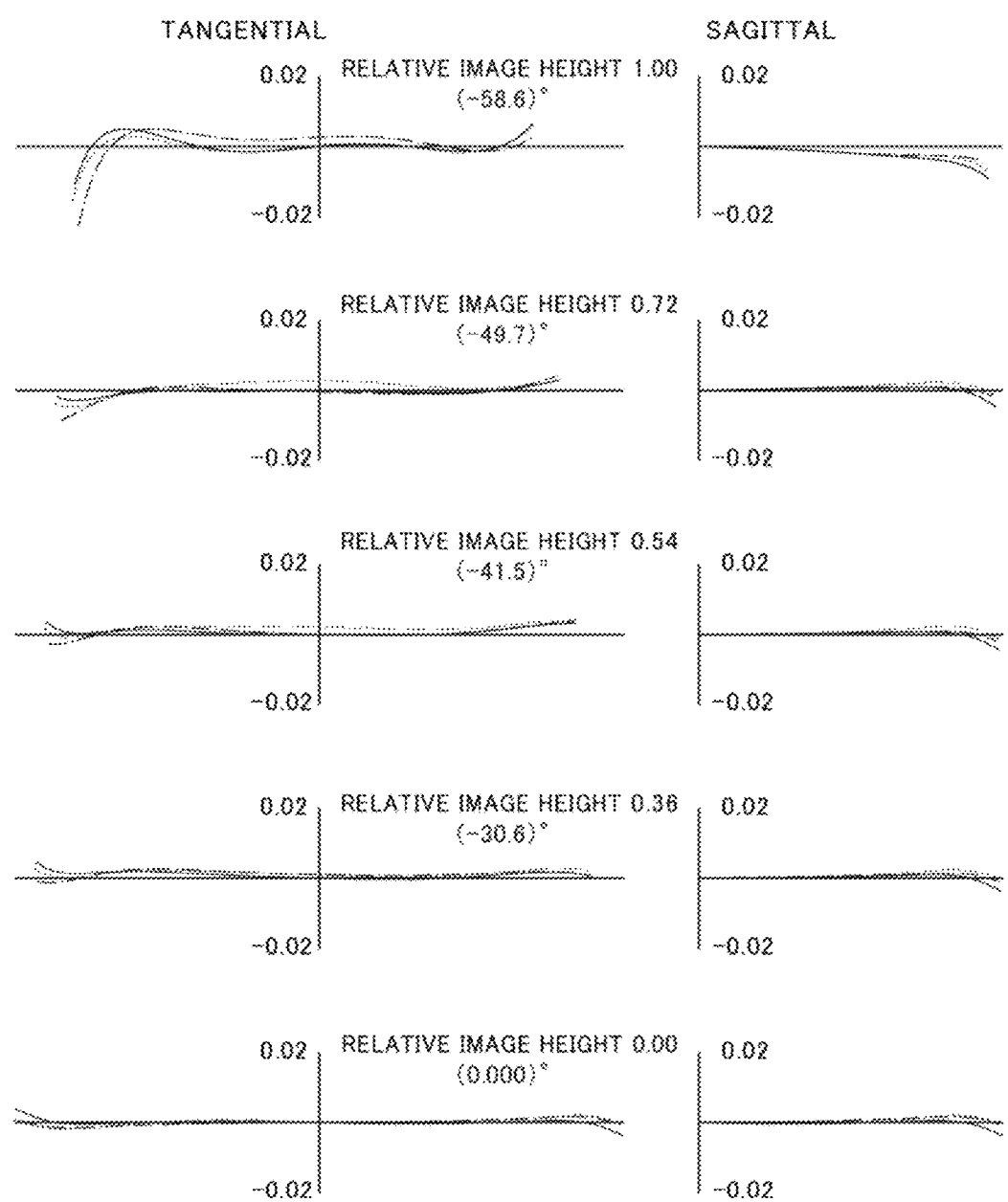
FIG. 7 shows graphs at each image height at the wide-angle end ("WIDE") of the optical system depicted in FIGS. 1A-1B.
Figure 8:
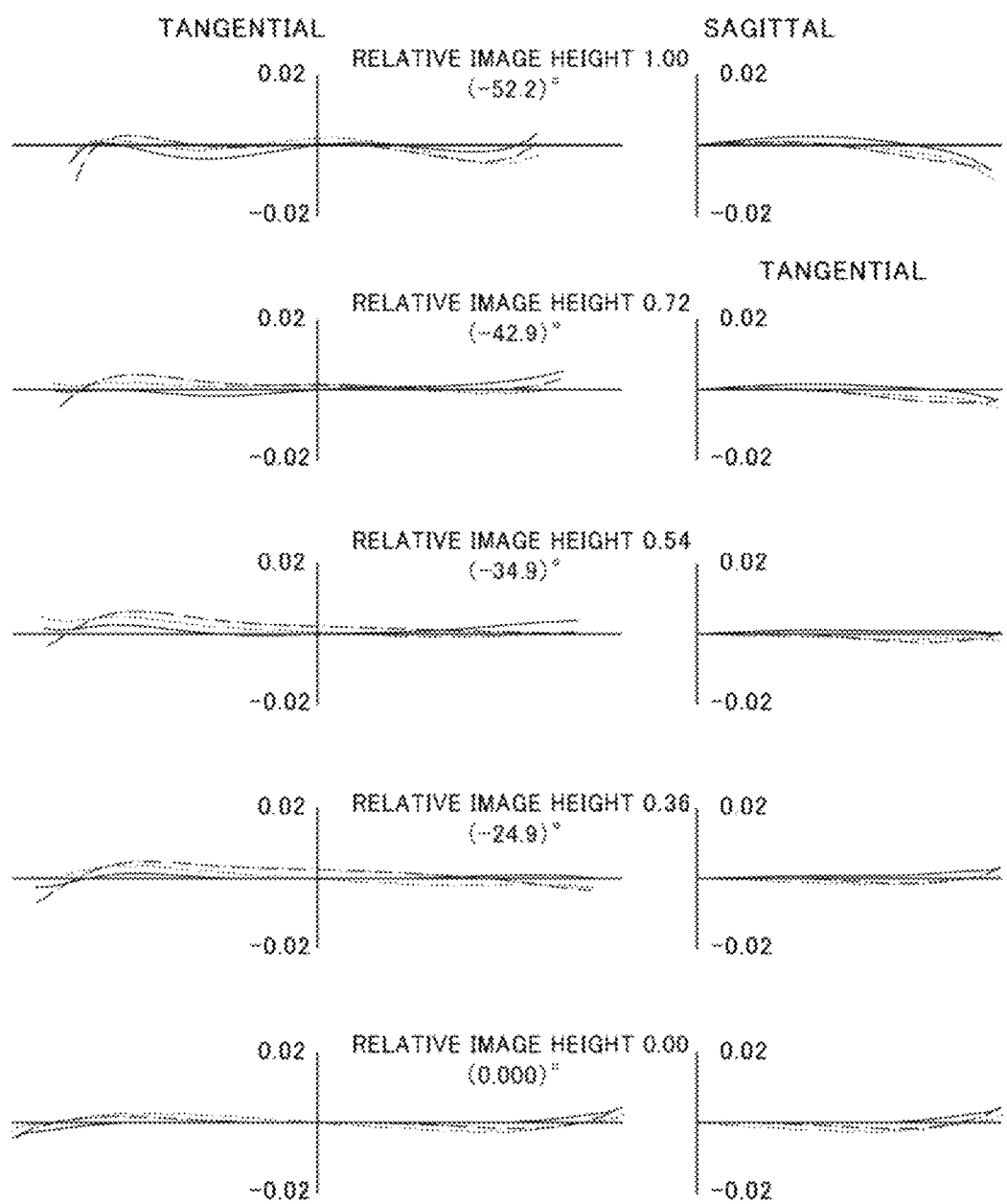
FIG. 8 shows lateral aberration graphs at each image height at the telephoto end ("TELE") of the optical system depicted in FIGS. 1A-1B.

FIG. 5 depicts the curvature of field (in mm) of the intermediate image IM with respect to the angle of view (in degrees). FIGS. 6A and 6B depict spherical aberration, astigmatism and distortion at the wide-angle end ("WIDE") and at the telephoto end ("TELE") respectively. FIGS. 7 and 8 are lateral aberration diagrams at each image height at the wide-angle end ("WIDE") and the telephoto end ("TELE") respectively. Note that in these diagrams, a wavelength of 460 nm (dot-dash line), a wavelength of 550 nm (broken line), and a wavelength of 630 nm (solid line) are depicted. The same also applies to the following embodiments.

The main parameters of the optical system 10 depicted in FIGS. 1A-1B are as follows. Note that the lengths, distances, and spacings are indicated in millimeter units, which also applies to the other embodiments described later.
Magnification (magnification at close range and wide-angle end): 233.8×
F number: 2.33 (wide-angle end)/2.43 (telephoto end)
Maximum angle of view (half angle): 58.6 (wide-angle end)/52.2 (telephoto end)
Zoom ratio: 1.27
Combined focal length of entire system (close range, wide-angle end, fw): −6.77
Combined focal length of entire system (close range, telephoto end, ft): −8.60
Combined focal length of first refractive optical system RS1 (close range, f1): 8.3
Combined focal length of second refractive optical system RS2 (close range, wide-angle end, f2w): 120.8
Combined focal length of second refractive optical system RS2 (close range, telephoto end, f2t): 141.4
Total length of optical system (Lop): 500.00
Total length of first refractive optical system RS1 (Lop1): 150.85
Total length of second refractive optical system RS2 (Lop2): 349.15
Combined focal length of first lens group G1 (close range, fg1): −44.89
Combined focal length of second lens group G2 (close range, fg2): 31.01
Combined focal length of third lens group G3 (close range, wide-angle end, fg3): 90.74
Combined focal length of fourth lens group G4 (close range, wide-angle end, fg4): 72.69
Composite focal length (fc1) of first component G1f: −10.89
Composite focal length (fc3) of third component G3f: −42.16
Focal length of group end lens L26 (fg2e): 59.7
Curvature of field of intermediate image IM (IMFc): −0.07
Petzval sum of first lens group G1 (G1PTZ): 0.0323
Petzval sum of second lens group G2 (G2PTZ): −0.0273
Length from enlargement side surface to reduction side surface of second lens group G2 (Lg2): 42.29
Total thickness of lenses with positive refractive power in second lens group G2 (Lg2p): 36.05
First distance (SP1): 17.00
Second distance (SP2): 15.25
Third distance (SP3): 31.20
Fourth distance (SP4): 20.30
Maximum normal angle (θnm): 46.16
Normal angle of the outermost periphery (θnp): 42.84
Length LA: 23.11
Length LB: 11.56

| | |
|---|---|
| (\|G2PTZ/G1PTZ\|):0.845 | Condition (1) |
| (\|IMFc/f1\|):0.01 | Condition (2) |
| (\|IMFc/fw\|):0.01 | Condition (3) |
| (SP1/SD1:SP1/H*2 −10):0.91 | Condition (4) |
| (SP2/SD1:SP2/H*2 −10):0.82 | Condition (5) |
| (\|Sf1r/Sr1r\|:\|Rdy8/Rdy12\|):1.95 | Condition (6) |
| (Dg2max/Dg2 min:H*2 −22/H*2 −12):1.16 | Condition (7) |
| (Lg2p/Lg2):0.85 | Condition (8) |
| (Lop1/Lop):0.30 | Condition (9) |
| (\|f1/fw\|):1.23 | Condition (10) |
| (\|fc1/f1\|):1.31 | Condition (11) |
| (\|fc1/fw\|):1.61 | Condition (12) |
| (\|fg2e/fw\|):8.82 | Condition (13) |
| (\|Rg2er/fw\|:\|Rdy22/fw\|):4.40 | Condition (14) |
| (\|θr\|):0.10 | Condition (15) |
| (LB/LA):0.50 | Condition (16) |
| (Rg2m/Rg2p:Rdy20/Rdy19):0.99 | Condition (17) |
| (θnm):46.16 | Condition (18) |

(θnp/θnm):0.93  Condition (19)

(SP3/SD2:SP3/H*2 −40):1.00  Condition (20)

(SP4/SD2:SP4/H*2 −40):0.65  Condition (21)

(fc1/fc3):0.26  Condition (22)

The optical system 10 satisfies all of Conditions (1) to (22) described above, is capable of focusing mainly with the lens groups disposed in the first refractive optical system RS1 on the enlargement side 3 of the intermediate image IM, and is capable of zooming with the lens groups disposed in the second refractive optical system RS2 on the reduction side 2. In addition, both the first refractive optical system RS1 and the second refractive optical system RS2 are retrofocus types with negative refractive power disposed on the enlargement side 3, so that it is possible to make the vicinity of the intermediate image IM and the reduction side 2 telecentric. By making the vicinity of the intermediate image IM telecentric, it is possible to suppress an increase in the diameter of lenses disposed in the middle. In addition, by tilting the intermediate image IM toward the enlargement side 3, it is possible to appropriately set positive refractive power for the second lens group G2 and to realize the second lens group G2 as a compact arrangement where a large number of lenses are concentrated. Accordingly, it is possible to provide the optical system 10 that can be made compact as a whole.

In particular, this optical system 10 is designed to have an extremely long back focus and a small image circle, has high magnification, and is suited to applications where the optical system is used in combination with an illumination system or the like. As depicted in the aberration diagrams, the optical system 10 favorably corrects aberration during zooming and focusing, and makes it possible to provide a projection optical system 10 that is capable of zooming, is compact, and is capable of projecting images in which aberration has been favorably corrected, as well as a projector 1 equipped with this projection optical system 10.

FIGS. 9A-9F depict several different examples of the focus group FG. FIG. 9A is an example where focusing is performed by dividing the first lens group G1 into two. That is, the first focus lens group Fg1 is composed of the lens L11 of the first lens group G1 and the second focus lens group Fg2 is composed of the other lenses L12 to L14, with focusing being performed by these two lens groups Fg1 and Fg2.

FIG. 9B is an example where focusing is performed by dividing the first lens group G1 into three. In more detail, the first focus lens group Fg1 is composed of the lens L11 of the first lens group G1, the second focus lens group Fg2 is composed of the lenses L12 and L13, and the third focus lens group Fg3 is composed of the lens L14, with focusing being performed by these three lens groups Fg1 to Fg3.

FIG. 9C is an example where the second lens group G2 is also moved during focusing. In more detail, the first focus lens group Fg1 is composed of the lens L11 of the first lens group G1, the second focus lens group Fg2 is composed of the lenses L12 to L14, and the third focus lens group Fg3 is composed of the second lens group L21 to L26, with focusing being performed by these three lens groups Fg1 to Fg3.

FIG. 9D is an example where some lenses (part of lenses) of the second lens group G2 are moved during focusing. That is, the first focus lens group Fg1 is composed of the lens L11 of the first lens group G1, the second focus lens group Fg2 is composed of the lenses L12 to L14, and the third focus lens group Fg3 is composed of the lens L26 that is closest to the intermediate image IM in the second lens group G2, with focusing being performed by these three lens groups Fg1 to Fg3.

FIG. 9E is an example where some (part of) lenses in the third lens group G3 are moved during focusing in addition to part of the second lens group G2. That is, the first focus lens group Fg1 is composed of the lens L11 of the first lens group G1, the second focus lens group Fg2 is composed of the lenses L12 to L14, the third focus lens group Fg3 is composed of the lens L26 closest to the intermediate image IM in the second lens group G2, and a fourth focus lens group FIG. 4 is composed of a lens L31 closest to the intermediate image IM in the third lens group G3, with focusing being performed by these four lens groups Fg1 to Fg4.

FIG. 9F is an example where focusing is performed by the entire first lens group G1. That is, the first focus lens group Fg1 is composed of the lenses L11 to L14 of the first lens group G1, the second focus lens group Fg2 is composed of a lens L26 closest to the intermediate image IM in the second lens group G2, and the third focus lens group FIG. 3 is composed of the lens L31 that is closest to the intermediate image IM in the third lens group G3, with focusing being performed by these three lens groups Fg1 to Fg3.

Although the configuration of the focus group FG is not limited to the above examples, in the optical system 10, by moving the two lenses L11 and L12, which are located closest to the enlargement side 3 and have the largest areas through which the light rays pass, in a cooperative manner, that is, independently or synchronously, during focusing, it is possible to efficiently control the light rays, resulting in favorable focusing performance being obtained.

FIGS. 10A-10B depict another example of a projector. This projector 1 also includes an optical system 10 for projecting light from an image plane (first image plane) 5a of a light modulator (light valve) 5 on the reduction side 2 to a screen or wall surface on the enlargement side 3. Like the embodiment described above, the optical system 10 may be an optical system for an image pickup apparatus 21. In the following description also, an optical system 10 for projection purposes will be described as an example. The optical system 10 is composed of a total of 23 lenses, includes a first optical subsystem (first refractive optical system) RS1 including a plurality of lenses disposed on the enlargement side 3, and a second optical subsystem (second refractive optical system) RS2 including a plurality of lenses disposed on the reduction side 2 with the intermediate image IM in between, and enlarges and projects the intermediate image IM, which has been formed by the second refractive optical system RS2, onto a screen or the like using the first refractive optical system RS1 which is wide angle.

The first refractive optical system RS1 includes: a first lens group G1, which is disposed on the enlargement side (enlargement conjugate side) 3 with a first distance SP1, which is a spacing where other lenses could be arranged but where other lenses are not arranged, from the first stop ST1 and is provided, on the enlargement side 3, with a first component (sub-lens group) G1f that has negative refractive power; and a second lens group G2 with positive refractive power (composite refractive power) whose reduction side 2 is adjacent to the intermediate image IM and is disposed on the reduction side (reduction conjugate side) 2 of the first stop ST1 with a second distance SP2, in which other lenses could be disposed but where no other lenses are disposed. The first lens group G1 is composed of four lenses numbered L11 to L14 and the second lens group G2 is composed of five lenses numbered L21 to L25.

The fundamental configuration of the first lens group G1 is the same as the optical system 10 depicted in FIGS. 1A-1B, has a negative-negative-negative-positive arrangement of refractive powers, and the lens L14 is set with a high positive refractive power. As a result, the overall focal length fg1 of the first lens group G1 is slightly positive. The second lens group G2 includes, from the enlargement side 3, the lenses L21 and L22 that have a positive-negative arrangement of refractive powers, and the lenses L23 to L25 in a positive-negative-positive arrangement of refractive powers, with the lenses L23 to L25 composing a component (second sub-lens group) G2r. The second lens group G2 includes, from the enlargement side 3, a biconvex positive lens L21, a negative meniscus lens L22 that is convex on the reduction side 2, a biconvex positive lens L23, a biconcave negative lens L24, and a biconvex positive lens L25. In the present embodiment, the group end lens is the positive lens L25.

The second refractive optical system RS2 includes: the third lens group G3, which is disposed on the enlargement side 3 of the second stop ST2 with a third distance SP3 and is equipped on the enlargement side 3 with a third component (sub-lens group) G3f that has negative refractive power; and a fourth lens group G4 that has positive refractive power and is disposed on the reduction side 2 of the second stop ST2 with a fourth distance SP4. The third lens group G3 is composed of seven lenses numbered L31 to L37, and the fourth lens group G4 is composed of seven lenses numbered L41 to L47.

The specific arrangement of refractive powers in the third lens group G3 is the same as in the optical system 10 depicted in FIGS. 1A-1B. The third lens group G3 includes, from the enlargement side 3, a positive meniscus lens L31 that is convex on the reduction side 2, a biconcave negative lens L32, a negative meniscus lens L33 that is convex on the enlargement side 3, a biconcave negative lens L34, and biconvex positive lenses L35 to L37. The fourth lens group G4 includes, from the enlargement side 3, negative-positive-negative-positive-negative-positive-positive lenses L41 to L47. The fourth lens group G4 includes, from the enlargement side 3, a negative meniscus lens L41 that is convex on the enlargement side 3, a biconvex positive lens L42, a biconcave negative lens L43, a biconvex positive lens L44, a negative meniscus lens L45 that is convex on the reduction side 2, a positive meniscus lens L46 that is convex on the reduction side 2, and a biconvex positive lens L47. That is, except for the two lenses on the enlargement side 3, the configuration is the same as the fourth lens group G4 of the optical system 10 depicted in FIGS. 1A-1B.

This optical system 10 includes three focus lens groups Fg1 to Fg3 that are disposed on the enlargement side 3 with respect to the intermediate fixed lens groups Fim1 and Fim2, includes four zoom lens groups Zg1 to Zg4 disposed on the reduction side 2 with respect to the intermediate fixed lens groups Fim1 and Fim2, and further includes an end fixed lens group Fie closest to the reduction side 2. The zoom lens groups Zg1 to Zg4 move during zooming (changes in magnification), which changes the distance from an image plane, for example, the image plane 25a on the reduction side 2. The focus lens groups Fg1 to Fg3 do not move during zooming, but move during focusing. The fixed lens groups Fim1, Fim2, and Fie do not move during zooming or focusing.

The optical system 10 in the present embodiment performs focusing with the first lens group G1 divided into three parts that are moved independently. That is, the first focus lens group Fg1 is composed of the single lens L11 with negative refractive power that is closest to the enlargement side 3 in the first lens group G1, the second focus lens group Fg2 is composed of the lenses L12 and L13 with negative and negative refractive powers in the first lens group G1, and the third focus lens group Fg3 is composed of the lens L14 with positive refractive power.

The second lens group G2 and the lens group G3f on the enlargement side 3 of third lens G3 do not move during focusing or zooming. That is, the lens groups disposed in front of and to the rear of the intermediate image IM do not move during focusing or zooming, which makes it possible to provide an optical system 10 where the intermediate image IM does not move or hardly moves and there are small fluctuations in optical performance due to focusing and zooming.

The zoom group ZG includes four zoom lens groups. The first zoom lens group Zg1 is composed of the lenses L34 and L35 with negative and positive refractive power in the third lens group G3, the second zoom lens group Zg2 is composed of the lens L36 with positive refractive power in the third lens group G3, and the third zoom lens group Zg3 is composed of the lens L37 with positive refractive power that is closest to the reduction side 2 in the third lens group G3. The fourth zoom lens group Zg4 is composed of negative-positive-negative-positive-negative-positive lenses L41 to L46 of the fourth lens group G4 and includes the second stop ST2. The end fixed lens group Fie is composed of a lens L47 with positive refractive power that is closest to the reduction side 2 of the fourth lens group G4.

This optical system 10 is also a retrofocus type in which the first refractive optical system RS1 and the second refractive optical system RS2 have the components G1f and G3f with negative refractive power disposed on their respective enlargement sides (enlargement conjugate sides) 3, which makes it possible to obtain a telecentric or near-telecentric optical system where the enlargement side 3 is wide angle with a large angle of view and the reduction side 2 has a long back focus. In addition, in this design, the intermediate image IM is formed so as to be tilted toward the enlargement side 3. This means that like the optical system 10 depicted in FIGS. 1A-1B, it is possible to reduce the changes in lens diameter and a large number of lenses can be compactly arranged close to each other. Accordingly, it is possible to provide an optical system 10 that is compact and capable of favorably correcting aberration. The detailed configurations of other parts are the same as the optical system 10 depicted in FIGS. 1A-1B.

FIG. 10A depicts the lens arrangement of the optical system 10 at the wide-angle end, and FIG. 10B depicts the lens arrangement of the optical system 10 at the telephoto end. FIG. 11 indicates data on the respective elements of the optical system 10. FIG. 12 indicates the surface numbers and aspherical surface data of the respective aspherical surfaces, out of the surfaces of the respective elements. FIG. 13 indicates the movement distances of the focus lens groups and the zoom lens groups that move during focusing and zooming by way of spacings before and after each lens group at the wide-angle end (case Z1 and Z4), an intermediate position (cases Z2 and Z5) and the telephoto end (cases Z3 and Z6) for positions where the distance d0 from the enlargement side 3 end (that is, the surface S1) to the screen (not depicted) is a short distance (close range, 3400 mm) and a long distance (12000 mm or 12 m).

Figure 14:
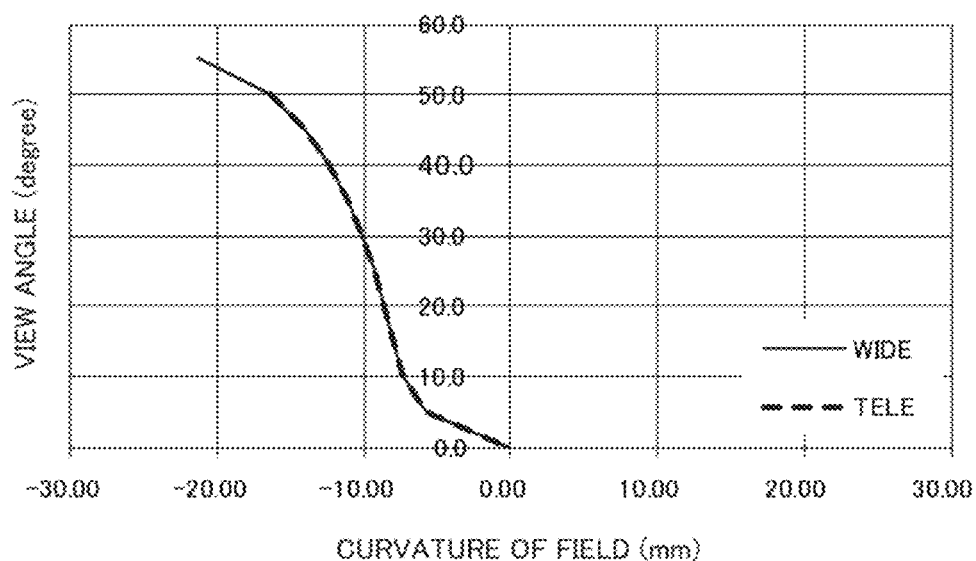
FIG. 14 shows curvature of field of the intermediate image of the optical system depicted in FIGS. 10A-10B.
Figure 15A:
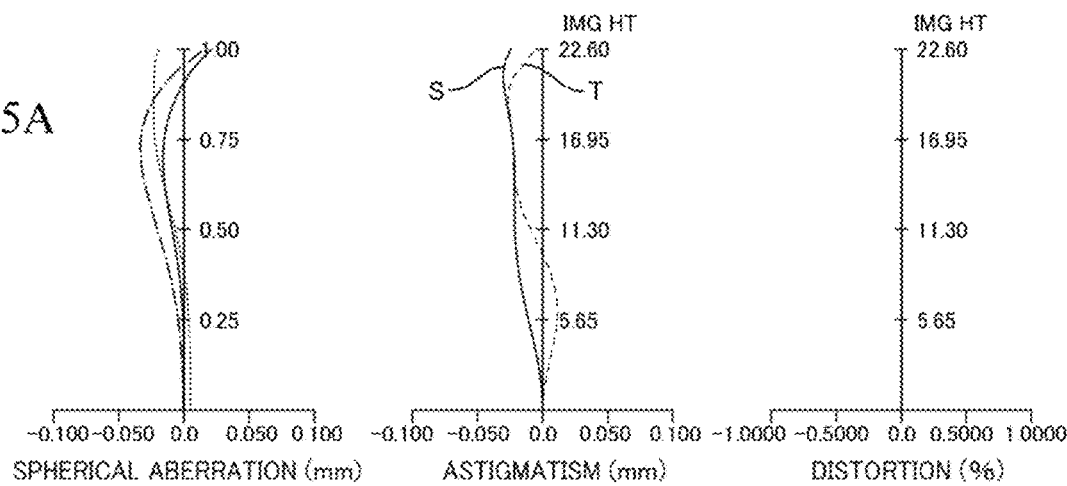
FIGS. 15A-15B show various aberrations at the wide-angle end ("WIDE") and the telephoto end ("TELE") of the optical system depicted in FIGS. 10A-10B.
Figure 15B:
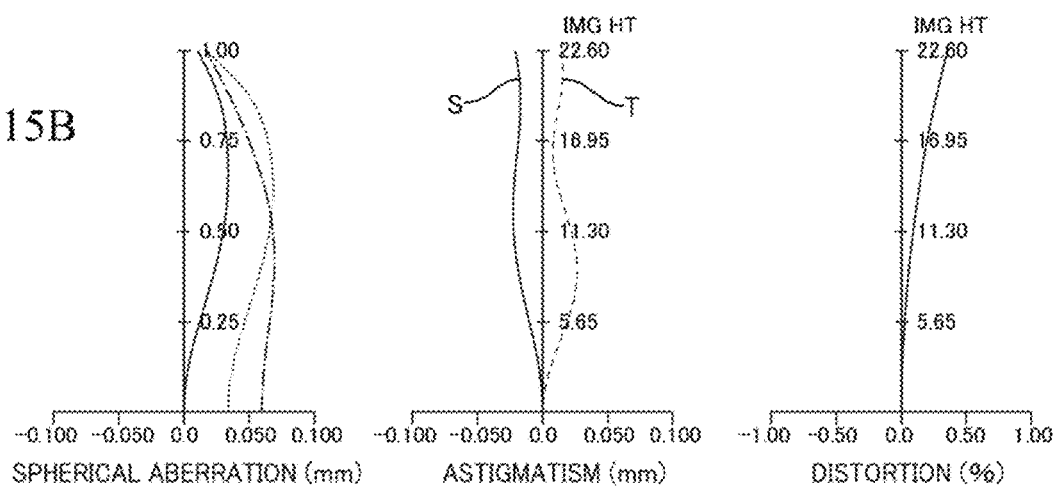
Figure 16:
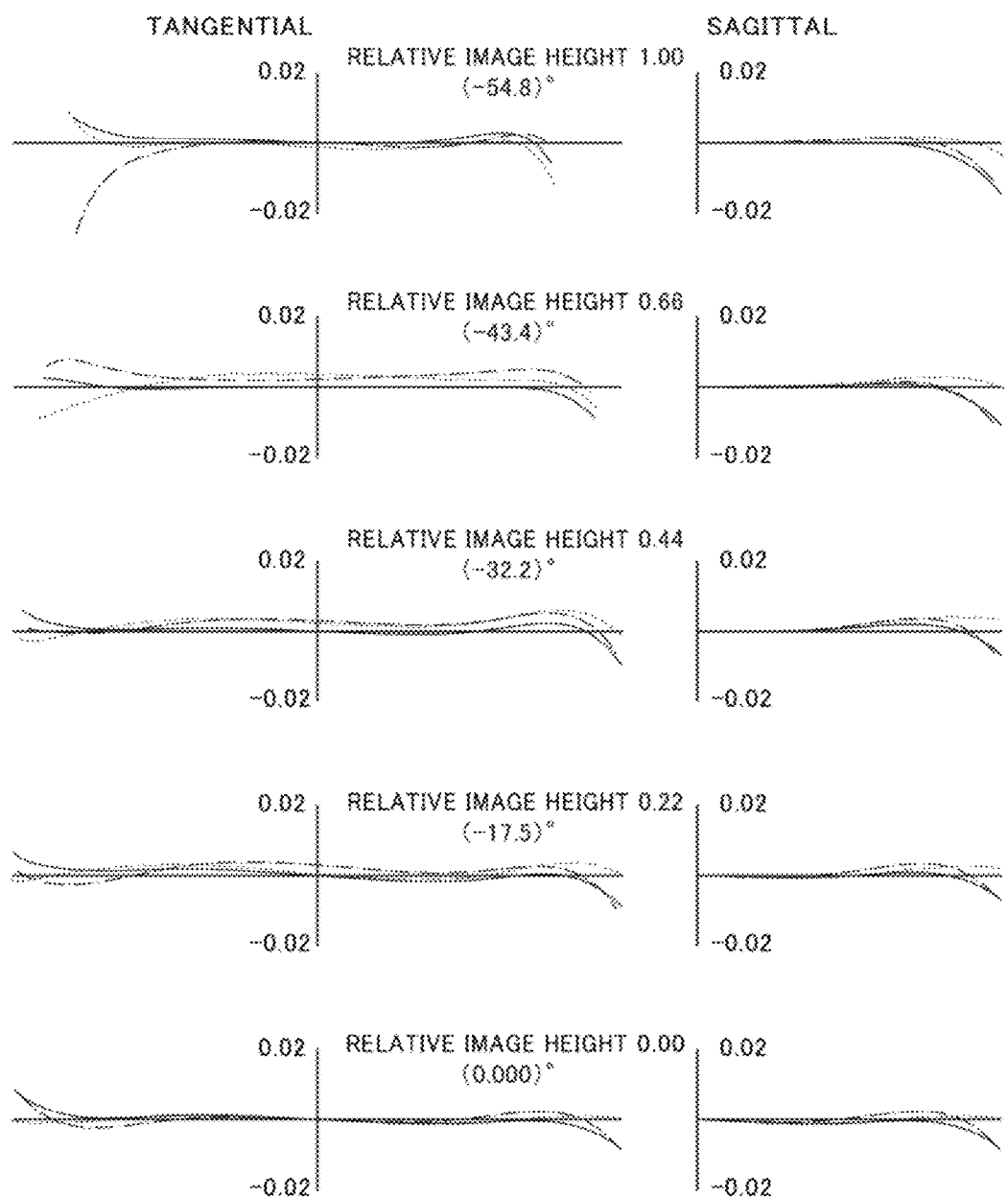
FIG. 16 shows lateral aberration graphs at each image height at the wide-angle end ("WIDE") of the optical system depicted in FIGS. 10A-10B.
Figure 17:
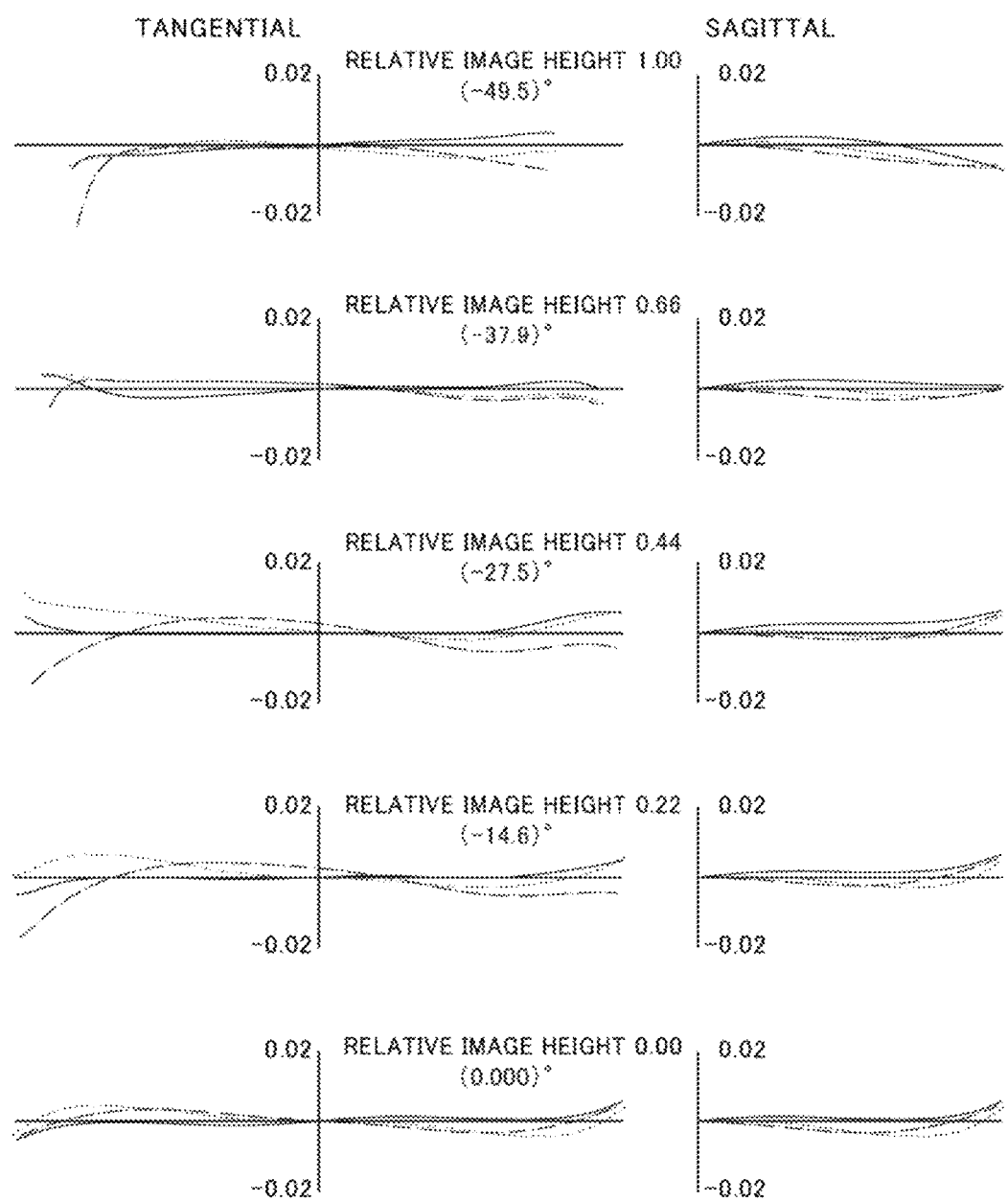
FIG. 17 shows lateral aberration graphs at each image height at the telephoto end ("TELE") of the optical system depicted in FIGS. 10A-10B.

FIG. 14 depicts the curvature of field (in mm) of the intermediate image IM with respect to the angle of view (in degrees). FIGS. 15A and 15B depict spherical aberration, astigmatism, and distortion at the wide-angle end ("WIDE") and the telephoto end ("TELE"). FIGS. 16 and 17 are lateral aberration diagrams for each image height at the wide-angle end ("WIDE") and telephoto end ("TELE").

The main parameters of the optical system 10 depicted in FIGS. 10A-10B are as follows.
Magnification (magnification at close range and wide-angle end): 217.4
F number: 2.37 (wide-angle end)/2.44 (telephoto end)
Maximum angle of view (half angle): 54.8 (wide-angle end)/49.5 (telephoto end)
Zoom ratio: 1.21
Combined focal length of entire system (close range, wide-angle end, fw): −15.87
Combined focal length of entire system (close range, telephoto end, ft): −19.20
Combined focal length of first refractive optical system RS1 (close range, f1): 16.0
Combined focal length of second refractive optical system RS2 (close range, wide-angle end, f2w): 213.6
Combined focal length of second refractive optical system RS2 (close range, telephoto end, f2t): 267.6
Total length of optical system (Lop): 900.00
Total length of first refractive optical system RS1 (Lop1): 283.97
Total length of second refractive optical system RS2 (Lop2): 616.03
Combined focal length of first lens group G1 (close range, fg1): 131.65
Combined focal length of second lens group G2 (close range, fg2): 68.45
Combined focal length of third lens group G3 (close range, wide-angle end, fg3): 135.86
Combined focal length of fourth lens group G4 (close range, wide-angle end, fg4): 127.29
Composite focal length (fc1) of first component G1f: −19.76
Composite focal length (fc3) of third component G3f: −160.25
Focal length of lens L25 at the group end (fg2e): 48.8
Curvature of field of intermediate image IM (IMFc): −21.35
Petzval sum of first lens group G1 (G1PTZ): 0.0171
Petzval sum of second lens group G2 (G2PTZ): −0.0122
Length from enlargement side surface to reduction side surface of second lens group G2 (Lg2): 60.85
Total thickness of lenses with positive refractive power in second lens group G2 (Lg2p): 41.43
First distance (SP1): 30.25
Second distance (SP2): 30.25
Third distance (SP3): 62.07
Fourth distance (SP4): 40.44
Maximum normal angle (θnm): 43.03
Normal angle of the outermost periphery (θnp): 30.53
Length LA: 40.52
Length LB: 18.50

| | |
|---|---|
| (\|G2PTZ/G1PTZ\|):0.71 | Condition (1) |
| (\|IMFc/f1\|):1.33 | Condition (2) |
| (\|IMFc/fw\|):1.35 | Condition (3) |
| (SP1/SD1:SP1/H*2 −10):0.69 | Condition (4) |
| (SP2/SD1:SP2/H*2 −10):0.69 | Condition (5) |
| (\|Sf1r/Sr1r\|:\|Rdy8/Rdy12\|):0.19 | Condition (6) |
| (Dg2max/Dg2min:H*2 −21/H*2 −12):1.11 | Condition (7) |
| (Lg2p/Lg2):0.68 | Condition (8) |
| (Lop1/Lop):0.32 | Condition (9) |
| (\|f1/fw\|):1.01 | Condition (10) |
| (\|fc1/f1\|):1.24 | Condition (11) |
| (\|fc1/fw\|):1.25 | Condition (12) |
| (\|fg2e/fw\|):3.07 | Condition (13) |
| (\|Rg2er/fw\|:\|Rdy20/fw\|):2.59 | Condition (14) |
| (\|θt\|):1.01 | Condition (15) |
| (LB/LA):0.46 | Condition (16) |
| (Rg2m/Rg2p:Rdy18/Rdy17):1.01 | Condition (17) |
| (θnm):43.03 | Condition (18) |
| (θnp/θnm):0.71 | Condition (19) |
| (SP3/SD2:SP3/H*2 −39):1.15 | Condition (20) |
| (SP4/SD2:SP4/H*2 −39):0.75 | Condition (21) |
| (fc1/fc3):0.12 | Condition (22) |

For this optical system 10, out of the Conditions (1) to (22) described earlier, the Condition (17) is not considered at the time of design, but all of the other conditions are satisfied. This optical system 10 is also capable of performing focusing mainly with lens groups disposed in the first refractive optical system RS1 on the enlargement side 3 of the intermediate image IM, and is capable of performing zooming with lens groups disposed in the second refractive optical system RS2 on the reduction side 2 of the intermediate image IM. Also, by realizing the second lens group G2 as a compact arrangement in which a large number of lenses are densely provided, it is possible to provide the optical system 10 which can be made compact as a whole.

This optical system 10 is designed to have an extremely long back focus and a large image circle. The range of distance where focusing is possible is 3.4 m to 12 m, which an extremely wide range. Accordingly, the optical system 10 is suited to applications such as long-throw projection when combined with an illumination system or the like. As indicated in the aberration diagrams, the optical system 10 has favorable aberration correction during zooming and focusing, and as a projection optical system, the optical system 10 is compact and capable of zooming, making it possible to provide a projection optical system 10 capable of projecting images in which aberration is favorably corrected, as well as a projector 1 including the projection optical system 10.

FIGS. 18A-18B depict another example of a projector. This projector 1 also includes an optical system 10 for projecting light from an image plane (first image plane) 5a of a light modulator (light valve) 5 on the reduction side 2 to a screen or wall surface on the enlargement side 3. Like the embodiment described above, the optical system 10 may be an optical system for an image pickup apparatus 21. This optical system 10 is composed of a total of 24 lenses, includes a first optical subsystem (first refractive optical system) RS1 including a plurality of lenses disposed on the enlargement side 3 and a second optical subsystem (second refractive optical system) RS2 including a plurality of lenses disposed on the reduction side 2 with the intermediate image in between, and enlarges and projects the intermediate image IM formed by the second refractive optical system RS2 onto a screen or the like using the wide-angle first refractive optical system RS1.

The first refractive optical system RS1 includes: a first lens group G1 that is disposed on the enlargement side (enlargement conjugate side) 3 of the first stop ST1 at a first distance SP1 and is provided, on the enlargement side 3, with the first component (sub-lens group) G1f with negative refractive power; and a second lens group G2 that is disposed on the reduction side (reduction conjugate side) 2 of the first stop ST1 at a second distance SP2, has positive refractive power (composite refractive power), and whose reduction side 2 is adjacent to the intermediate image IM. The first lens group G1 is composed of two lenses numbered L11 and L12 and the second lens group G2 is composed of five lenses numbered L21 to L25.

The first lens group G1 is composed of a negative first component G1f. The negative first component G1f has a negative-negative arrangement of refractive powers and includes negative meniscus lenses L11 and L12 that are convex on the enlargement side 3. The second lens group G2 includes, from the enlargement side 3, lenses L21 and L22 in a positive-positive arrangement of refractive powers, and lenses L23 to L25 in a positive-negative-positive arrangement of refractive powers, with the lenses L22 to L25 constructing a second component (second sub-lens group) G2r. The second lens group G2 includes, from the enlargement side 3, a positive meniscus lens L21 that is convex on the reduction side 2, a biconvex positive lens L22, a biconvex positive lens L23, a biconcave negative lens L24, and a biconvex positive lens L25. The group-end lens in the present embodiment is the positive lens L25.

The second refractive optical system RS2 includes: a third lens group G3 that is disposed on the enlargement side 3 of the second stop ST2 at a third distance SP3 and is provided on the enlargement side 3 with a third component (sub-lens group) G3f that has negative refractive power; and a fourth lens group G4 that has positive refractive power and is disposed on the reduction side 2 at a fourth distance SP4 from the second stop ST2. The third lens group G3 is composed of six lenses numbered L31 to L36, and the fourth lens group G4 is composed of eleven lenses numbered L41 to L51.

The third lens group G3 includes a negative third component G3f including the positive-negative-negative lenses L31 to L33 and the negative-positive lenses L34 and L35. The third lens group G3 includes, from the enlargement side 3, a positive meniscus lens L31 that is convex on the enlargement side 3, a negative meniscus lens L32 that is convex on the enlargement side 3, negative biconcave lenses L33 and L34, a biconvex positive lens L35, and a positive lens L36 that is convex on the enlargement side 3.

The fourth lens group G4 includes positive-negative-positive-negative-positive-negative-positive-negative-positive-negative-positive lenses L41 to L51 from the enlargement side 3. The fourth lens group G4 includes, from the enlargement side 3, a positive meniscus lens L41 that is convex on the reduction side 2, a biconcave negative lens L42, a biconvex positive lens L43, a negative meniscus lens L44 that is convex on the enlargement side 3, a biconvex positive lens L45, a biconcave negative lens L46, a biconvex positive lens L47, a biconcave negative lens L48, a biconvex positive lens L49, a biconcave negative lens L50, and a biconvex positive lens L51. That is, a configuration is used where a positive-negative-positive arrangement of refractive power is added to the enlargement side 3 of the fourth lens group G4 of the optical system 10 depicted in FIG. 2 and a negative-positive arrangement of refractive powers is added to the reduction side 2 as well.

The optical system 10 has no intermediate fixed lens group, includes three focus lens groups Fg1 to Fg3 disposed on the enlargement side 3 of the intermediate image IM and four zoom lens groups Zg1 to Zg4 disposed on the reduction side 2, and further includes an end fixed lens group Fie closest to the reduction side 2. The zoom lens groups Zg1 to Zg4 move during zooming (that is, a change in magnification), so that the distance from an image plane, for example, the image plane 25a on the reduction side 2 varies. The focus lens groups Fg1 to Fg3 do not move during zooming, but move during focusing.

The optical system 10 in the present embodiment performs focusing with the second lens group G2 divided into two parts that are moved independently. That is, the first focus lens group Fg1 is composed of the first lens group G1, the second focus lens group Fg2 is composed of positive-positive-positive-negative lenses L21 to L24 of the second lens group G2, and the third focus lens group Fg3 is composed of a lens L25 with positive refractive power.

The zoom group ZG includes four zoom lens groups. The first zoom lens group Zg1 is composed of lenses L31 to L33 of the third negative component G3f of the third lens group G3, the second zoom lens group Zg2 is composed of the negative-positive lenses L34 and L35 of the third lens group G3, the third zoom lens group Zg3 is composed of the positive power lens L36 of the third lens group G3, and the fourth zoom lens group Zg4 is composed of the positive-negative-positive-negative-positive-negative-positive-negative-positive lenses L41 to L49 of the fourth lens group G4 and includes the second stop ST2. The end fixed lens group Fie is composed of lenses L50 and L51 with a negative-positive arrangement of refractive powers that are closest to the reduction side 2 of the fourth lens group G4.

The optical system 10 is a retrofocus type where the first refractive optical system RS1 and the second refractive optical system RS2 that have the components G1f and G3f with negative refractive power disposed on their respective enlargement sides (enlargement conjugate sides) 3, and makes it possible to obtain an optical system that is telecentric or near-telecentric where the enlargement side 3 is wide angle with a large angle of view and the reduction side 2 has a long back focus. In addition, a design is used where the intermediate image IM is formed so as to be tilted toward the enlargement side 3. This means that like the optical system 10 depicted in FIGS. 1A-1B, the changes in lens diameter can be reduced, and a large number of lenses can be compactly disposed close to each other. This means that it is possible to provide the optical system 10 that is compact and capable of favorably correcting aberration. The specific configurations of other parts are the same as the optical system 10 depicted in FIGS. 1A-1B.

FIG. 18A depicts the lens arrangement of the optical system 10 at the wide-angle end, and FIG. 18B depicts the lens arrangement of the optical system 10 at the telephoto end. FIG. 19 depicts data on the respective elements of the optical system 10. FIG. 20 indicates the surface numbers and the aspherical surface data of the respective aspherical surfaces, out of the surfaces of the respective elements. FIG. 21A depicts the movement distances of the zoom lens groups that move during zooming by way of the gaps before and after the respective lens groups at the wide-angle end (Z1), an intermediate position (Z2), and the telephoto end (Z3) when the distance d0 from the enlargement side 3 end (the plane S1) to the screen (not illustrated) is a short distance (close range, 1625 mm). FIG. 21B depicts the movement distances of the focus lens groups during focusing at the short distance (close range, 1625 mm, Z10) and a long distance (3000 mm, Z20).

Figure 22:
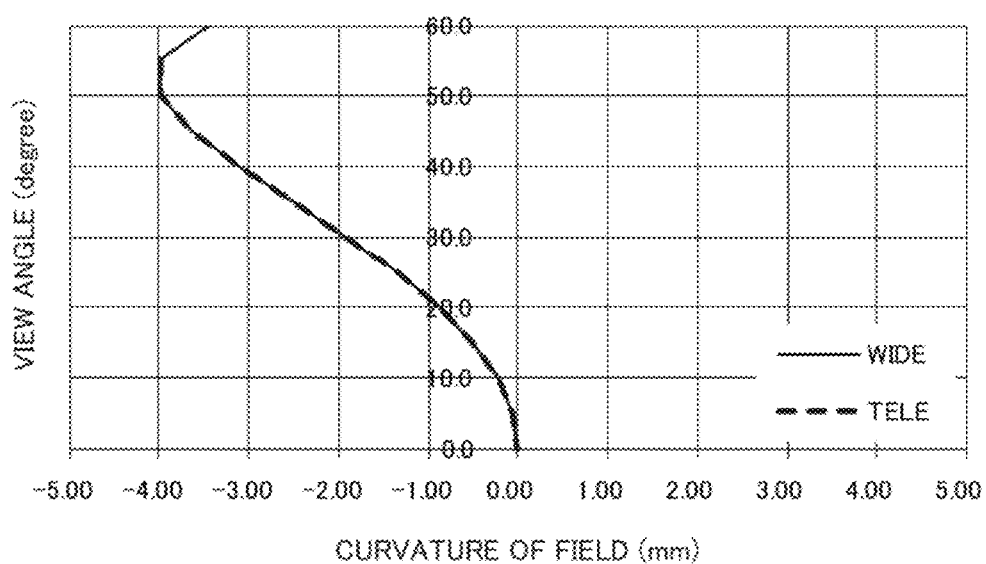
FIG. 22 shows curvature of field of the intermediate image of the optical system depicted in FIGS. 18A-18B.
Figure 23A:
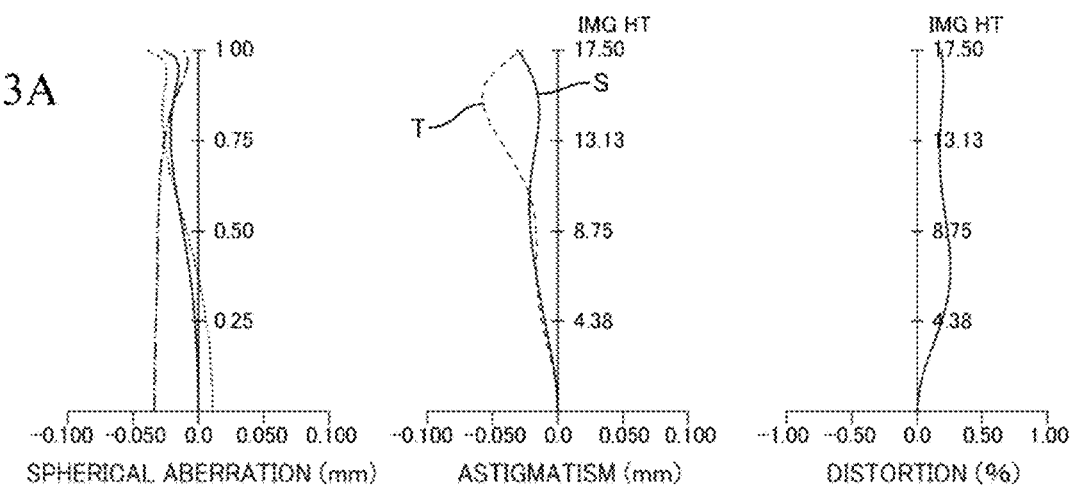
FIGS. 23A-23B show various aberrations at the wide-angle end ("WIDE") and the telephoto end ("TELE") of the optical system depicted in FIGS. 18A-18B.
Figure 23B:
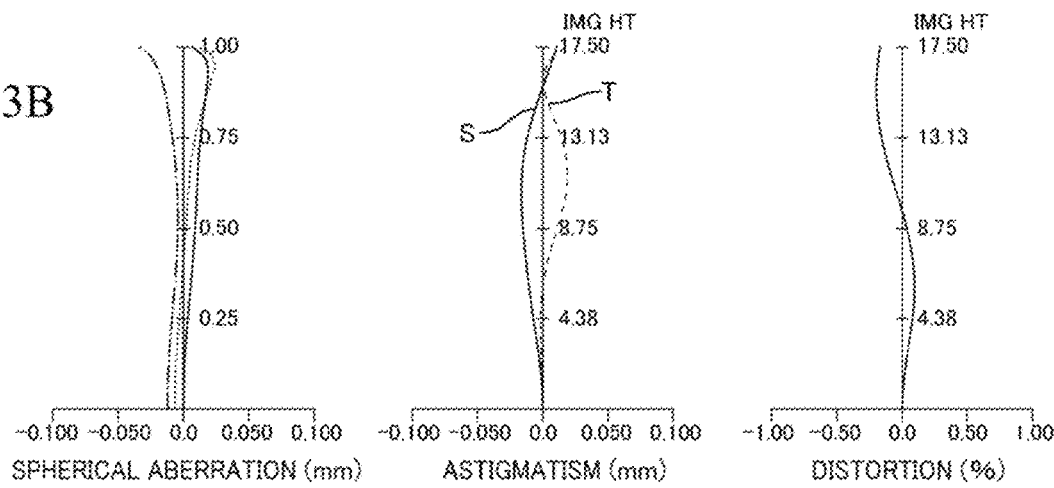
Figure 24:
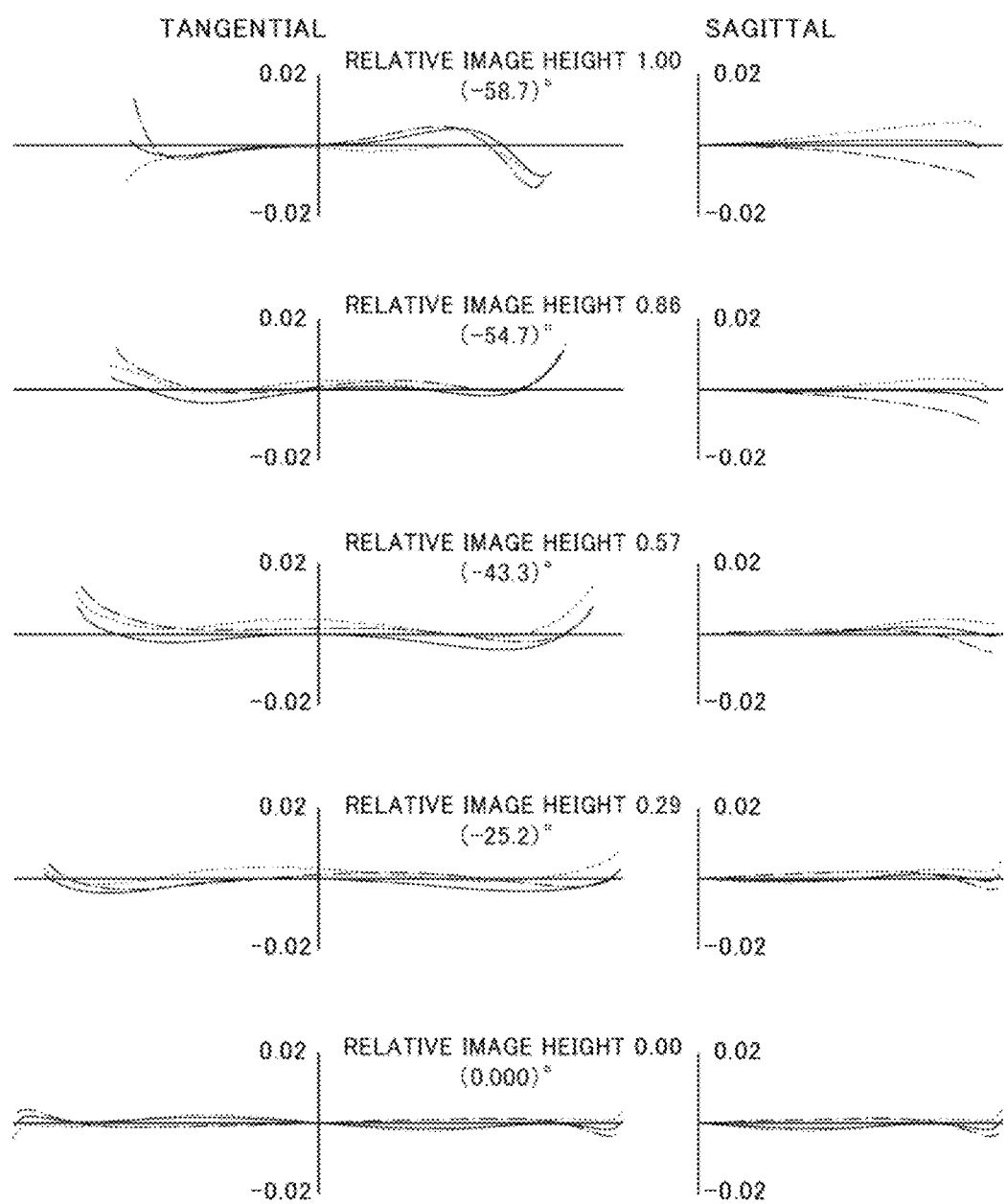
FIG. 24 shows lateral aberration graphs at each image height at the wide-angle end ("WIDE") of the optical system depicted in FIGS. 18A-18B.
Figure 25:
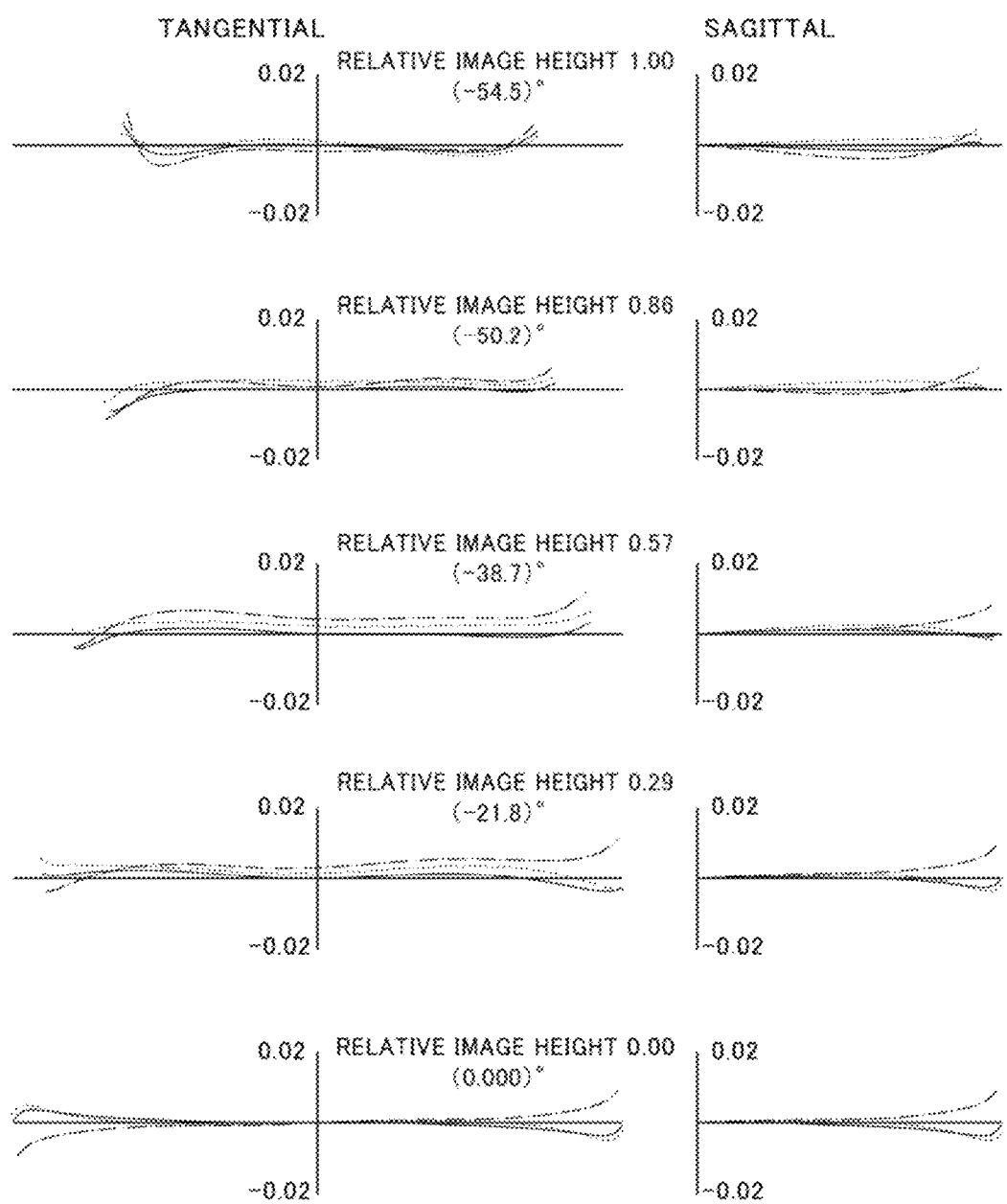
FIG. 25 shows lateral aberration graphs at each image height at the telephoto end ("TELE") of the optical system depicted in FIGS. 18A-18B.

FIG. 22 depicts the curvature of field (in mm) of the intermediate image IM with respect to the angle of view (in degrees). FIGS. 23A and 23B depict spherical aberration, astigmatism, and distortion at the wide-angle end ("WIDE") and the telephoto end ("TELE"). FIGS. 24 and 25 are lateral aberration diagrams for each image height at the wide-angle end ("WIDE") and telephoto end ("TELE").

The main parameters of the optical system 10 depicted in FIGS. 18A-18B are as follows.
Magnification (magnification at close range and wide-angle end): 156.0
F number: 1.89 (wide-angle end)/2.05 (telephoto end)
Maximum angle of view (half angle): 58.7 (wide-angle end)/54.5 (telephoto end)
Zoom ratio: 1.18
Combined focal length of entire system (close range, wide-angle end, fw): −10.58
Combined focal length of entire system (close range, telephoto end, ft): −12.48
Combined focal length of first refractive optical system RS1 (close range, f1): 17.4
Combined focal length of second refractive optical system RS2 (close range, wide-angle end, f2w): 50.95
Combined focal length of second refractive optical system RS2 (close range, telephoto end, f2t): 56.2
Total length of optical system (Lop): 500.00
Total length of first refractive optical system RS1 (Lop1): 151.93
Total length of second refractive optical system RS2 (Lop2): 348.07
Combined focal length of first lens group G1 (close range, fg1): −30.92
Combined focal length of second lens group G2 (close range, fg2): 30.07
Combined focal length of third lens group G3 (close range, wide-angle end, fg3): 95.67
Combined focal length of fourth lens group G4 (close range, wide-angle end, fg4): 52.98
Composite focal length (fc1) of first component G1f: −30.92
Composite focal length (fc3) of third component G3f: −37.92
Focal length of lens L25 at the group end (fg2e): 60.9
Curvature of field of intermediate image IM (IMFc): −3.46
Petzval sum of first lens group G1 (G1PTZ): 0.0195
Petzval sum of second lens group G2 (G2PTZ): −0.0236
Length from enlargement side surface to reduction side surface of second lens group G2 (Lg2): 70.89
Total thickness of lenses with positive refractive power in second lens group G2 (Lg2p): 59.79
First distance (SP1): 27.48
Second distance (SP2): 15.28
Third distance (SP3): 20.80
Fourth distance (SP4): 24.33
Maximum normal angle ($\theta nm$): 42.86
Normal angle of the outermost periphery ($\theta np$): 33.84
Length LA: 45.30
Length LB: 22.74

| | |
|---|---|
| ($\|G2PTZ/G1PTZ\|$):1.21 | Condition (1) |
| ($\|IMFc/f1\|$):0.20 | Condition (2) |
| ($\|IMFc/fw\|$):0.33 | Condition (3) |
| ($SP1/SD1$:$SP1/H*2-6$):1.31 | Condition (4) |
| ($SP2/SD1$:$SP2/H*2-6$):0.73 | Condition (5) |
| ($\|Sf1r/Sr1r\|$: $\|Rdy4/Rdy8\|$):0.18 | Condition (6) |
| ($Dg2max/Dg2min$:$H*2-17/H*2-8$):1.55 | Condition (7) |
| ($Lg2p/Lg2$):0.84 | Condition (8) |
| ($Lop1/Lop$):0.30 | Condition (9) |
| ($\|f1/fw\|$):1.64 | Condition (10) |
| ($\|fc1/f1\|$):1.78 | Condition (11) |
| ($\|fc1/fw\|$):2.92 | Condition (12) |
| ($\|fg2e/fw\|$):5.76 | Condition (13) |
| ($\|Rg2er/fw\|$: $\|Rdy16/fw\|$):5.11 | Condition (14) |
| ($\|\theta t\|$):6.08 | Condition (15) |
| ($LB/LA$):0.50 | Condition (16) |
| ($Rg2m/Rg2p$:$Rdy14/Rdy13$):0.99 | Condition (17) |
| ($\theta nm$):42.86 | Condition (18) |
| ($\theta np/\theta nm$):0.79 | Condition (19) |
| ($SP3/SD2$:$SP3/H*2-33$):0.47 | Condition (20) |
| ($SP4/SD2$:$SP4/H*2-33$):0.54 | Condition (21) |
| ($fc1/fc3$):0.82 | Condition (23) |

This optical system 10 satisfies all of the above Conditions (1) to (21) and (23) described earlier. The optical system 10 is also capable of performing focusing mainly with lens groups disposed in the first refractive optical system RS1 on the enlargement side 3 of the intermediate image IM, and is capable of zooming with lens groups disposed in the second refractive optical system RS2 on the reduction side 2. In addition, by realizing the second lens group G2 in a compact arrangement in which a large number of lenses are densely provided, it is possible to provide an optical system 10 which as a whole can be compactly designed, and is bright with an even lower F number.

The optical system 10 is a design with a comparatively short back focus and a large image circle. The intermediate image IM is formed as an enlarged image. Accordingly, the optical system 10 is suited to applications where a back focus is not especially required. As indicated by the aberration graphs, the optical system 10 favorably corrects aberration during zooming and focusing, and makes it possible to provide a projection optical system 10 that is capable of zooming, and is compact but capable of projecting images in which aberration is favorably corrected, as well as a projector 1 equipped with this optical system 10.

FIGS. 26A-26B depict another example of a projector. This projector 1 also includes an optical system 10 for projecting from an image plane (first image plane) 5a of a light modulator (light valve) 5 on the reduction side 2 to a screen or wall surface on the enlargement side 3. The optical system 10 is composed of a total of 26 lenses, includes a first optical subsystem (first refractive optical system) RS1 including a plurality of lenses disposed on the enlargement side 3 and a second optical subsystem (second refractive optical system) RS2 including a plurality of lenses disposed on the reduction side 2 with the intermediate image IM in between, and enlarges and projects the intermediate image IM formed by the second refractive optical system RS2 onto a screen or the like using the first refractive optical system RS1 which is wide angle.

The first refractive optical system RS1 includes: the first lens group G1 that is disposed on the enlargement side (enlargement conjugate side) 3 of the first stop ST1 with a first distance SP1 and is provided on the enlargement side 3 with a first component (sub-lens group) G1f with negative refractive power; and the second lens group G2 that is disposed on the reduction side (reduction conjugate side) 2 of the first stop ST1 with a second distance SP2, whose reduction side 2 is adjacent to the intermediate image IM, and has positive refractive power (composite refractive power). In this optical system 10, the configurations of the first lens group G1 and the second lens group G2 are the same as the optical system 10 depicted in FIGS. 18A-18B.

The second refractive optical system RS2 includes: the third lens group G3, which is disposed on the enlargement side 3 of the second stop ST2 with a third distance SP3 and is provided on the enlargement side with the third component (sub-lens group) G3f with negative refractive power; and the fourth lens group G4 which has positive refractive power and is disposed on the reduction side 2 with a fourth distance SP4 from the second stop ST2. The third lens group G3 is composed of eight lenses numbered L31 to L38 and the fourth lens group G4 is composed of eleven lenses numbered L41 to L51.

The third lens group G3 includes the negative third component G3f that includes positive-negative-negative lenses L31 to L33, and negative-positive-positive-negative-positive lenses L34 to L38. The third lens group G3 includes, from the enlargement side 3, the positive meniscus lens L31 that is convex on the enlargement side 3, the biconcave negative lenses L32 and L33, the negative meniscus lens L34 that is convex on the reduction side 2, the positive meniscus lens L35 that is convex on the reduction side 2, the biconvex positive lens L36, the negative meniscus lens L37 that is convex on the reduction side 2, and the positive meniscus lens L38 that is convex on the enlargement side 3.

Like the optical system 10 depicted in FIGS. 18A-18B, the fourth lens group G4 includes the lenses L41 to L51 in a positive-negative-positive-negative-positive-negative-positive-negative-positive-negative-positive arrangement from the enlargement side 3. Aside from the lens L41 that is closest to the enlargement side 3 being a biconvex positive lens, the fourth lens group G4 has the same fundamental configuration as the optical system 10 depicted in FIGS. 18A-18B.

The optical system 10 has no intermediate fixed lens group and includes three focus lens groups Fg1 to Fg3 disposed on the enlargement side 3 of the intermediate image IM and four zoom lens groups Zg1 to Zg4 disposed on the reduction side 2, and further includes an end fixed lens group Fie closest to the reduction side 2.

The optical system 10 in the present embodiment performs focusing with the first lens group G1 divided into two parts that are moved independently. That is, the first focus lens group Fg1 is composed of the lens L11 of the first lens group G1, the second focus lens group Fg2 is composed of the lens L12 of the first lens group G1, and the third focus lens group Fg3 is composed of the positive-positive-positive-negative-positive lenses L21 to L25 of the second lens group G2 and includes the first stop ST1.

The zoom group ZG includes four zoom lens groups. The first zoom lens group Zg1 is composed of the lenses L31 to L33 of the third negative component G3f of the third lens group G3 and the lens L34, the second zoom lens group Zg2 is composed of the positive-positive-negative lenses L35, L36, and L37 of the third lens group G3, the third zoom lens group Zg3 is composed of the positive lens L38 of the third lens group G3, and the fourth zoom lens group Zg4 is composed of the positive-negative-positive-negative-positive-negative-positive-negative-positive lenses L41 to L49 of the fourth lens group G4 and includes the second stop ST2. The end fixed lens group Fie is composed of the negative-positive lenses L50 and L51 that are closest to the reduction side 2 of the fourth lens group G4.

This optical system 10 is also a retrofocus type in which the first refractive optical system RS1 and the second refractive optical system RS2 have the components G1f and G3f with negative refractive power disposed on their respective enlargement sides (enlargement conjugate sides) 3, which makes it possible to obtain a telecentric or near-telecentric optical system where the enlargement side 3 is wide angle with a large angle of view and the reduction side 2 has a long back focus. In addition, in this design, the intermediate image IM is formed so as to be tilted toward the enlargement side 3. This means that like the optical system 10 depicted in FIGS. 1A-1B, the changes in lens diameter can be reduced, and a large number of lenses can be compactly disposed close to each other. As a result, it is possible to provide the optical system 10 that is compact and capable of favorably correcting aberration. The specific configurations of other parts are the same as the optical system 10 depicted in FIGS. 1A-1B.

FIG. 26A depicts the lens arrangement of the optical system 10 at the wide-angle end, and FIG. 26B depicts the lens arrangement of the optical system 10 at the telephoto end. FIG. 27 depicts data on the respective elements of the optical system 10. FIG. 28 indicates the surface numbers and the aspherical surface data of the respective aspherical surfaces, out of the surfaces of the respective elements. FIG. 29A depicts the movement distances of the zoom lens groups that move during zooming by way of the gaps before and after the respective lens groups at the wide-angle end (Z1), an intermediate position (Z2), and the telephoto end (Z3) when the distance d0 from the enlargement side 3 end (the plane S1) to the screen (not illustrated) is a short distance (close range, 1625 mm). FIG. 29B depicts the amount of movement of the focus lens group during focusing at a short distance (1625 mm, Z10) and a long distance (3000 mm, Z20).

Figure 30:
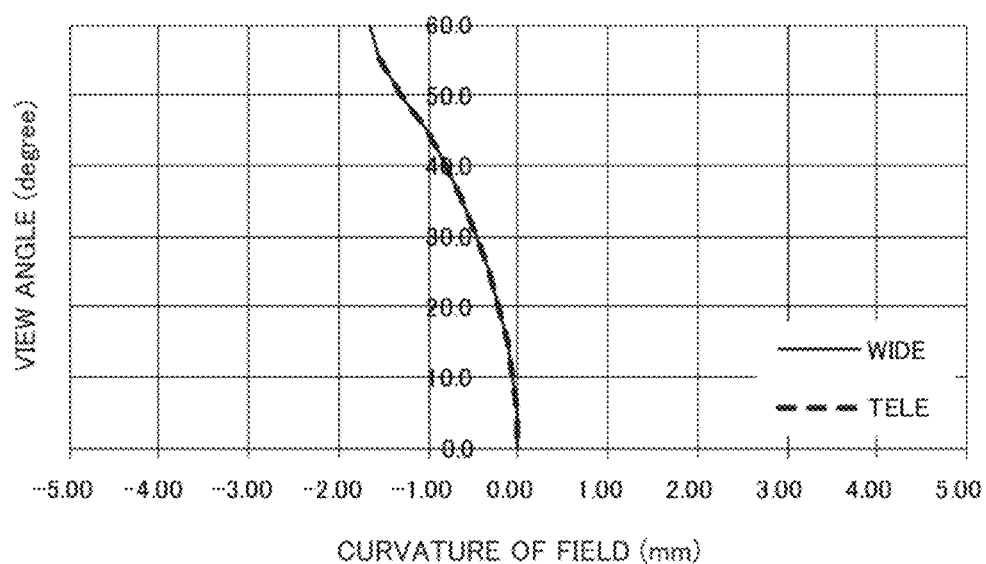
FIG. 30 shows curvature of field of the intermediate image of the optical system depicted in FIGS. 26A-26B.
Figure 31A:
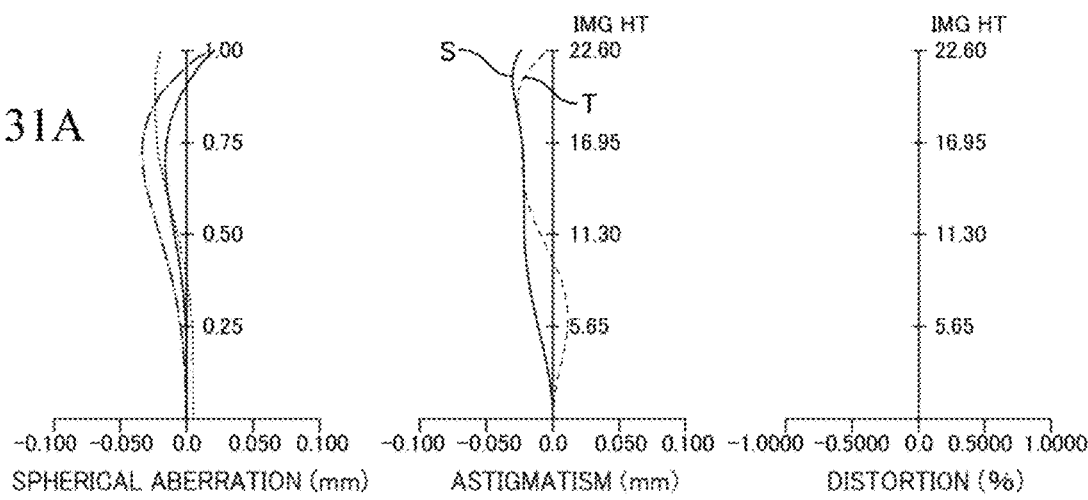
FIGS. 31A-31B show various aberrations at the wide-angle end ("WIDE") and the telephoto end ("TELE") of the optical system depicted in FIGS. 26A-26B.
Figure 31B:
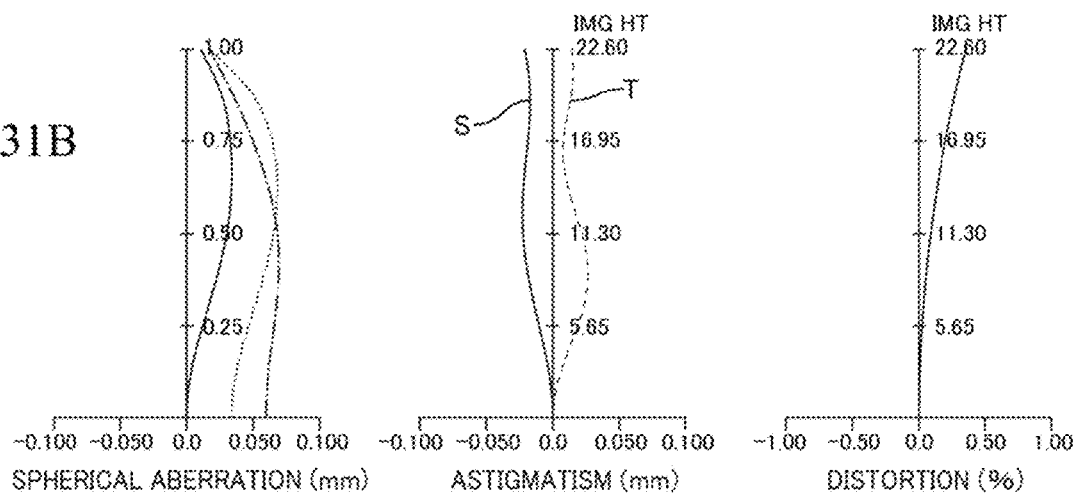
Figure 32:
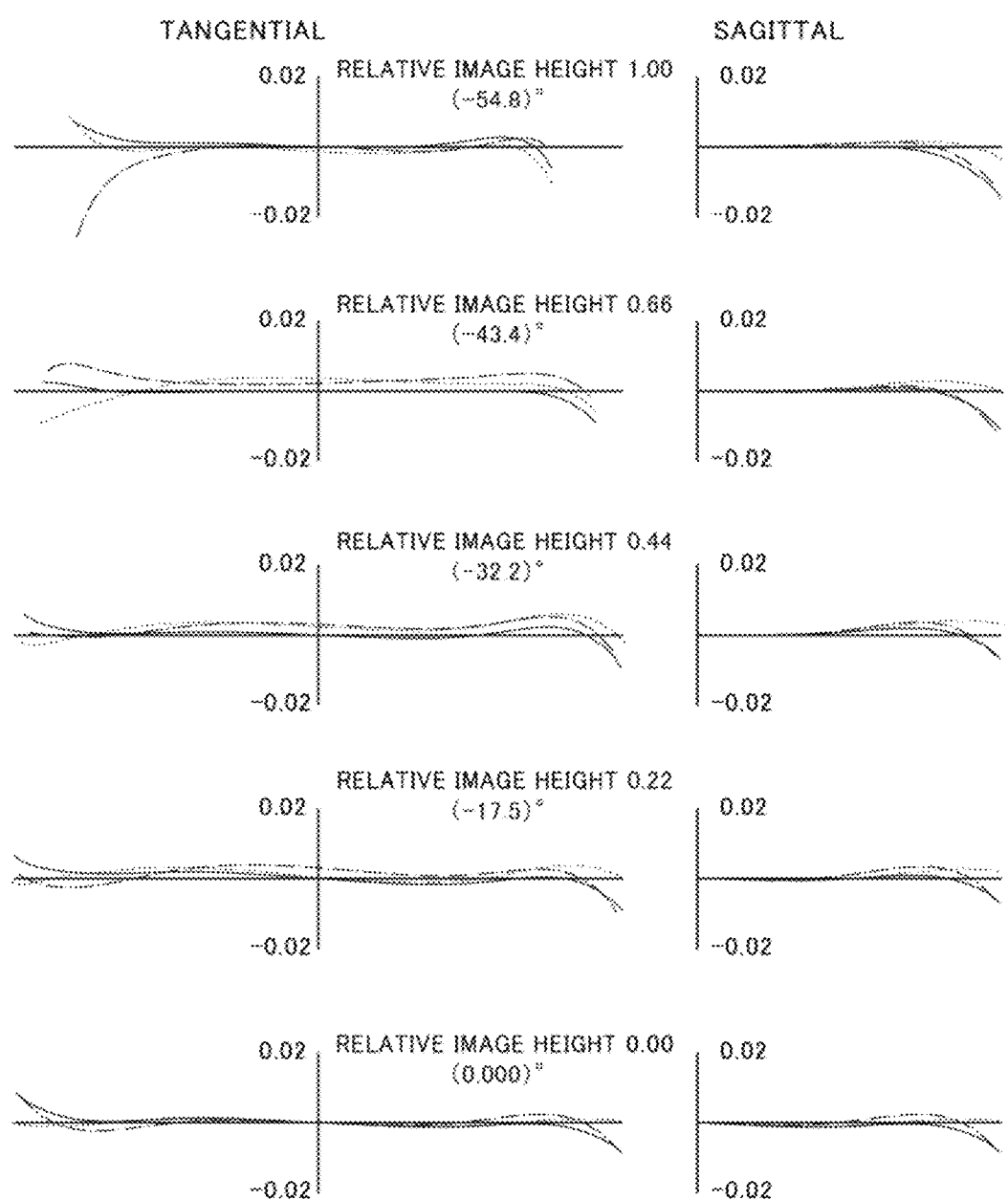
FIG. 32 shows lateral aberration graphs at each image height at the wide-angle end ("WIDE") of the optical system depicted in FIGS. 26A-26B.
Figure 33:
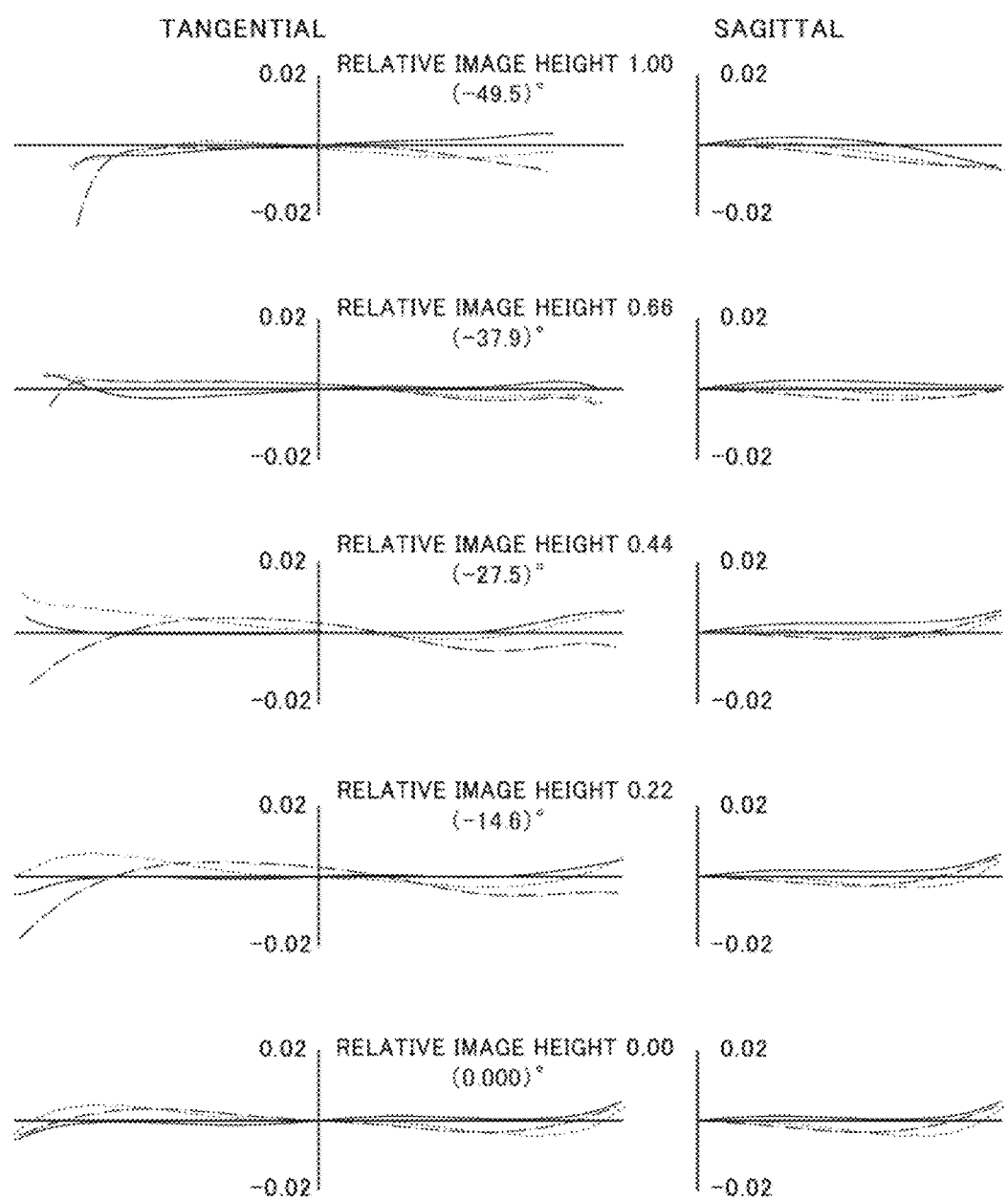
FIG. 33 shows lateral aberration graphs at each image height at the telephoto end ("TELE") of the optical system depicted in FIGS. 26A-26B.

FIG. 30 depicts the curvature of field (in mm) of the intermediate image IM with respect to the angle of view (in degrees). FIGS. 31A and 31B depict spherical aberration, astigmatism, and distortion at the wide-angle end ("WIDE") and the telephoto end ("TELE"). FIGS. 32 and 33 are lateral aberration diagrams for each image height at the wide-angle end ("WIDE") and telephoto end ("TELE").

The main parameters of the optical system 10 depicted in FIGS. 26A-26B are as follows.
Magnification (magnification at close range and wide-angle end): 156.7
F number: 1.99 (wide-angle end)/2.10 (telephoto end)
Maximum angle of view (half angle): 58.7 (wide-angle end)/54.3 (telephoto end)
Image circle (at reduction side): φ35.0
Back focus (at reduction side): 48.0
Zoom ratio: 1.18
Combined focal length of entire system (close range, wide-angle end, fw): −10.56
Combined focal length of entire system (close range, telephoto end, ft): −12.46

Combined focal length of first refractive optical system RS1 (close range, f1): 12.1
Combined focal length of second refractive optical system RS2 (close range, wide-angle end, f2w): 69.6
Combined focal length of second refractive optical system RS2 (close range, telephoto end, f2t): 81.5
Total length of optical system (Lop): 500.00
Total length of first refractive optical system RS1 (Lop1): 150.85
Total length of second refractive optical system RS2 (Lop2): 349.15
Combined focal length of first lens group G1 (close range, fg1): −32.34
Combined focal length of second lens group G2 (close range, fg2): 28.11
Combined focal length of third lens group G3 (close range, wide-angle end, fg3): 81.37
Combined focal length of fourth lens group G4 (close range, wide-angle end, fg4): 91.20
Composite focal length (fc1) of first component G1f: −32.34
Composite focal length (fc3) of third component G3f: −30.89
Focal length of lens L25 at the group end (fg2e): 44.9
Curvature of field of intermediate image IM (IMFc): −1.66
Petzval sum of first lens group G1 (G1PTZ): 0.0170
Petzval sum of second lens group G2 (G2PTZ): −0.0274
Length from enlargement side surface to reduction side surface of second lens group G2 (Lg2): 54.98
Total thickness of lenses with positive refractive power in second lens group G2 (Lg2p): 51.49
First distance (SP1): 37.6
Second distance (SP2): 14.66
Third distance (SP3): 20.80
Fourth distance (SP4): 20.35
Maximum normal angle (θnm): 44.85
Normal angle of the outermost periphery (θnp): 42.59
Length LA: 32.7
Length LB: 11.50

| | |
|---|---|
| (\|G2PTZ/G1PTZ\|):1.61 | Condition (1) |
| (\|IMFc/f1\|):0.14 | Condition (2) |
| (\|IMFc/fw\|):0.16 | Condition (3) |
| (SP1/SD1:SP1/H*2−6):1.63 | Condition (4) |
| (SP2/SD1:SP2/H*2−6):0.64 | Condition (5) |
| (\|Sf1r/Sr1r\|:\|Rdy4/Rdy8\|):0.26 | Condition (6) |
| (Dg2max/Dg2min:H*2−11/H*2−8):1.34 | Condition (7) |
| (Lg2p/Lg2):0.94 | Condition (8) |
| (Lop1/Lop):0.30 | Condition (9) |
| (\|f1/fw\|):1.15 | Condition (10) |
| (\|fc1/f1\|):2.67 | Condition (11) |
| (\|fc1/fw\|):3.06 | Condition (12) |
| (\|fg2e/fw\|):4.25 | Condition (13) |
| (\|Rg2er/fw\|:\|Rdy16/fw\|):4.01 | Condition (14) |
| (\|θt\|):5.79 | Condition (15) |
| (LB/LA):0.35 | Condition (16) |
| (Rg2m/Rg2p:Rdy14/Rdy13):0.98 | Condition (17) |
| (θnm):44.85 | Condition (18) |
| (θnp/θnm):0.95 | Condition (19) |
| (SP3/SD2:SP3/H*2−37):0.45 | Condition (20) |
| (SP4/SD2:SP4/H*2−37):0.44 | Condition (21) |
| (fc1/fc3):1.05 | Condition (23) |

This optical system 10 satisfies all of the above Conditions (1) to (21) and (23) described earlier. The optical system 10 is also capable of performing focusing mainly with a lens group disposed in the first refractive optical system RS1 on the enlargement side 3 of the intermediate image IM, and is capable of zooming with a lens group disposed in the second refractive optical system RS2 on the reduction side 2. In addition, by realizing the second lens group G2 in a compact arrangement in which a large number of lenses are densely provided, it is possible to provide an optical system 10 which as a whole can be compactly designed and is bright with a low F number.

The optical system 10 is a design with a comparatively short back focus and a large image circle. In addition, by disposing a large number of lenses with positive refractive power in the third lens group G3 on the reduction side 2 of the intermediate image IM and internally bending the light rays, it is possible to form the intermediate image IM as a reduced image. Accordingly, the optical system 10 is suited to applications where a back focus is not especially required. As indicated by the aberration graphs, the optical system 10 favorably corrects aberration during zooming and focusing, and makes it possible to provide a projection optical system 10 that is capable of zooming, and is compact but capable of projecting images in which aberration is favorably corrected, as well as a projector 1 equipped with this optical system 10.

Note that although specific embodiments of the present invention have been described above, various other embodiments and modifications can be conceived by those of skill in the art without departing from the scope and spirit of the invention. Such other embodiments and modifications fall within the range of the following patent claims which define the scope of the present invention.

The invention claimed is:

1. An optical system composed of a first optical subsystem disposed on an enlargement side and a second optical subsystem disposed on a reduction side with an intermediate image in between,
    wherein the first optical subsystem includes:
    a first lens group that is disposed on the enlargement side of a first stop with a first distance that includes a spacing in which no other lenses are disposed, and the first lens group includes, on the enlargement side of the first lens group, a first component with negative refractive power, and
    a second lens group that has positive refractive power, is disposed on the reduction side of the first stop with a second distance that includes a spacing in which no other lenses are disposed, and forms the intermediate image so as to be adjacent on the reduction side of the second lens group and so as to be tilted toward the enlargement side;

wherein the first distance SP1, the second distance SP2 and an effective diameter SD1 of the first stop satisfy following conditions:

$0.5 < SP1/SD1 < 1.7,$ $0.5 < SP2/SD1 < 1.7,$ and the first optical subsystem includes a focus group including one or more lenses that move during focusing and the focus group includes a first lens with negative refractive power disposed closest to the enlargement side of the first lens group, the first lens being included in the first component of the first lens group.

2. The optical system according to claim 1,
wherein the second lens group includes a plurality of lenses and a maximum effective diameter Dg2max and a minimum effective diameter Dg2min of the lenses satisfy a following condition:

$1 < Dg2max/Dg2min < 1.7.$

3. The optical system according to claim 1,
wherein the second lens group includes a plurality of lenses with positive refractive power respectively, and a length Lg2 from a surface facing the first stop in the second lens group and a surface facing the intermediate image and a thickness Lg2p occupied by the plurality of lenses with positive refractive power satisfy a following condition:

$0.5 < Lg2p/Lg2 < 1.0.$

4. The optical system according to claim 1,
wherein a focal length f1 of the first optical subsystem and a focal length fw at a wide angle end of the optical system satisfies a following condition:

$1.0 < |f1/fw| < 2.0.$

5. The optical system according to claim 1,
wherein the second lens group includes, at a position closest to the reduction side, a group end lens with positive refractive power that is adjacent on the enlargement side to the intermediate image, and a focal length fg2e of the group end lens and a focal length fw of the optical system at a wide angle end satisfy a following condition:

$2.5 < |fg2e/fw| < 10.0.$

6. The optical system according to claim 1,
wherein the second lens group includes, at a position closest to the reduction side, a group end lens with positive refractive power that is adjacent on the enlargement side to the intermediate image, and a radius of curvature Rg2er of a surface on the enlargement side of the group end lens and a focal length fw of the optical system at a wide angle end satisfy a following condition:

$2.0 < |Rg2er/fw| < 35.0.$

7. The optical system according to claim 1,
wherein the second lens group includes a second component composed of a combination of positive-negative-positive refractive powers at a position closest to the intermediate image.

8. The optical system according to claim 1,
wherein the second lens group includes, at a position closest to the intermediate image, a lens with positive refractive power that is convex on the reduction side.

9. The optical system according to claim 1,
wherein the focus group includes, in addition to the first lens, at least one lens included in the first optical subsystem.

10. The optical system according to claim 1,
wherein the focus group includes, in addition to the first lens, at least one lens with positive refractive power included in the second lens group.

11. The optical system according to claim 1,
wherein the focus group includes a first focus lens group including the first lens and a second focus lens group that moves differently to the first focus lens group.

12. An optical system composed of a first optical subsystem disposed on an enlargement side and a second optical subsystem disposed on a reduction side with an intermediate image in between,
wherein the first optical subsystem includes:
a first lens group that is disposed on the enlargement side of a first stop with a first distance that includes a spacing in which no other lenses are disposed, and the first lens group includes, on the enlargement side of the first lens group, a first component with negative refractive power, and
a second lens group that has positive refractive power, is disposed on the reduction side of the first stop with a second distance that includes a spacing in which no other lenses are disposed, and forms the intermediate image so as to be adjacent on the reduction side of the second lens group and so as to be tilted toward the enlargement side;
wherein the second optical subsystem includes:
a third lens group that is disposed on the enlargement side of a second stop at a third distance that includes a spacing in which no other lenses are disposed, and the third lens group includes, on an enlargement side of the third lens group, a third component with negative refractive power; and
a fourth lens group that has positive refractive power and is disposed on the reduction side of the second stop with a fourth distance that includes a spacing in which other lenses could be disposed but no other lenses are disposed;
wherein the third component of the third lens group is disposed adjacent to the intermediate image and includes, in order from the enlargement side, a lens that has positive refractive power and is closest to the intermediate image and two lenses with negative refractive power;
wherein the first distance SP1, the second distance SP2 and an effective diameter SD1 of the first stop satisfy following conditions:

$0.5 < SP1/SD1 < 1.7,$ $0.5 < SP2/SD1 < 1.7,$ and wherein the third distance SP3, the fourth distance SP4, and an effective diameter SD2 of the second stop satisfy following conditions:

$0.4 < SP3/SD2 < 1.5,$ $0.4 < SP4/SD2 < 1.5.$

13. The optical system according to claim 12
wherein a focal length fc1 of the first component and a focal length fc3 of the third component satisfy a following condition:

$0.1 < fc1/fc3 < 0.3.$

14. The optical system according to claim 12,
wherein a focal length fc1 of the first component and a focal length fc3 of the third component satisfy a following condition:

$$0.8 < fc1/fc3 < 1.2.$$

15. The optical system according to claim 12,
wherein a total length Lop of the optical system and a total length Lop1 of the first optical subsystem satisfy a following condition:

$$0.2 < Lop1/Lop < 0.33.$$

16. The optical system according to claim 12,
wherein the third lens group includes a lens with positive refractive power that is convex on the enlargement side, is disposed closest to the enlargement side, and is adjacent on the reduction side of the intermediate image.

17. An optical system composed of a first optical subsystem disposed on an enlargement side and a second optical subsystem disposed on a reduction side with an intermediate image in between,
wherein the first optical subsystem includes:
a first lens group that is disposed on the enlargement side of a first stop with a first distance that includes a spacing in which no other lenses are disposed, and the first lens group includes, on the enlargement side of the first lens group, a first component with negative refractive power, and
a second lens group that has positive refractive power, is disposed on the reduction side of the first stop with a second distance that includes a spacing in which no other lenses are disposed, and forms the intermediate image so as to be adjacent on the reduction side of the second lens group and so as to be tilted toward the enlargement side;
wherein the second optical subsystem includes:
a third lens group that is disposed on the enlargement side of a second stop at a third distance that includes a spacing in which no other lenses are disposed, and the third lens group includes, on an enlargement side of the third lens group, a third component with negative refractive power; and
a fourth lens group that has positive refractive power and is disposed on the reduction side of the second stop with a fourth distance that includes a spacing in which other lenses could be disposed but no other lenses are disposed;
wherein the second optical subsystem includes a zoom group including one or more lenses that move during zooming;
wherein the zoom group includes: a first zoom lens group including one or more lenses of the third lens group; and a second zoom lens group including one or more lenses of the fourth lens group;
wherein the first distance SP1, the second distance SP2 and an effective diameter SD1 of the first stop satisfy following conditions:

$$0.5 < SP1/SD1 < 1.7,$$

$$0.5 < SP2/SD1 < 1.7, \text{ and}$$

wherein the third distance SP3, the fourth distance SP4, and an effective diameter SD2 of the second stop satisfy following conditions:

$$0.4 < SP3/SD2 < 1.5,$$

$$0.4 < SP4/SD2 < 1.5.$$

18. A projector comprising:
the optical system according to claim 1, and
a light modulator that is disposed on the reduction side of the optical system.

19. An image pickup apparatus comprising:
the optical system according to claim 1, and
an image pickup element that is disposed on the reduction side of the optical system.

20. A projector comprising:
the optical system according to claim 12, and
a light modulator that is disposed on the reduction side of the optical system.

21. An image pickup apparatus comprising:
the optical system according to claim 12, and
an image pickup element that is disposed on the reduction side of the optical system.

22. A projector comprising:
the optical system according to claim 17, and
a light modulator that is disposed on the reduction side of the optical system.

23. An image pickup apparatus comprising:
the optical system according to claim 17, and
an image pickup element that is disposed on the reduction side of the optical system.

* * * * *